United States Patent [19]

Kaplan

[11] 3,713,730

[45] Jan. 30, 1973

[54] IMAGE RECONSTITUTION SYSTEM

[76] Inventor: Milton Kaplan, 343 Milltown Road, Springfield, N.J. 07081

[22] Filed: Nov. 20, 1970

[21] Appl. No.: 91,500

[52] U.S. Cl. .......... 350/320
[51] Int. Cl. .......... G02b /00
[58] Field of Search .......... 350/6, 320, 247

[56] References Cited

UNITED STATES PATENTS

| | | | |
|---|---|---|---|
| 3,016,785 | 1/1962 | Kapany | 350/6 |
| 3,090,281 | 5/1963 | Marechal et al. | 350/314 X |
| 3,110,762 | 11/1963 | Frank | 350/6 X |
| 3,262,359 | 7/1966 | Capenter | 350/247 UX |

*Primary Examiner*—David Schonberg
*Assistant Examiner*—Toby H. Kusmer
*Attorney*—Lerner, David & Littenberg

[57] ABSTRACT

A system to reconstitute an image to point-by-point two dimensional correspondence with an object by processing overlapping blurred image discs which result from the aberration and diffraction of point sources and reconstituting these blurred discs into individual image points free of diffraction and aberration defects so as to provide a true point by point correspondance with the original object. Reconstitution of the blurred discs into individual image points is achieved by a series of one or more nutations, amplifications and denutations, mathematically, photographically, mechanically or electronically (or any combination thereof) of the entire image followed by a final point-by-point retrieval of the image points.

16 Claims, 148 Drawing Figures

INVENTOR
MILTON KAPLAN
BY
Lerner, David, & Littenberg
ATTORNEYS

IMAGE RECONSTITUTION SYSTEM

BACKGROUND OF THE INVENTION

The resolution of an optical system may be defined as the smallest interval between nearby points in object space whose images can still be recognized as separate in the image plane. The goal of optical designers is to approach a theoretically perfect optical system which can produce point-by-point correspondance between object and image. The finest optical systems, however, are subject to a resolution limitation where the image of a point is a spot, so that all points in the object will correspond to spots in the image.

The resolution limit of a given system is reached when nearby points in an object are imaged as spots that are barely distinguishable as separate. The resolution limit of a system is exceeded when object points are too close to one another and their corresponding image spots are indistinguishable as separate because of a brightness overlap. Any increase in the magnification of this image will only result in a larger picture of overlapping spots that are still indistinguishable as separate.

One example of the futility of extra magnification is a highly magnified newspaper photograph. Magnification, in this case, merely enlarges each of a large number of individual black dots of varying size, so that extra magnification may be described as "empty," since no more detail is revealed. Therefore resolution – not magnification is the primary factor which determines the amount of information in the image formed by a given optical system.

Abberration and diffraction are basic optical system limitations which contribute to the production of a spot image of a point object. Diffraction can be minimized by increasing the diameter of the aperture relative to the focal length of the system. There is a limit beyond which the diameter of a lens can not be increased without changing its focal length. The optical geometry prevents any aperture increase beyond the limit, without increasing the focal length of the system, which is counter-productive.

Aberration can be minimized by calculating the optimum lens design. Since decreasing aberration beyond the diffraction limit is pointless, the goal of most optical designers is to approach the diffraction limit of a system by minimizing its aberrations. Diffraction is considered to be the absolute limit to the resolution of a given system.

The condition for the resolution of two points is expressed by the following formula (formula 1):

$$x=(1.22f'w)/d \quad (1)$$

where:

$x$ = the separation between two points,
$f'$ = *the focal length of the system,*
$w$ = the wave length of light,
$d$ = the diameter of the entrance pupil.

If an opaque disc with a 1 mm. diameter pinhole is placed before a normal human eye, the visual system is still able to correctly interpret letters of size 20/15 by the Snellen notation. However, the application of formula 1 indicates that the normal human visual system should only be able to resolve Snellen letters of 20/60 at best.

This simple experiment indicates that the currently constituted theoretical limits of resolution can be exceeded, in fact, at any time by the human visual system.

Further, spherical aberration is another limitation to the resolving power of the eye. Theoretically, considering the spherical aberration of the normal human eye, one should not be able to see better than Snellen 20/80. However, in fact, the normal human eye can see Snellen 20/15. A discussion of the effects of spherical aberration on the human visual system can be found in my article "A New Theory of Dynamic Visual Resolution And Corneal Accommodation," published in successive issues of Volume 56 of The Optometric Weekly from Sept. 16, 1965 through Dec. 7, 1965.

A model of how the normal human visual system can, in fact, resolve far in excess of its theoretical limits demonstrates how it is possible to resolve heretofore unresolvable images. A system was evolved by the simulation of the physiological, compensatory mechanisms thought to be responsible for the high resolution capabilities of the human visual system.

SUMMARY OF THE INVENTION

The invention is directed to a means for reconstituting an image to point-to-point two dimensional correspondence with an object by processing overlapping blurred image discs which result from motion aberration and/or diffraction of point sources and reconstituting these blurred discs into individual image points free of motion diffraction and/or aberration defects. Thus, a picture taken from a space satellite and magnified to the point of empty magnification can be further resolved by utilizing the process of the present invention to get substantially more detail by going beyond the presently known theoretical limits of resolution. This is achieved by nutating the "empty" magnified overlapping image disc complex until the center of the resultant point spread function of each disc is depressed at a predetermined rate, i.e., the greatest rate of change; amplifying the resultant point spread function by multiplying by an amplification factor which satisfies fixed criteria and finally denutating the amplified point spread function and determining whether certain criteria have been met so that a final determination can be made as to whether the result is in point-by-point correspondance with the object or whether additional processing need be effected.

If additional processing need be effected, then the nutated, amplified, denutated point spread function complex is then a. nutated again until the center of the second resultant point spread function of each disc is depressed at a predetermined rate;
b. amplifying the second resultant point spread function by multiplying by the amplification factor which satisfies the fixed criteria; and
c. denutating the amplified second resultant point spread function and determining whether the fixed criteria has now been met.

This process is continued until all of the criteria are met resulting in a separation of the original source of light into its original point sources. This is accomplished for an entire photograph so as to increase the resolution thereof.

Nutation as used herein is defined as moving a pattern in an annular path while maintaining its spatial orientation. Thus the pattern will maintain a fixed angular relation with the spatial coordinates of the system as it moves in an annular path in said system. Nutation of a pattern may be accomplished mathematically or electronically as well as physically.

FIG. 1 is a diagrammatic representation of a projector including a cutaway portion of a film strip 20. The entire strip of film consists of three separate frames, all opaque. The first frame contains one hole, the second frame two holes and the third frame three holes. Also shown is a defocusing lens 24 and a defocusing plate 25. The defocusing lens, when used, is affixed by tape to the end of the projector tube 26. The defocusing plate 25, when used, is held in position by a ring stand.

FIG. 2 is a diagrammatic representation of a nutation device. The purpose of this device is to nutate a clip-board so that it moves in a circular pattern while maintaining its spatial orientation. The motion of the clip-board is akin to a window washer's hand motion as he washes a window.

The nutation device of FIG. 2 is generally designated by the numeral 30. The device 30 includes a motor housing 32, containing a 9 rpm. motor (not shown) which drives a shaft 34. At the end of the shaft 34 is a nutation arm 36 which has a slot 38 therein. It is possible to vary the effective length of the nutation arm by moving a pin carriage device 40 along the slot 38 and locking it into the desired position by tightening the adjustable screw assembly 42. Thus, the pin carriage device supports, on a suspension pin 44, the clip-board 46 on which is mounted a sheet of photosensitive paper 48. The entire device is, of course, mounted on a suitable frame 50. It will be seen that, as the motor rotates, the clip-board will be maintained in a vertical position by gravity. The clip-board moves about a path defined by the radius which equals the distance between the suspension pin 44 and the motor shaft 34. This is the radius of nutation.

Physiological nystagmus, as discussed in Adler's Physiology of the Eye, 3rd Edition, is a rapid oscillitory movement of the normal human eye, consisting of four different types of motions, superimposed on one another. The smallest, most rapid of these motions has a frequency of somewhere between 30 and 70 cycles per second. The effect of physiological nystagmus on the resolution of the human visual system can be simulated by a nutational motion to more or less summarize the various nystagmoid motions of the eye during a complete cycle. It was pointed out in my previously mentioned paper "A New Theory of Dynamic Visual Resolution And Corneal Accommodation" that the magnitude of the disc of minimum confusion arising from spherical aberration should prevent good visual resolution. It was further pointed out that the physiological nystagmoid motions, by moving the blur circle within a small area of retina, could cause the stimulation of only one or a few retinal elements by a large blur circle. It was reasoned that only the central element or elements would be constantly illuminated throughout the physiological nystagmoid motion cycle. Although many retinal elements lie in the path of the large moving blur circle during the physiological nystagmoid cycle, only the central element or elements would be constantly illuminated, and because of the all or none law of physiology, only these elements would be excited, whereas the stimulation to peripheral elements would be subliminal, resulting in their remaining "turned off." If the physiological nystagmoid motion were sufficiently great, or if the nutation which simulates this motion had a sufficiently large radius, then the central elements would not be exposed to the incoming light rays. Therefore, it was pointed out that there must exist some form of relationship between the amplitude of the physiological nystagmoid motions, or, in this experiment, the radius of nutation and the nature and degree of blur.

In order to better understand the function of the apparatus shown in FIG. 2, and the utilizing of nutation in resolving blurred images, the following series of figures have been designed to portray the reconstitution of a defocused spot such as produced by certain aberration-limited systems where the disc of minimum confusion has uniform brightness.

In FIG. 3, there are shown three circles designated *a*, *b* and *c*. Circle a represents a round object radiating light of uniform intensity — or a perfect image of this object. Circle *b* represents the defocused image of object spot *a* attained by placing the defocusing lens 24 of FIG. 1, across the tube 26 of the projector 22, imaging the single hole in the first opaque frame of film strip 20. Circle *c* is the central area of the photosensitive paper 48 mounted on the clip-board 46 shown in FIG. 2. Either nutating the object spot (the entire projector or the film strip within) relative to the photosensitive paper, or, in the alternative, nutating the image plane (the clip-board on which the photosensitive paper is mounted) relative to the object spot, will result in the same exposure. Therefore, in the following discussion, for the purposes of clarity, the light source will be assumed to nutate relative to the photosensitive paper of fixed position. Spot *c* on the photosensitive paper is then defined as being maintained in a fixed position. The radius of spot *c* has been drawn to correspond to the radius of nutation, and the defocused light spot *b* shown in FIG. 3 nutates relative to the photosensitive paper — the circumference of nutation corresponding to the circumference of spot *c*.

In FIG. 4, spot b is shown in three "stop" positions of nutation, 120° apart, relative to fixed spot *c* during one complete cycle of nutation. The heavy line circles of FIG. 4 represent the circumscribed central area *c* of the photosensitive paper as differentiated from the thin line circles representing defocused light spot *b* in each of the three stop positions relative to central area *c* of fixed position in FIG. 4.

In FIG. 5, three additional stop positions of the defocused spot *b* are shown, with respect to the central area *c* of fixed position during one complete cycle of nutation. Thus, in FIG. 4 and FIG. 5 there are shown six different stop positions, 60° apart, of the defocused spot *b* with respect to the same central area *c* of the photosensitive paper. In FIG. 4 and FIG. 5, each of the different positions of defocused spot *b* with respect to area *c* has been designated by a different numeral; for example the first, uppermost position of defocused spot *b* in FIG. 4 has been designated as *b*1. The second position, where there has been a 120° clockwise nutation of defocused spot *b*, has been designated as *b*2, and the third position in FIG. 4, where defocused spot *b* has been nutated 120° still further, has been designated as *b*3. In FIG. 5, *b*4 designates the position of defocused spot *b*, lowermost in relation to area *c*, *b*5 designates the next position of defocused spot *b* after a 120° clockwise nutation, and *b*6 designates the position after a further 120° clockwise nutation relative to fixed area *c*.

In FIG. 6, stop positions *b*1, *b*2 and *b*3 have been superimposed within area *c*. This superimposition may be said to have occurred as a result of multiple exposure during one complete nutation cycle of spot *b* relative to area *c*. It may be seen that, as a result of overlap of the multiple exposures, only the central triangle, designated by the numeral *bs*1 is totally illuminated during the entire cycle of nutation. Thus, since defocused spot *b* was of uniform illumination, central spot bs1 receives more illumination than any other portion within area *c*. Similarly, as shown in FIG. 6*b*, which demonstrates a superimposition of spots *b*4, *b*5 and *b*6, the central triangle *bs*2 is also the only portion within the area *c* which is illuminated in all three stop positions of defocused spot *b*. It can thus be shown that, as has been indicated in FIG. 6*c*, that if all the sub-areas of lesser illumination are eliminated within area *c*, leaving only the area of constant illumination at the center of area *c*, central spot *bs* is formed. Central spot *bs* is, in fact, the center of the area exposed by the nutation of defocused spot *b*, and is considerably reduced in size compared to defocused spot *b*, and simulates the original spot a as shown in FIG. 3.

FIG. 7, FIG. 8 and FIG. 9 are actual exposures of the image of the single hole in the opaque first frame of film strip 20, projected through projector 22 onto photosensitive paper 48.

Figure 2:
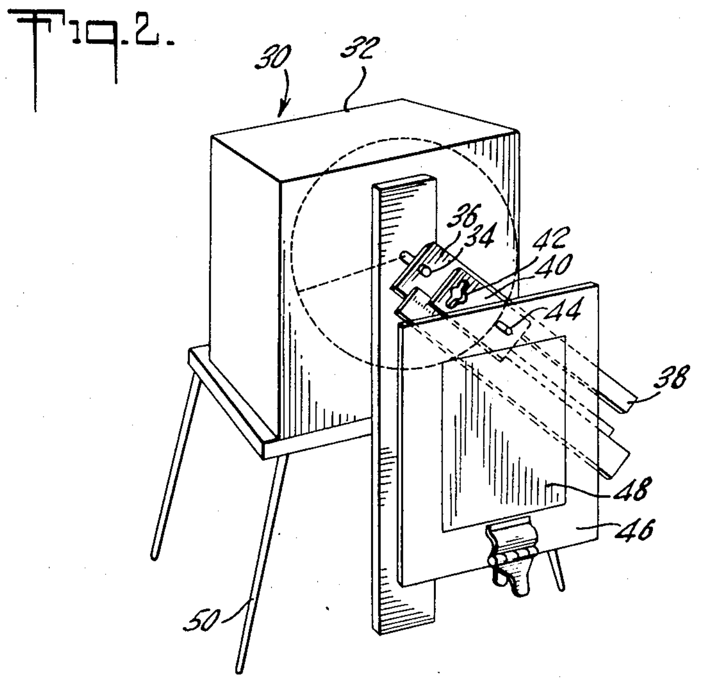
Figure 3:
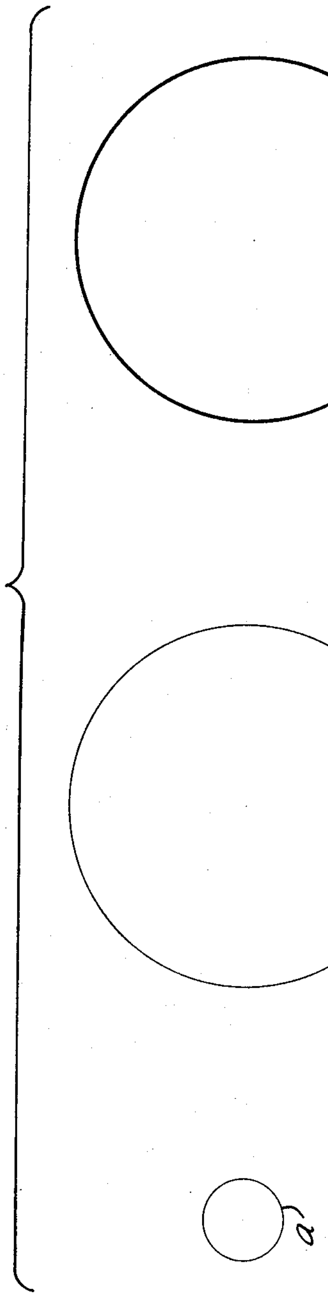
Figure 4:
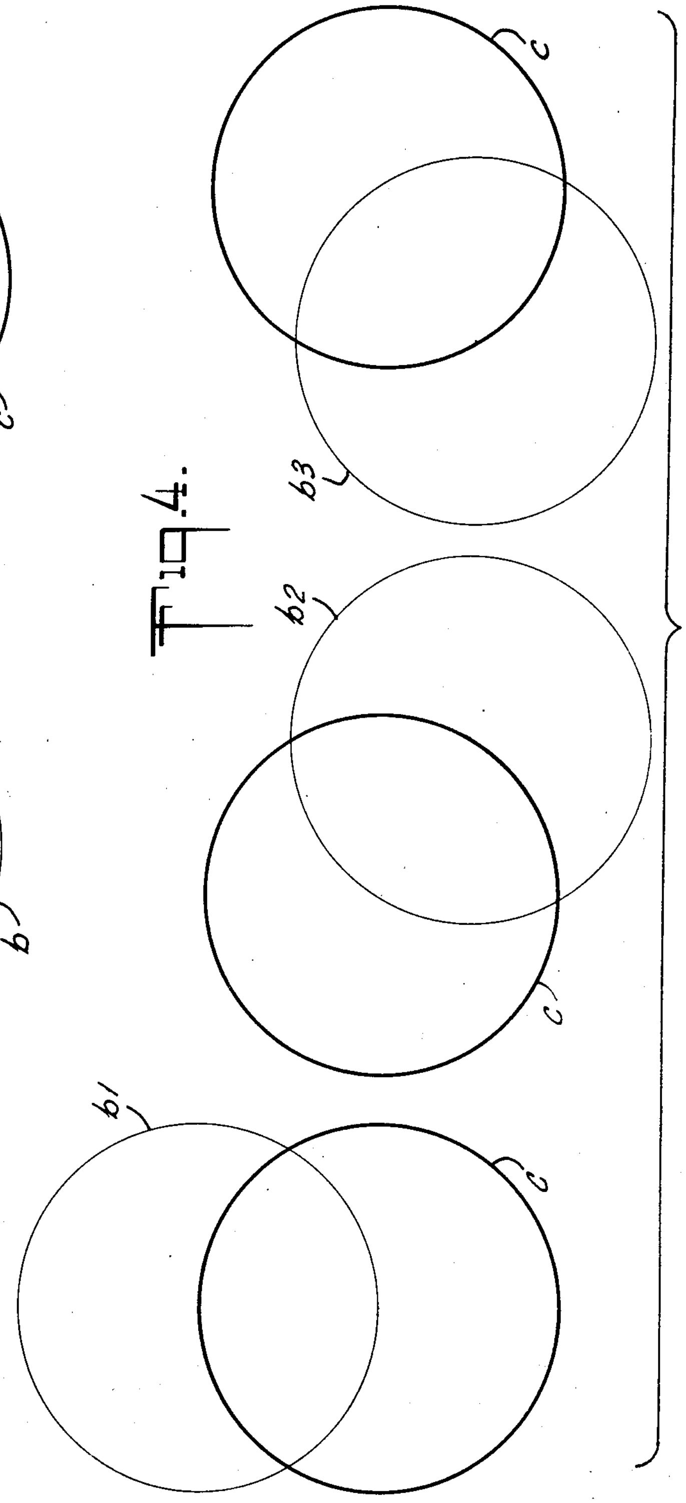
Figures 5, 6A, 6B, 6C:
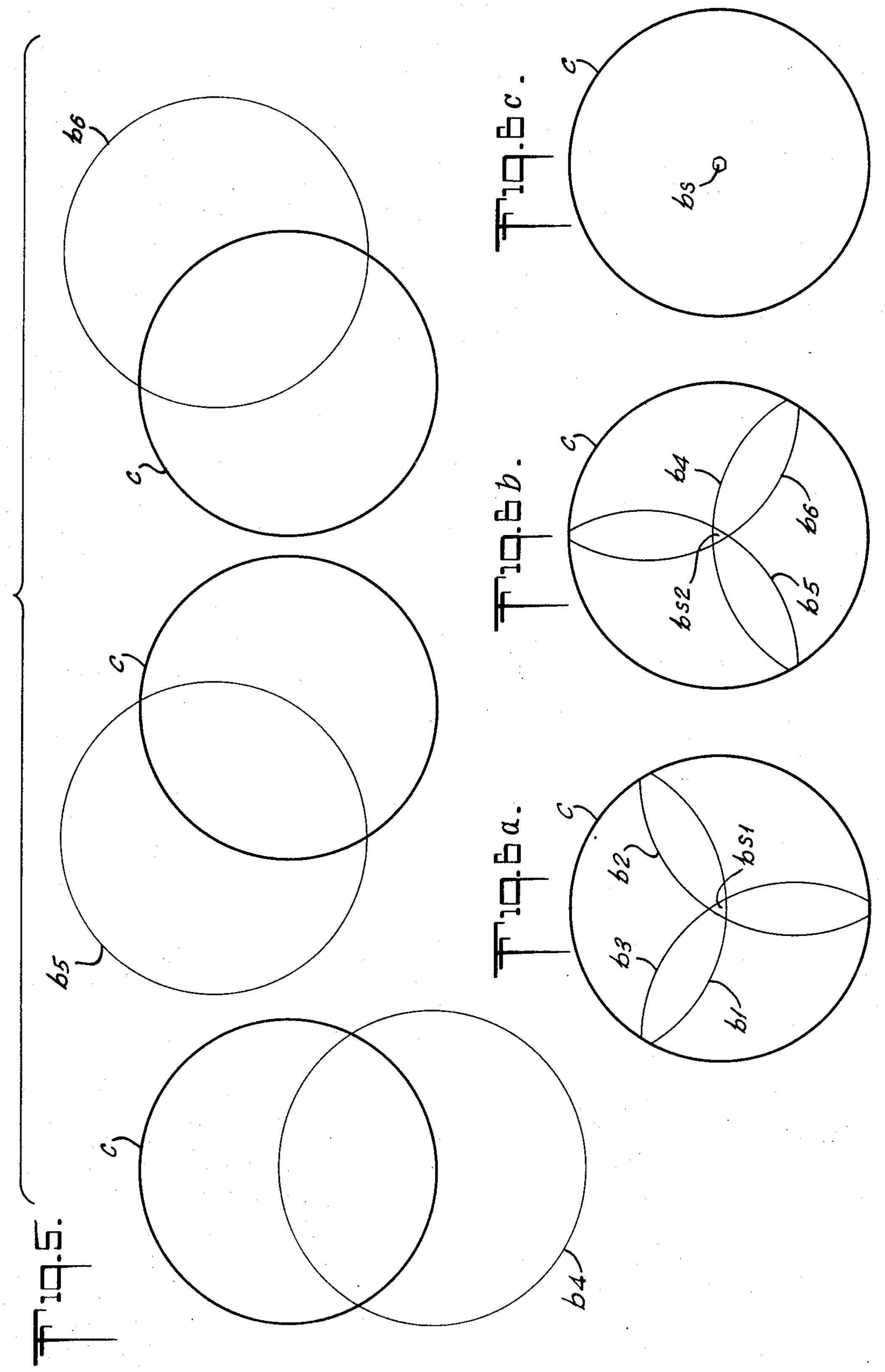
Figure 7:
FIG. 7 is a still (non-nutated), clearly focused (non-filtered) exposure of the single spot, utilizing the apparatus in FIG. 1 and FIG. 2.
Figure 8:
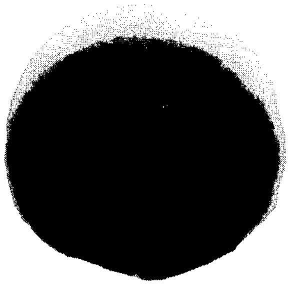
FIG. 8 is also a still (non-nutated exposure of the single spot shown in FIG. 7 before defocusing. However, in FIG. 8, the optical system was defocused by a +0.50 spherical opthalmic lens affixed to the projector tube end 26.
Figure 9:
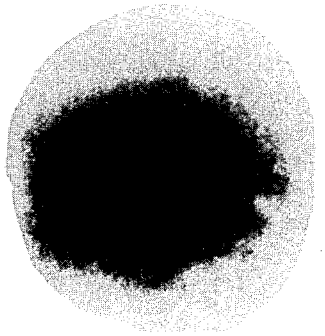

FIG. 9 shows the defocused spot of FIG. 8 which has been circularly nutated with a radius of nutation of 21 mm. utilizing the apparatus of FIG. 2. As discussed in the description of FIG. 4 through FIG. 6, the central portion of this exposure was constantly illuminated throughout the nutation. Therefore, as a result of exposure with nutation, the central area of maximum exposure is, in fact, a reconstitution of the original single spot shown in FIG. 7. A later discussion will indicate the means for eliminating the peripheral gray areas and for sharpening the spot border shown in FIG. 9, to correspond to the original still clear-focus exposure of FIG. 7.

Figure 10:
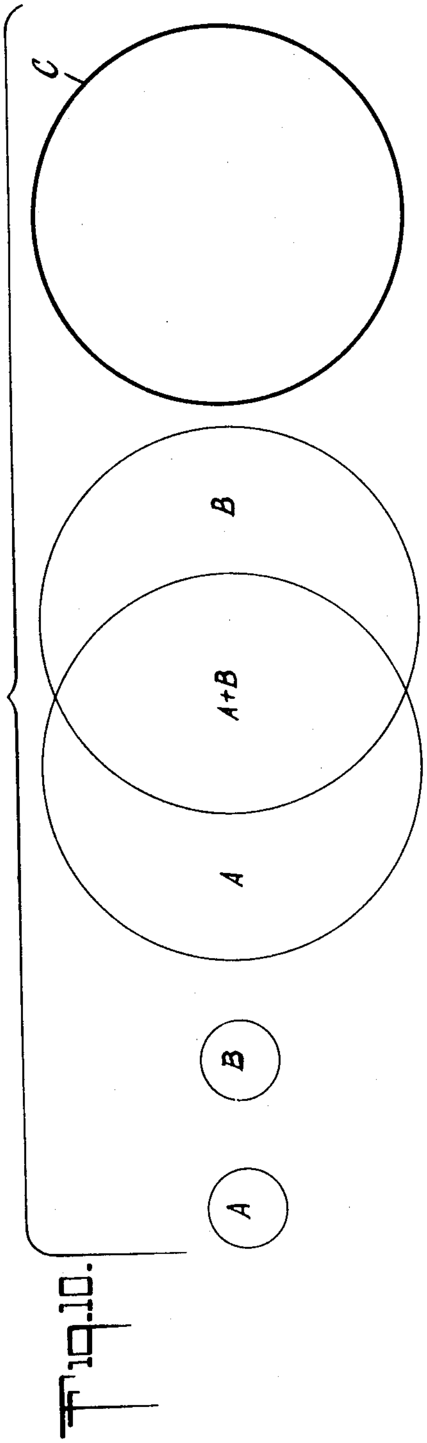

FIG. 10*a* portrays two spots, A and B, which represent object spots of uniform intensity. These spots simulate the image of the two holes of the second opaque frame of film strip 22.

Figure 1:
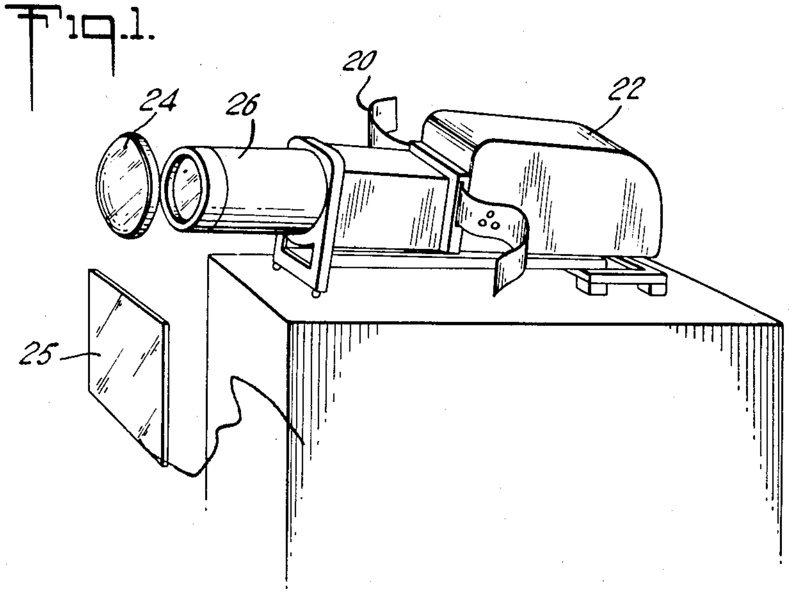

FIG. 10*b* represents a defocused image of spots A and B, achieved by positioning the defocusing lens 24 of FIG. 1, at the end of tube 26 of the projector 22. Thus, it can be seen that in FIG. 10*b*, these two defocused spots A and B overlap one another in the area (A + B) as shown. When A and B are defocused, it is difficult to discriminate the two spots as being separate because of the continuity of illumination and the central portion (a + B) of higher intensity.

In FIG. 10*c*, circle *c* is the circumscribed central area of the photosensitive paper 48, mounted on the clip board 46, shown in FIG. 2. The circumference of circle *c* is also equal to the circumference of nutation. Again, it will be noted that in the following description, for purposes of clarity, the light source is assumed to nutate relative to the photosensitive paper of fixed position. This assumption is held to be valid, since movement of the stimulus relative to the receptor, results in the same exposure as the movement of the receptor relative to the stimulus, in this case the two spot image being the stimulus and the photosensitive paper the receptor.

Therefore, it is assumed that central area *c* of the photosensitive paper is fixed, and the defocused light spots A and B, as shown in FIG. 10*b* are, in fact, nutating relative to the fixed area *c*.

Figure 11B:
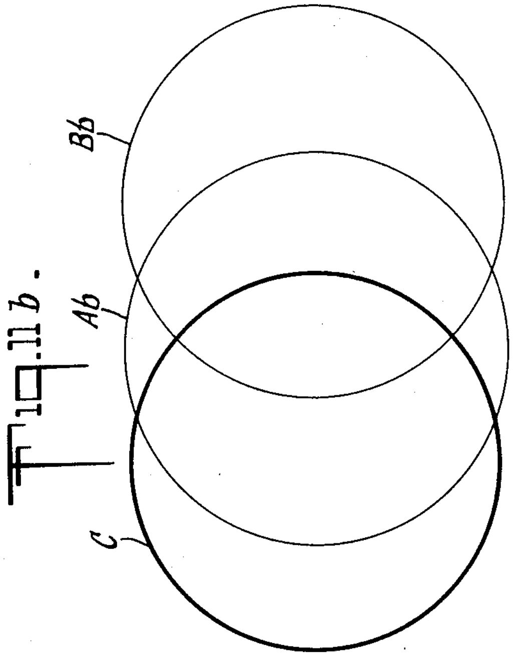
Figure 11A:
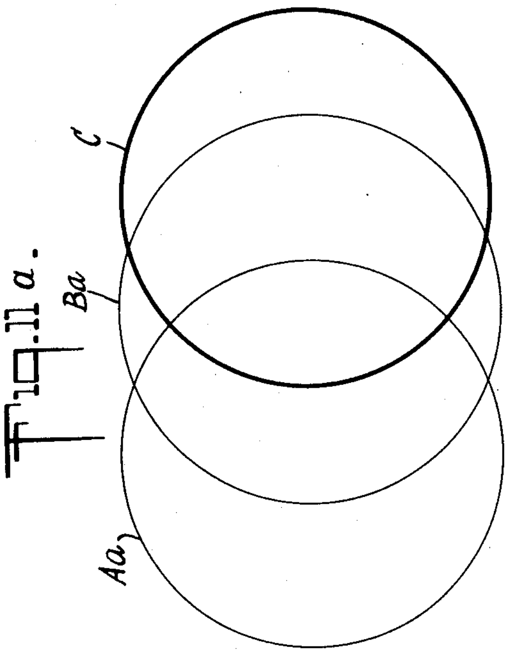
Figure 11D:
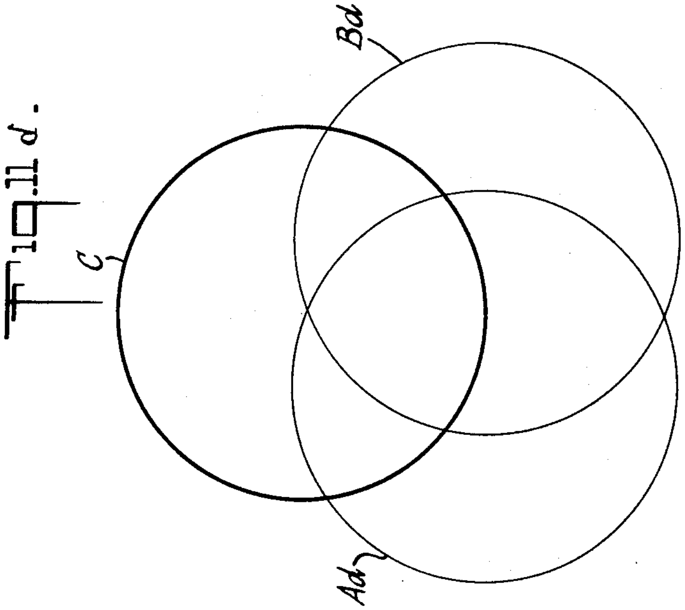
Figure 11C:
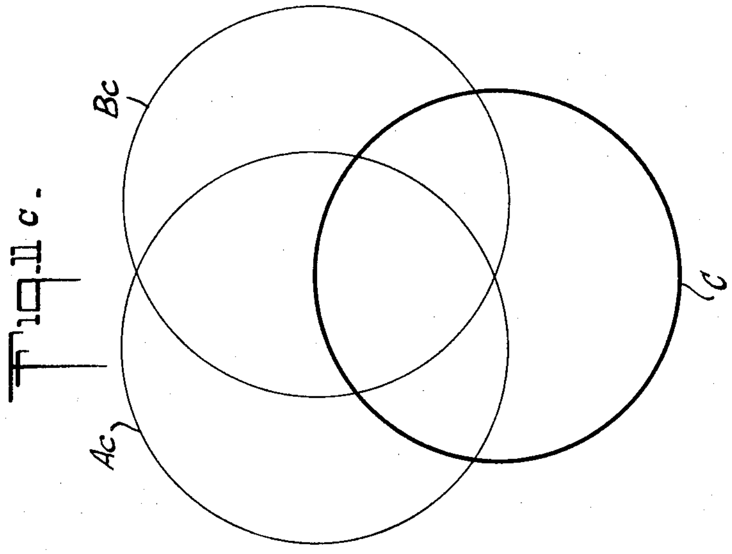

Four stop positions during the complete cycle of nutation of the defocused spots A and B relative to the fixed area *c* of the photosensitive paper are shown in FIGS. 11*a*, 11*b*, 11*c* and 11*d*. For purposes of clarity, the positions of spots A and B in FIG. 11*a* have been noted as A*a* and B*a*; position of spots A and B in FIG. 11*b* have been noted as A*b* and B*b*; the positions of A and B have been noted in FIG. 11*c* as A*c* and B*c*; and the position of spots A and B in FIG. 11*d* have been noted as A*d* and B*d*. The positions of spots A*a*, B*a*; A*b*, B*b*; A*c*, B*c*; and A*d*, B*d* are 90° apart around the circumference of nutation, the circumference of area *c* on the photosensitive paper. These figures are a diagrammatic representation of four stop positions during one complate cycle of nutation of defocused spots A and B within the area *c*. In FIG. 12*a*, the defocused spots A and B in the positions as shown in FIG. 11*c* and FIG. 11*d*, have been superimposed.

It can be seen that there are two areas in FIG. 12*a* which are illuminated whether the defocused spots A and B are in the position shown in FIG. 11*c*, or in the position shown in FIG. 11*d*. These two zOnes of overlap have been cross-hatched for purposes of clarity, and are akin to the shape of a bow tie, with one side formed by the overlap of defocused spot A in positions A*c* and A*b*, and the other side formed by defocused spot B in positions B*c* and B*d*.

Figure 12B:
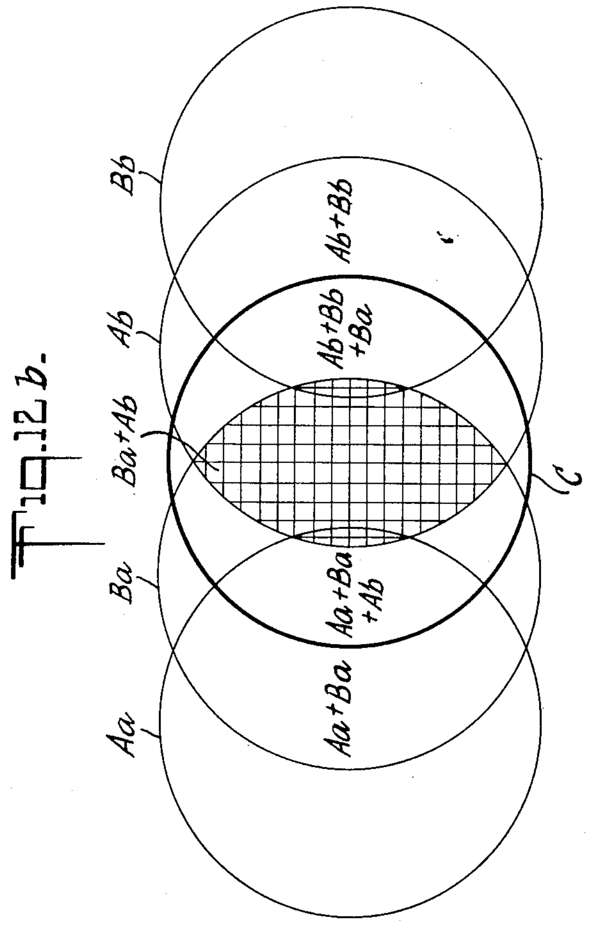
Figure 12A:
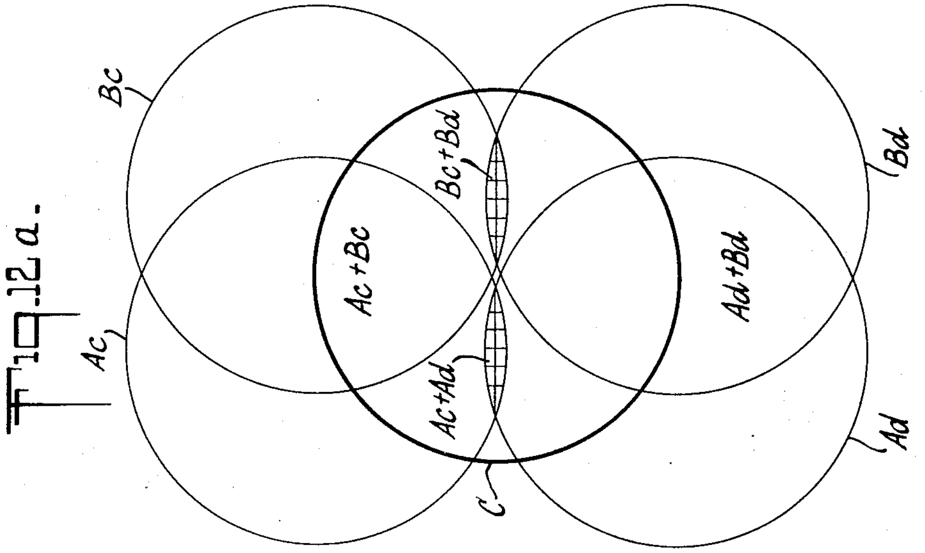

Similarly, FIG. 12*b* is a superimposition of the defocused spots A and B shown in FIG. 11*a* and FIG. 11*b*. Thus, it can be seen in FIG. 12*b* that the position of defocused spots A and B in FIG. 11*a* and their positions in FIG. 11*b*, overlap in a central zone which is illuminated in both positions. This zone results from the overlap of B*a* and A*b*. Further, it may be noted that within the area of overlap of B*a* and A*b*, there is one sub-zone of treble illumination as a result of the overlap of A*a*, B*a* and A*b*; also another sub-zone as a result of the overlap of A*b*, B*b* and B*a*.

Figures 13A, 13B, 13C, 14A, 14B, 14C, 14D:
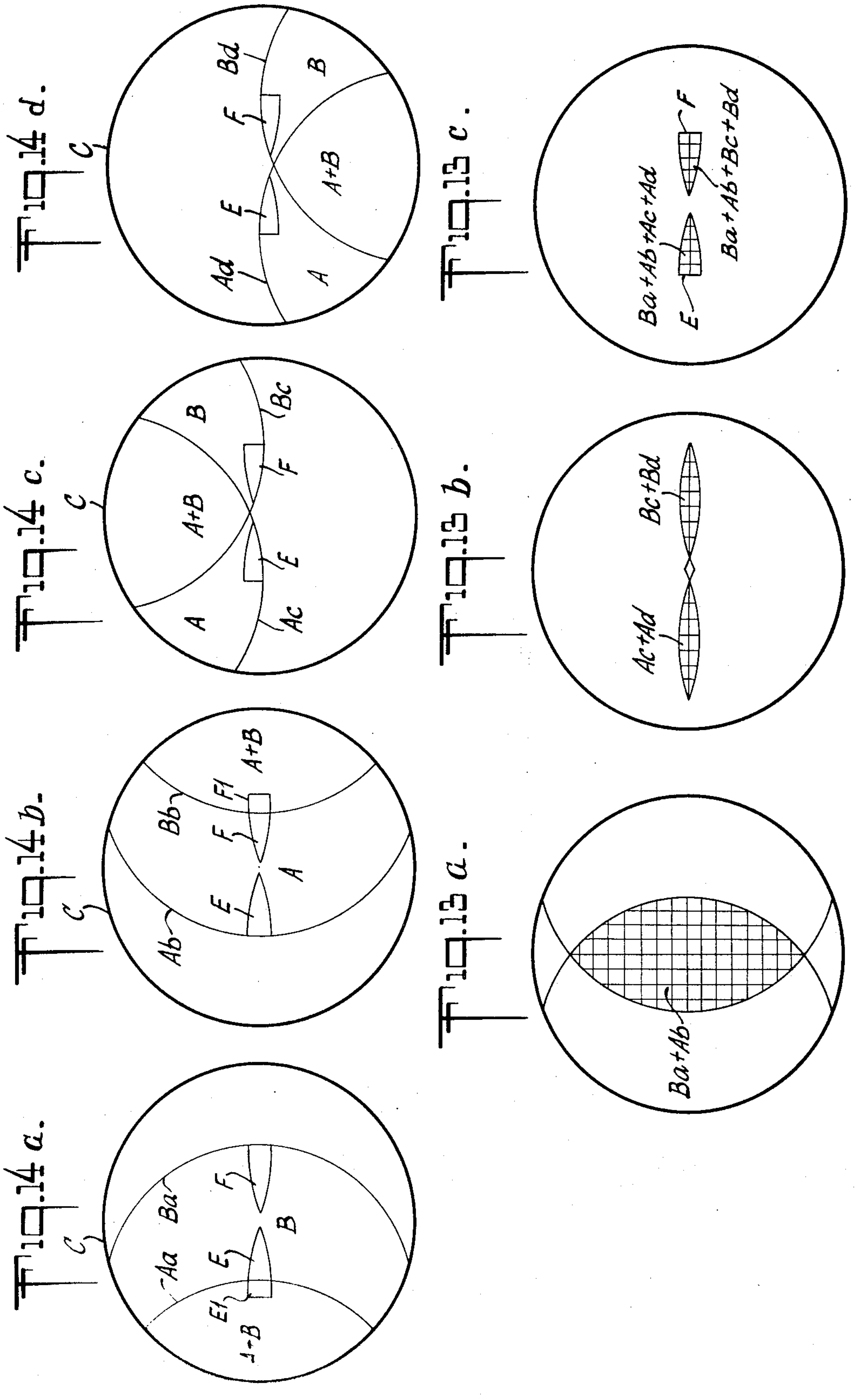

FIG. 13*a*, FIG. 13*b* and FIG. 13*c* contain the zones of overlap shown in FIG. 12*a* and FIG. 12*b*, eliminating those areas where constant illumination did not occur. Thus, only the cross-hatched area of FIG. 12*b* is shown in FIG. 13*a*, and only the cross-hatched area of FIG. 12*a* is shown in FIG. 13*b*.

The total area of constant illumination during the four selected stop positions of one complete cycle of nutation of defocused spots A and B is shown in FIG. 13$c$, this area determined by superimposing FIG. 13$a$ and FIG. 13$b$. Thus, the two areas of constant illumination formed in FIG. 13$c$ are designated area E on the left, resulting from illumination by B$a$, A$b$, A$c$ and A$d$, this illumination received in all four stop positions in one complete cycle of nutation of defocused spots A and B as shown in FIG. 11$a$ through 11$d$, and area F, shown in FIG. 13$c$, having been illuminated by B$a$, A$b$, B$c$ and B$d$. Area F was also illuminated in all four stop positions during one complete cycle of nutation of the defocused spots A and B, shown FIG. 11$a$ through FIG. 11$d$.

Areas E and F are shown in FIG. 14$a$ through 14$d$. FIG. 14$a$ through FIG. 14$d$ are similar to FIG. 11$a$ through 11$d$. All matter outside of the area $c$ has been eliminated for purposes of clarity, and, additionally, areas E and F have been shown for the determination of the distribution of illumination within areas E and F during one complete cycle of nutation. It will be noted that the left hand tip of area E, designated as E1, is illuminated in FIG. 14$a$ by both spots A and B, since E1 lies within the overlap of defocused spots A and B. In the remaining positions, FIG. 14$b$, FIG. 14$c$ and FIG. 14$d$, E1 is illuminated by only spot A or spot B. Thus, if one were to assign a unit value of "1" to the amount of illumination from defocused spot A or B in one stop position, then during one complete cycle of nutation, area E1 would receive five units of illumination. The remaining portion of area E will only receive four units of illumination during the complete nutation. Similarly, area F has sector F1 shown in FIG. 14$b$. In this figure, overlapping defocused spots A and B doubly illuminate F1. It will be seen that F1 receives a total of five units of illumination from the four stop positions during one complete cycle of nutation, while the remaining portion of area F receives only four units of illumination in the same circumstances. Thus, a selection of only the brightest areas of illumination during one complete cycle of nutation of defocused spots A and B, results in sectors E1 and F1 and, thus, these sectors constitute a resolution of defocused spots A and B within area $c$ of the photosensitive paper. This correspondance with original object spots A and B is, of course, subject to the problem of the gray surround of sectors E1 and F1. The procedure for the elimination of these spurious surrounds will be shown in a later discussion.

Figure 15:
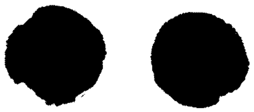
Figure 16:
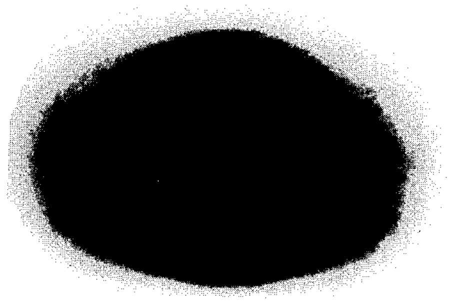
Figure 17:
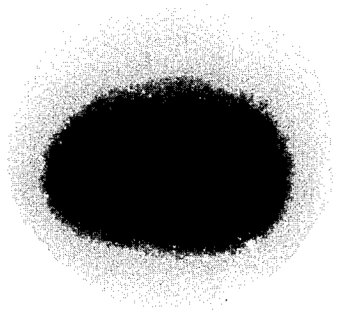

FIG. 15, FIG. 16 and FIG. 17 are actual exposures of the image of the two holes in the opaque second frame of film strip 20, projected through projector 22 onto photosensitive paper 48.

FIG. 15 is a still (non-nutating), clearly focused (non-filtered) exposure of the two spots utilizing the apparatus in FIG. 1 and FIG. 2.

FIG. 16 is also a still (non-nutating) exposure of the two spots shown in FIG. 15. However, in FIG. 16, the optical system was again defocused, just as in FIG. 8 by a +0.50 spherical ophthalmic lens affixed to the projector tube end 26. FIG. 17 shows the defocused two spot design of FIG. 16 which has been circularly nutated with a radius of nutation of 21 mm. utilizing the apparatus of FIG. 2. The same technique was employed as described for FIG. 9.

The exposure after nutation shows two areas of superimposition, as discussed in the text applying to FIG. 10 through FIG. 14. These maximally illuminated spots are equivalent to and represent the reconstitution of the original two spot "object" shown in FIG. 15. Thus, in effect, demonstrates the results described with respect to FIG. 14 in areas E1 and F1. As previously out in the discussion of FIG. 7 through FIG. 9, a later discussion will indicate the means for eliminating the peripheral gray areas and for sharpening and crispening the spot borders shown in FIG. 17, to correspond to the original clear-focus exposure of FIG. 15.

Figure 18C:
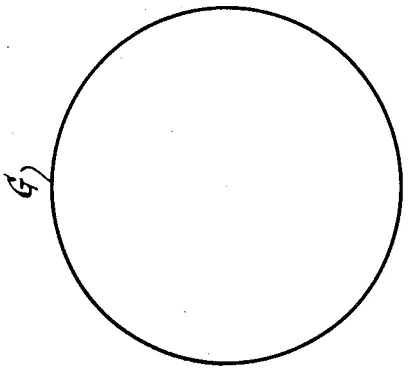

FIG. 18$a$ portrays three spots, A, B and C, which represent object spots of uniform intensity. These spots simulate the image of the three holes of the third opaque frame of film strip 22. FIG. 18$b$ represents a defocused image of spots A, B and C, achieved by positioning the defocusing lens 24 of FIG. 1, at the end of the tube 26 of the projector 22. Thus, it can be seen that in FIG. 18$b$, these three defocused spots, A, B and C overlap one another, resulting in areas of additive brightness. There are three areas of double brightness, areas (A +B), (A + C), and (B + C); and there is one area of treble brightness — namely area (A + B + C ).

When spots A, B and C are defocused, it is difficult to discriminate the three spots as being separate because of the continuity of illumination and the central portion of varying intensity.

In FIG. 18$c$, circle c is the circumscribed central area on the photosensitive paper 48, mounted on the clipboard 46, shown in FIG. 2. The circumference of circle c is also equal to the circumference of nutation. It will be noted that in the following description, for purposes of clarity, the light source is assumed to nutate relative to the photosensitive paper of fixed position. The validity of this assumption has already been discussed. Therefore, it is assumed that the central area $c$ of the photosensitive paper is fixed, and the defocused light spots A, B and C shown in FIG. 18$b$ are, in fact, nutated relative to the fixed area $c$.

FIGS. 19$a$ through FIG. 19$f$ are a series of diagrams in the same logic sequence as those of FIG. 11$a$ through FIG. 11$d$. FIG. 19$a$ through FIG. 19$f$ demonstrate six different stop positions during one complete cycle of nutation of the defocused spots A, B and C with each position of the three spots designated by a subscript indicating a particular position. That is, spots A, B and C are designated as A$a$, B$a$ and C$a$ in FIG. 19$a$ etc. It will be noted that the six stop positions shown in FIG. 19$a$ through FIG. 19$f$ are 60° apart. The subscripts indicate within area $c$, positions of the defocused spots A, B and C in each stop position shown in FIG. 19.

Figure 20C:
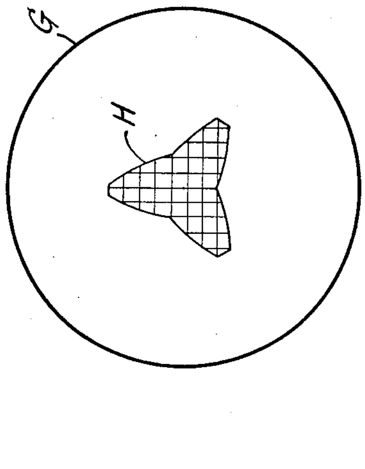
Figure 20B:
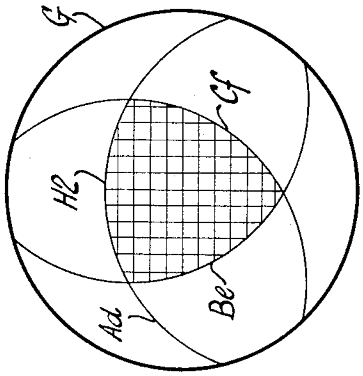
Figure 20A:
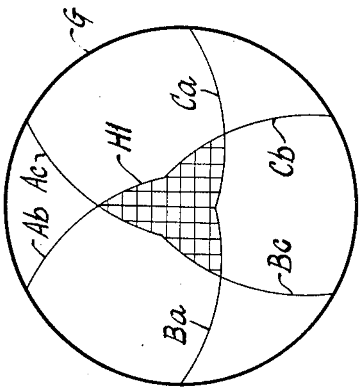
Figure 21A:
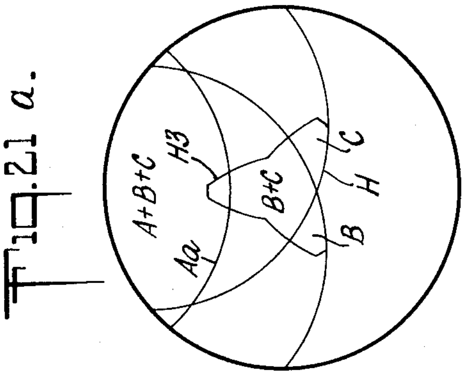
Figure 21B:
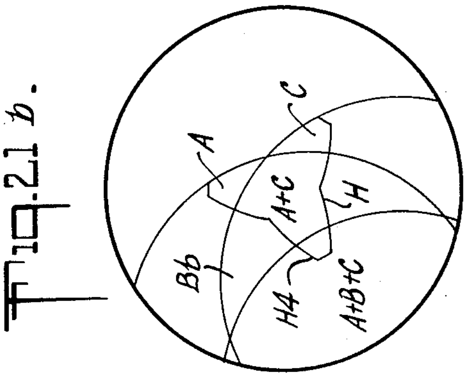
Figure 21C:
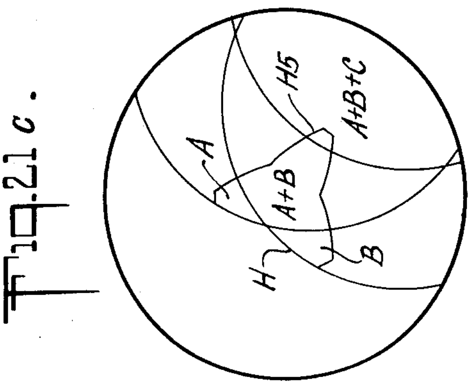
Figure 21D:
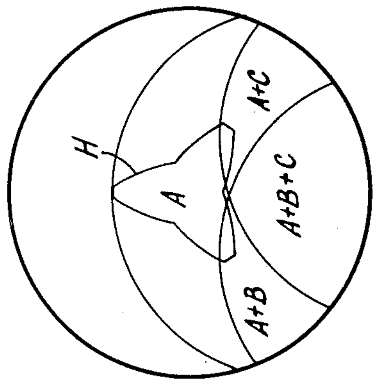
Figure 21E:
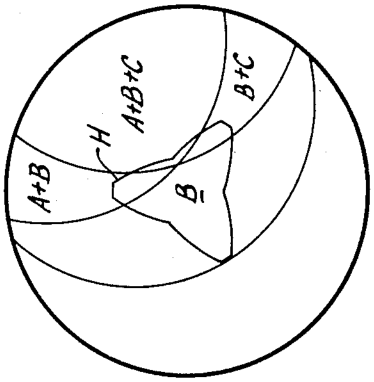
Figure 21F:
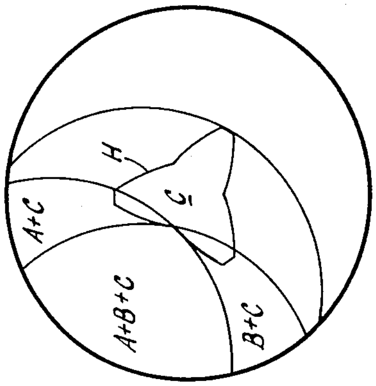

FIG. 20$a$ is similar to FIG. 13$a$, except that FIG. 20$a$ involves the superimposition of three stop positions as shown in FIG. 19$a$, FIG. 19$b$ and 19$c$. It will be seen in FIG. 20$a$, that within area $c$, there is a sector of constant illumination H1 which is, in fact, common to all three stop positions shown in FIG. 19$a$, FIG. 19$b$ and FIG. 19$c$. That is, in all those three positions, the area H1 will be illuminated. Similarly, in FIG. 20$b$, there is shown a superimposition of the three other stop positions of the three defocused spots A, B and C, shown in FIG. 19$d$, FIG. 19$e$ and FIG. 19$f$. The sector of constant illumination shown in FIG. 20$b$ is designated as H2. If the sectors H1 and H2 are superimposed as shown in FIG. 20*c*, the result is a sector of constant illumination H which is a sector of constant illumination in the six stop positions of one complete cycle of nutation of the three defocused spots A, B and C shown in FIG. 18*b*.

FIG. 21*a* through FIG. 21*f* is a series of diagrams similar to those of the two spot configuration series in FIG. 14*a* through FIG. 14*d*. That, is, in each of the figures, FIG. 21*a* through 21*f* the central constantly illuminated area H, discussed previously, has been superimposed upon the six stop positions shown in FIG. 19*a* through FIG. 19*f*, with all of the areas outside of the circumference c eliminated for purposes of clarity. These diagrams will illustrate that the exposure at the tips of the area H is greater than in the central portion thereof, in much the same manner as the sectors E1 and F1 in FIG. 14 was shown to be of greater illumination than the central portion in the areas E and F. For example, considering one sector, H3, defined by the area H and positions A*a* of defocused spot A in FIG. 21*a*, it should be noted that this sector H3 is illuminated by all three defocused spots A, B and C, and thus, if we assume that they are of equal intensity, and if we assign a value of one unit of intensity to each, the area H3 will receive three units of intensity in this stop position. Continuing through the remaining five stop positions in FIG. 21: in FIG. 21*b*, only one unit of intensity will illuminate sector H3; in FIG. 21*c*, again only one unit of intensity will illuminate sector H3; in FIG. 21*d*, only one unit of intensity will illuminate sector H3; in FIG. 21*e*, two units of intensity will illuminate sector H3; and FIG. 21*f*, two units of intensity will illuminate sector H3. Therefore, in the six stop positions of one complete cycle of nutation, H3 receives a total of 10 units of illumination intensity. A similar analysis will demonstrate that both the sector H4 defined by the area H and position B*b* of defocused spot B in FIG. 21*b*, and the sector H5 defined by the area H and the position of C*c* of defocused spot C in FIG. 21*c*, will also receive ten units of illumination intensity during the six stop positions of one complete cycle of nutation of the defocused spots A, B and C of FIG. 18*b*. All other portions of the area H will receive less than 10 units of illumination during one complete cycle of nutation. FOr example, the central portion of the area H, will, in FIG. 21*a*, receive two units of illumination; in FIG. 21*b*, two units of illumination; in FIG. 21*c*, two units of illumination. However, in FIG. 21*d*, FIG. 21*e* and FIG. 21*f*, the central portion will only receive a single unit of illumination during each stop position. Therefore, the central portion of area H receives but nine units of illumination during the six stop positions of one complete cycle of nutation of the three defocused spots A, B and C. Similarly, the remainder of area H of constant illumination will receive less than the 10 units of illumination received in the sectors H3, H4 and H5. Thus, H3, H4 and H5 correspond to the original object spots A, B and C, shown in FIG. 18*a* prior to defocusing.

Figure 18B:
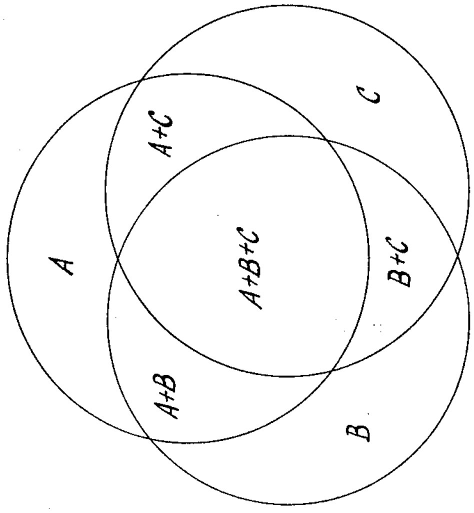
Figure 18A:
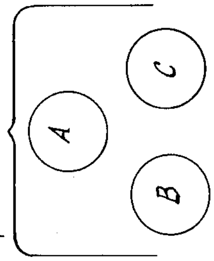
Figures 19A, 19B, 19C:
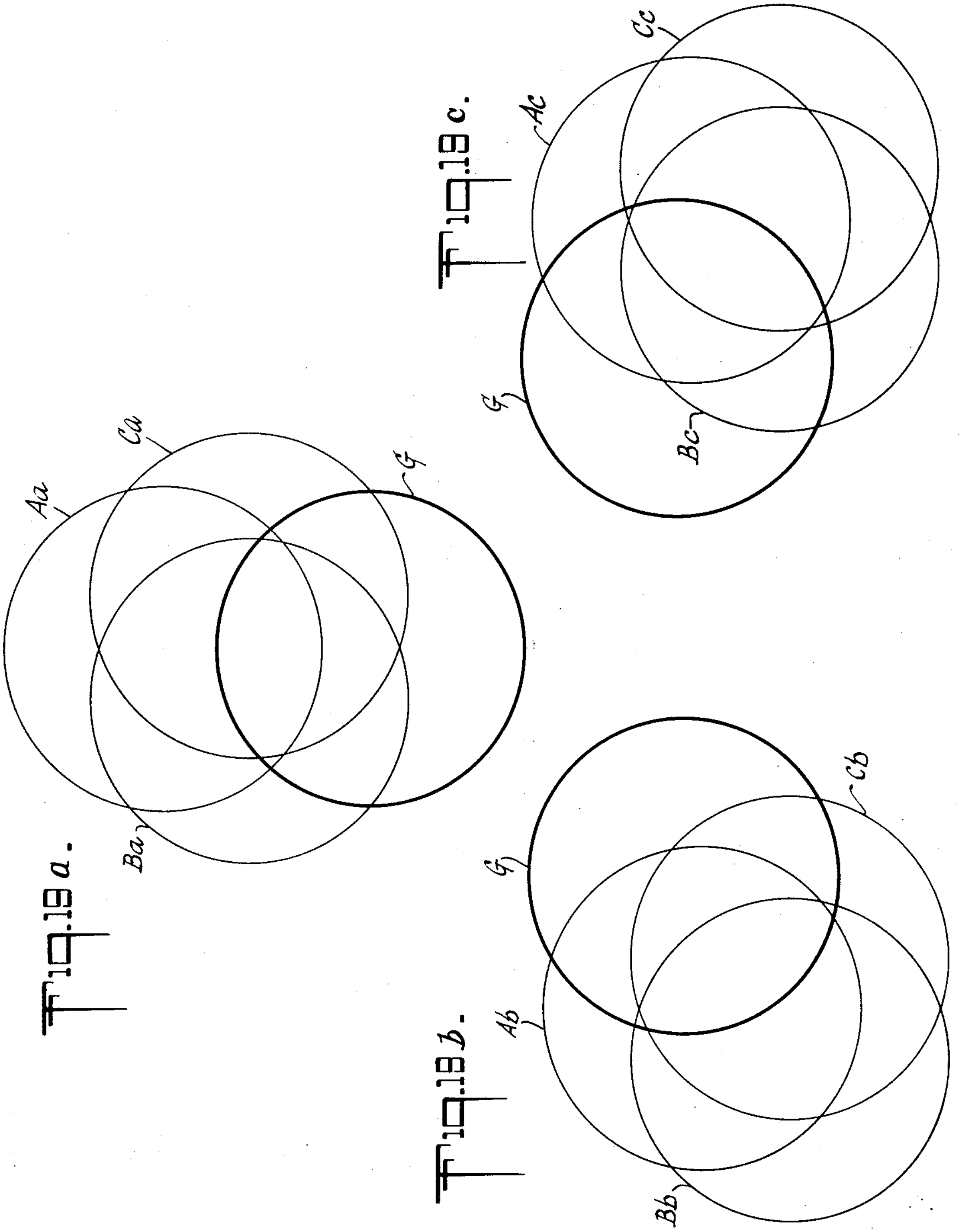
Figure 19F:
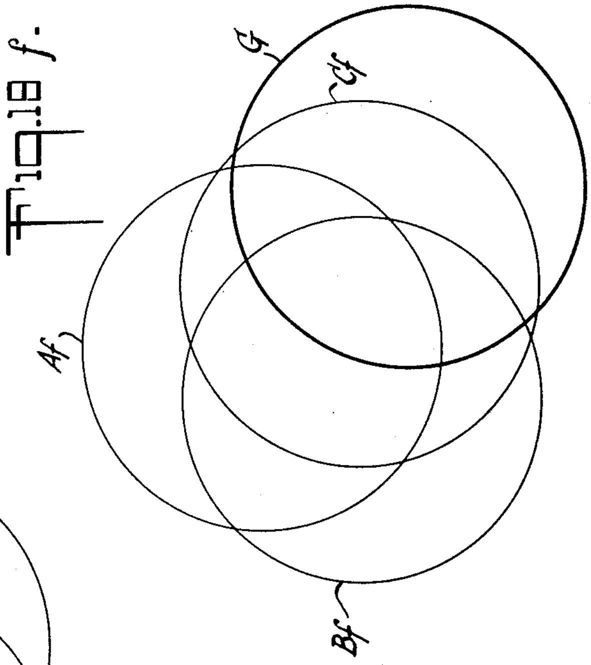
Figure 19D:
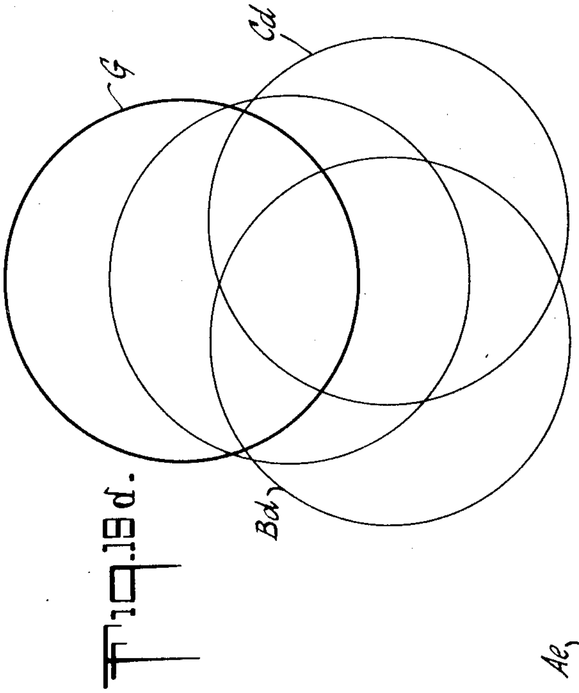
Figure 19E:
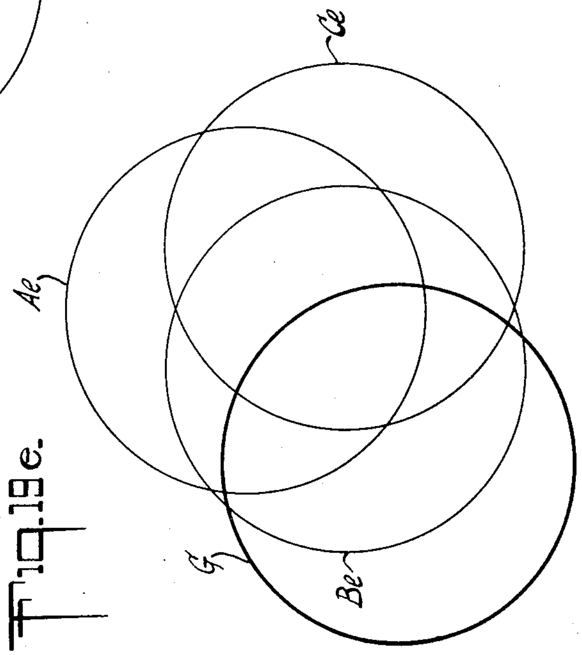

This, then represents a reconstitution of the original spots A, B and C, shown in FIG 18*a* prior to defocusing. This reconstitution has been achieved by nutation of the blurred pattern as shown in FIG. 18*b*. The means for eliminating the gray surround the sharpening the defocused and nutated spot border will be deferred for a later discussion.

Table I shows an analysis of the brightness distribution within area H and sectors H3, H4 and H5 in FIG. 21*a* through FIG. 21*f*.

ANALYSIS OF BRIGHTNESS DISTRIBUTION IN H

| | |
|---|---|
| H3 | 6A + 2B + 2C |
| H4 | 2A + 6B + 2C |
| H5 | 2A + 2B + 6C |
| H−(H3+H4+H5) | 3A + 3B + 3C |

| | H3 | H4 | H5 | H−(H3+H4+H5) |
|---|---|---|---|---|
| SITUATION No. 1: A = 1 B = 1 C = 1 | 10 | 10 | 10 | 9 |
| SITUATION No. 2: A = 1 B = 2 C = 2 | 14 | 18 | 18 | 15 |
| SITUATION No. 3: A = 2 B = 1 C = 1 | 16 | 12 | 12 | 12 |
| SITUATION No. 4: A = 1 B = 2 C = 3 | 19 | 20 | 24 | 18 |

Assuming, for example, that each of the original "object" spots A, B and C are of equal brightness intensity, then the sectors H3, H4 and H5, during the six stop positions of one complete cycle of nutation, will receive a total of ten units of illumination — the sum of the illumination received in each of the six stop positions shown in FIG. 21. As indicated, sector H3 will receive six units of illumination from defocused spot A, that is, in the six stop positions it will have been illuminated by defocused spot A in each position; H3 will also have been illuminated by defocused spot B in the stop positions shown in FIG. 21*a* and 21*e*, H3 will also have been illuminated by defocused stop C in the two stop positions shown in FIG. 21*a* and 21*f*. The remaining portion of the table as shown below, indicates the units of brightness in each of the sectors H3, H4 and H5 and the central portion of the area H which has been designated as H − (H3 + H4 + H5).

Table I is merely representative of the actual illumination during one complete cycle of nutation, it being understood that, of course, there are more than six stop positions, and, in fact, actually there are an infinite number of stop positions of the defocused spots A, B and C during one complete cycle of nutation. However, the six stop positions shown in FIG. 21*a* through FIG. 21*f* yeild a substantially accurate picture of the relative illumination received by different sectors within the area H which lies in the circumscribed central area *c* of the receptor plane.

It is further indicated in Table I that different illumination patterns are achieved when the spots A, B and C vary in their relative brightness. For example, in situation No. 2, the spot A is assigned a brightness intensity value of "1" and both spots B and C are assigned brightness values twice that of spot A. These values spot A. These values are merely relative and have no meaning other than to indicate the brightness relationship of the three spots. Situations No. 2 and No. 3 appear to present an inconsistency in that the central portion H − (H3 + H4 + H5) is equal to or greater than illumination in one of the areas H3, H4 and H5. However, this is not an inconsistency Rather, it will be shown later, that during the subtractive steps necessary to reconstitute the image shown in FIG. 21, to correspond to the original object spots, the spurious brightness areas will be eliminated. These spurious areas represent the sum of the gray surrounds of adjacent nutated defocused spots. After their elimination, the resolved figure will show a true correspondance to the original object spots. The method for the elimination of these spurious surrounds is the same as that for the spurious surrounds in FIG. 9 and FIG. 14. An explanation of the procedure for this elimination is again deferred for a later discussion.

Figure 22:
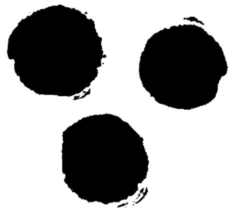
Figure 23:
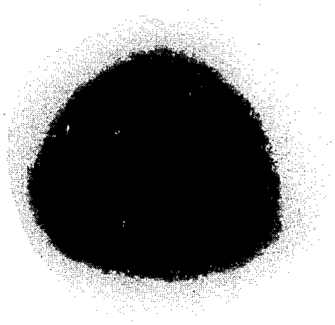
Figure 24:
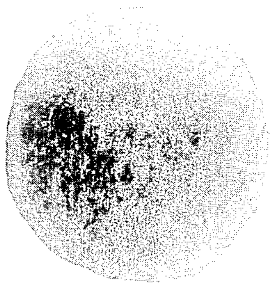

FIG. 22, FIG. 23 and FIG. 24 are actual exposures of the image of the three holes in the opaque third frame of film strip 20, projected through projector 22 onto the photosensitive paper 48.

FIG. 22 is a still (non-nutated), clearly focused (non-filtered) exposure of the three spots utilizing the apparatus in FIG. 1 and FIG. 2.

FIG. 23 is also a still (non-nutated) exposure of the spots shown in FIG. 22. However, in FIG. 23, the optical system was again defocused, just as in FIG. 8 and FIG. 16, by a +0.50 spherical ophthalmic lens affixed to the projector tube end 26.

FIG. 24 shows the defocused three spot design of FIG. 23 which has been circularly nutated with a radius of nutation of 21 mm., utilizing the apparatus of FIG. 2. The same technique was employed as with FIG. 9 and FIG. 17.

The exposure, after nutation, shows three areas of superimposition, as discussed in the text applying to FIG. 18 through FIG. 21. These maximally illuminated spots are equivalent to and represent the reconstitution of the original three spot "object" shown in FIG. 22. This, in effect, demonstrates the results described with respect to FIG. 21 in areas H3, H4 and H5. As previously pointed out in the discussion of FIG. 18 through FIG. 21, a later discussion will indicate the means for eliminating the peripheral gray surrounds and for sharpening and cirspening the spot borders shown in FIG. 24, to correspond to the original still, clear-focus exposure of FIG. 22.

Figures 25, 26:
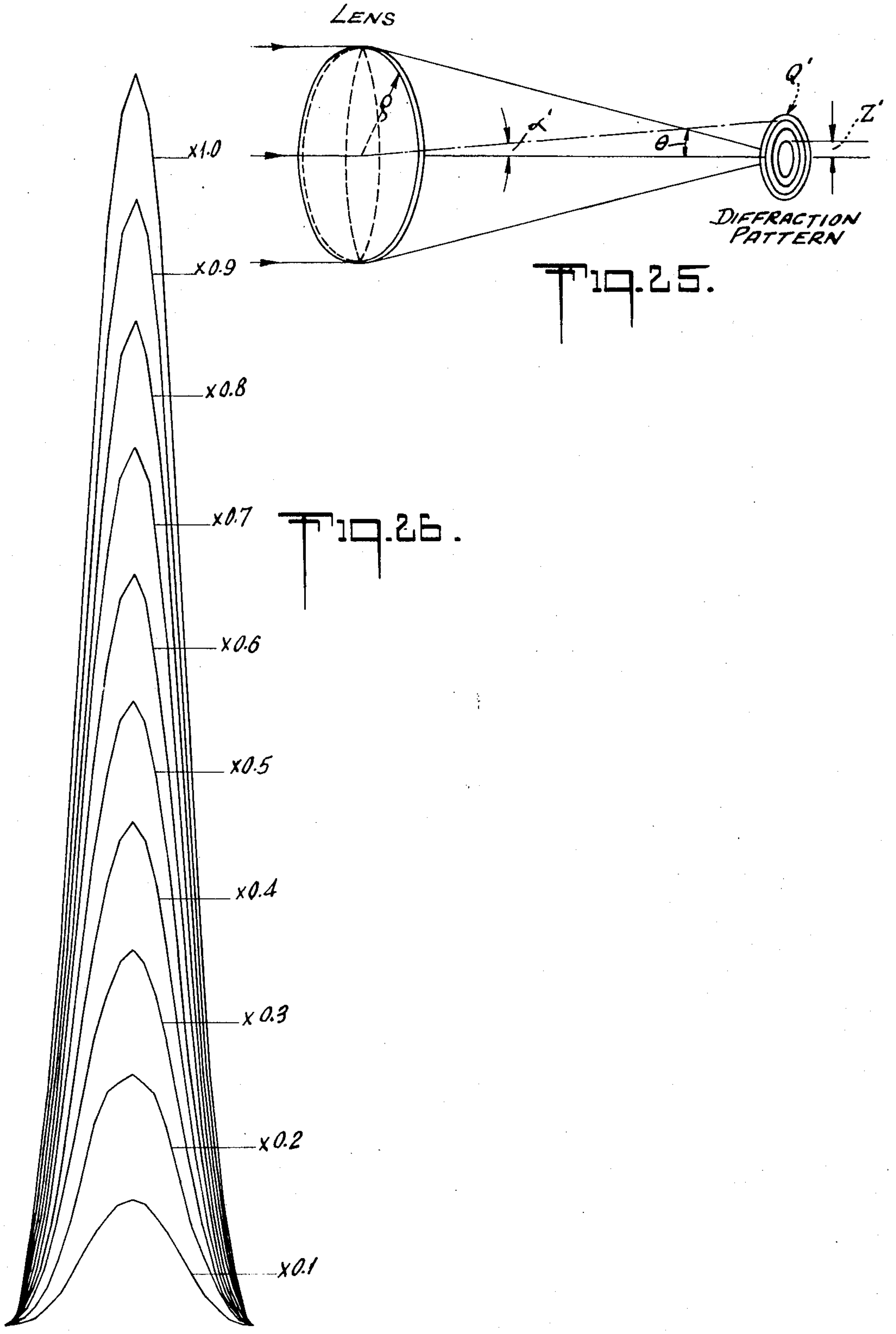
Figure 27A:
Figure 27B:
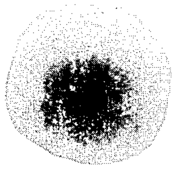
Figure 27C:
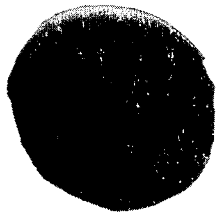
Figure 27D:
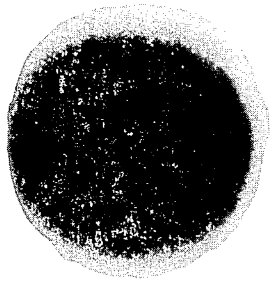
Figure 27E:
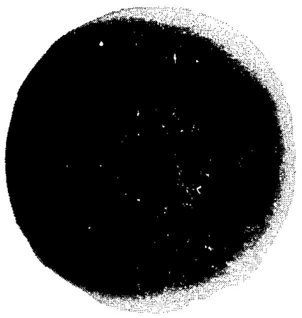

An infinitely distant point source of light, passing through an aberration-free optical system with a pupil of finite aperture does not image as a point — rather, the image is a diffraction pattern appearing somewhat as shown in FIG. 25.

The diffraction pattern appears to consist of a central disc of light surrounded by a series of rings of decreasing intensity. The central disc receives approximately 84 percent of the energy transmitted by the system, and the rings successively receive only 7, 3, 1.501, etc. percent of the energy. For practical purposes, he diffraction pattern may be assumed to consist merely of the central disc. For purposes of clarity, this central disc will hereafter be called the "Airy" disc.

In FIG. 26, there is shown a series of diagrammatic representations of Airy discs calculated by utilizing the formula for the brightness distribution within an Airy Disc set forth as formula (2). The nature of this diffraction pattern was investigated mathematically by Airy in 1834. He demonstrated that the illumination E at any point $Q'$ in the pattern depends upon the wave length $\lambda$ of the light, the radius $p'$ of the exit pupil of the system, and the angular distance $a'$ of the point from the axis. Airy's result expressed in mathematical terms is that $$E=Kp'^4\left[1-\frac{1}{2}m^2+\frac{1}{3}\left(\frac{m^2}{2!}\right)^2-\frac{1}{4}\left(\frac{m^3}{3!}\right)^2+\frac{1}{5}\left(\frac{m^4}{4!}\right)^2-\ldots\right]^2 \quad (2)$$

where $K$ is a constant and $$m=(\pi p'/\lambda \sin a'. \quad (2a)$$

By substituting various values for the quantity $a'$, it is found that the illumination is a maximum in the center of the diffraction pattern. As $a'$ increases, the illumination diminishes gradually to zero and then passes through a series of secondary maxima separated by points of zero illumination. FIG. 26 shows longitudinal sections of a series of three dimensional Airy discs. The abscissa of FIG. 26 represents distance and the ordinate, the degree of illumination. If an Airy disc is imaged through a system onto a receptor plane, the response received by this receptor plane is a function of the exposure time, within certain limits.

In FIG. 26, the same Airy disc has been shown as theoretically recorded by a photosensitive receptor plane, first with one unit of intensity over one complete time period. This has been designated as $x1.0$ Airy disc. Secondly, the same Airy disc, with the same intensity has stimulated a photosensitive receptor plane for only 0.9 units of time resulting in an exposure of slightly less illumination than the first exposure and has been designated as $x0.9$. Similarly, other Airy disc exposures have been graphically shown in FIG. 26, wherein the receptor plane was illuminated for only 80 percent of the time, 70 percent, 60 percent, 50 percent, 40 percent, 30 percent, 20 percent and 10 percent of the time of the original exposure designated as $x1.0$ in FIG. 26. These longitudinal sections of an Airy disc were all calculated in accordance with formula (2). It should be noted that the exposure indicated as $x0.1$ is really the same Airy disc designated as $x1.0$, in fact, they both cover the same area of the receptor surface, and the relative brightness distribution within each is identical, but the receptor plane has only been illuminated for 10 percent of a given unit of time which resulted in the $x0.1$ exposure, rather than the complete unit of exposure time resulting in the Airy disc designated as $x1.0$.

FIG. 27*a* through 27*e* are a series of exposures resulting from the projection of the single hole in the opaque first frame of film strip 20 projected through projector 22 onto F–5 Kodabromide paper. Each exposure was filtered by the defocusing plate 25 of "OR15" ground glass interposed between the projector 22 and the photosensitive paper, at a distance of 14 inches from the paper. The exposure time was 31 seconds in each case. This series of photographs, FIG. 27*a* through 27*e*, demonstrates the brightness distribution within the experimental image, and, also, the threshold of the paper as the exposure time, or brightness, is increased. It is not inferred, however, that there is a linear relationship between exposure time and the intensity of the photograph. Thus, in FIG. 27*a*, the light source within the projector 22 was powered by a line voltage of 80 volts; in FIG. 27*b* of 90 volts; in FIG. 27*c* of 100 volts; in FIG. 27*d* of 110 volts; in FIG. 27*e* of 120 volts. It will be understood that the increase in light intensity of the source was not, in all probability, uniform, since with a change in voltage, there are variations in illumination intensity as well as in the chromatic characteristics of the light source. The response of the photosensitive paper can vary with the wave length of the exposing light, and, therefore, FIG. 27*a* through 27*e* are not meant to portray a linear relationship between stimulus energy and receptor response. However, these figures do give an indication that the brightness distribution in this experimental model simulates the brightness distribution in an Airy disc. The exposures in FIG. 27*a* through 27*e* also show a similarity to the graphical analysis in FIG. 26 with variations in exposure time. Therefore, this series of photographs indicate that an object spot of uniform brightness, when defocused by a ground glass plate, more nearly resembles an Airy disc in brightness distribution than the same object spot defocused by a lens, such as shown in FIG. 8, for example, where the brightness distribution of the image spot is more nearly uniform.

In FIG. 28*a* through 28*g*, there are shown a series of graphical two-dimensional representations of the additive brightness in the zone of overlap, as the distance between the centers of the two Airy discs decreases. For example, each of the Airy discs shown in FIG. 28*a* through 28*g* is 21 units in diameter. The distance between the centers of each pair of airy discs, designated by the numerals 52 and 54, initially at 20 units, is successively decreased in each new figure.

The solid lines denote the point spread functions or their totals of the two Airy disc combination, and the dotted lines denote the point spread function of each Airy disc component within the zone of overlap. Thus, FIG. 28*a* portrays two Airy discs designated as 52 and 54, whose centers are separated by 20 units.

Figure 28A:
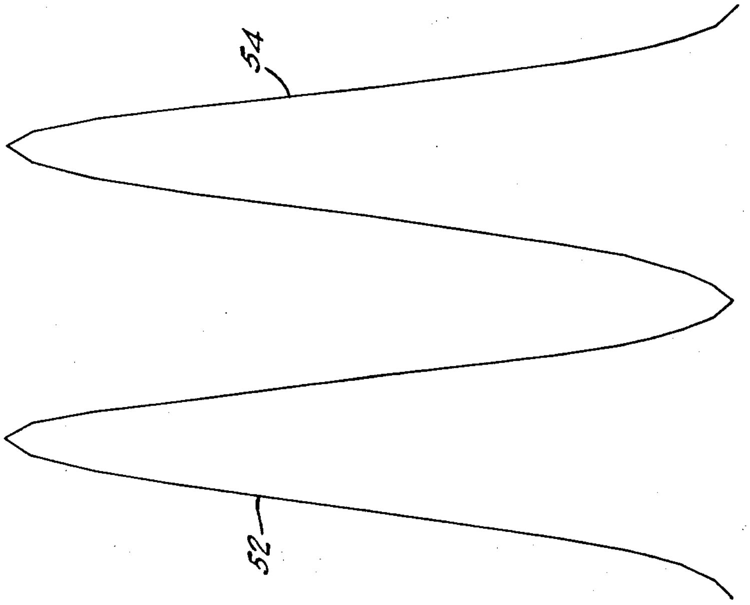
Figure 28B:
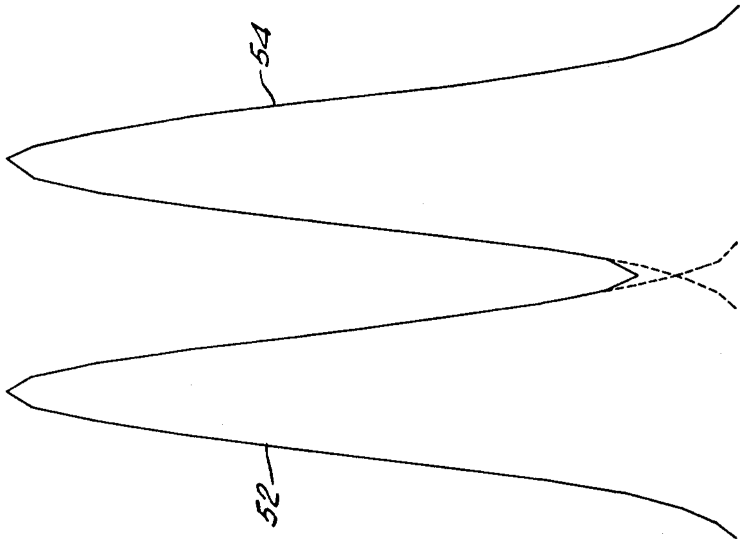

In FIG. 28*b*, the centers of the Airy discs 52 and 54 are separated by only 16 units, and, accordingly, the sum of the point spread functions of each, shown by the dotted lines in the zone of overlap, has formed a central zone of additive brightness between the two Airy discs. As the separation between the centers of the two Airy discs decreases, the central zone of additive brightness increases in area. This can be noted, for instance, in FIG. 28*c*, where the centers of the two Airy discs 52 and 54 are only 12 units apart and the central zone 56 has attained a brightness which is more than half that of either Airy disc 52 or 54.

Figure 28E:
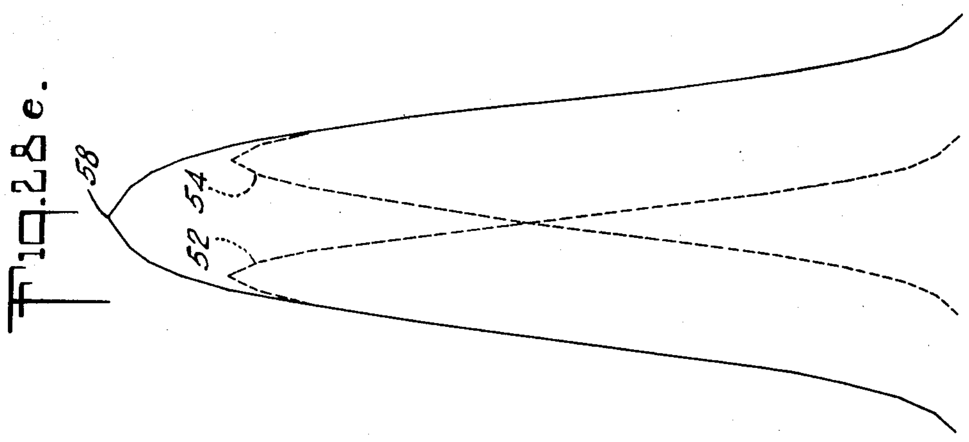
Figure 28D:
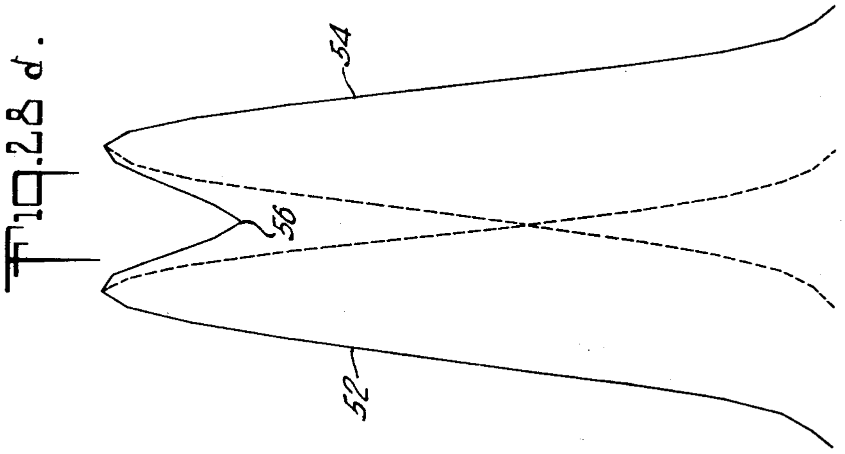
Figure 28C:
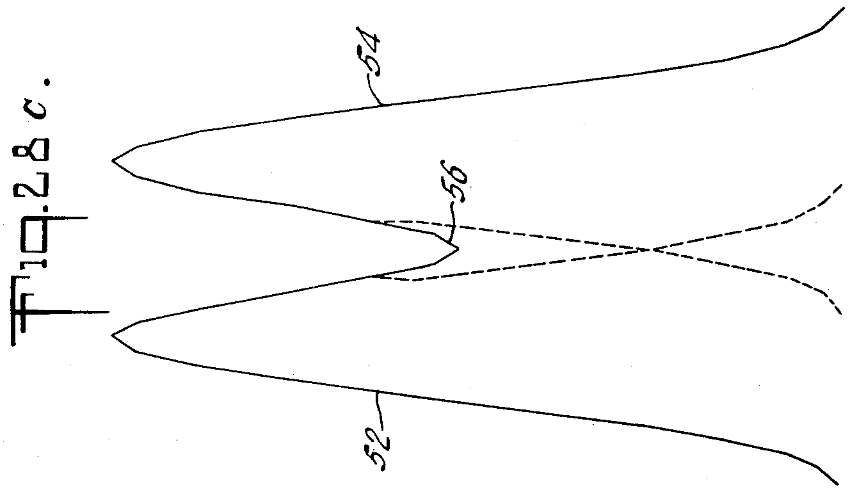

In FIG. 28*d*, it can be seen that the centers of the Airy discs 52 and 54 have now come even closer together, and, in fact, are only 10 units apart with the central zone 56 almost as high (denoting almost as bright) as the apex of Airy disc 52 or 54.

In FIG. 28*e*, where the centers of the two Airy discs are only 8 units apart, the additive brightness in the zone of overlap has resulted in a single peak 58 and resolution has been lost. Original Airy discs 52 and 54 have lost most of their individual identity and the individual peaks which make them distinguishable as separate are no longer identifiable.

Figure 28F:
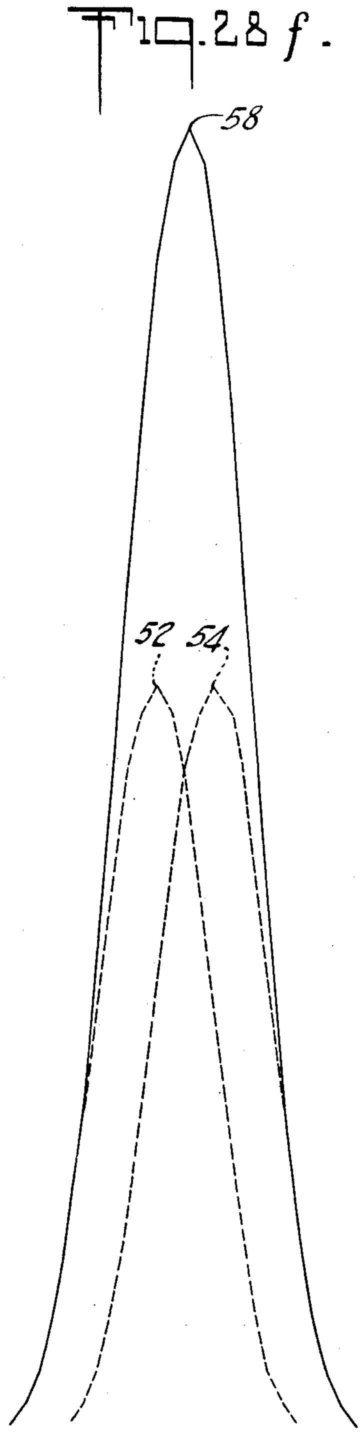

FIG. 28f shows two original Airy discs 52 and 54 whose centers are separated by 4 units. The single peak 58 has heightened and the loss of separate identify of the original Airy discs is almost complete.

Figure 28G:
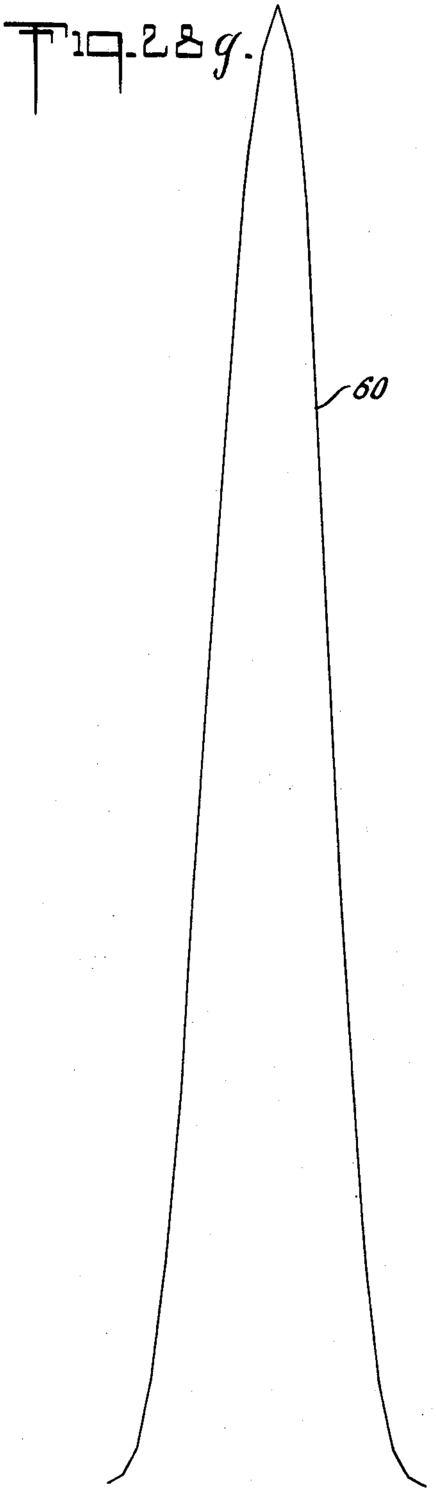

In FIG. 28*g*, the original Airy discs have merged to form a new Airy disc 60 which is twice as bright as either of the original Airy discs 52 or 54, but has the same spatial dimensions.

In FIG. 29*a* through 29*h*, there are shown a series of exposures resulting from the still (non-nutated) projection of the two holes in the second opaque frame of film strip 20 projected through projector 22 of FIG. 1 onto F–5 Kodabromide paper, which series is intended to photographically display the progressively greater overlap of the two Airy discs as graphically shown in FIG. 28*a* through FIG. 28*g*. Each exposure was filtered by the defocusing plate 25 of "OR15" ground glass interposed between the projector 22 and the photosensitive paper. As the defocusing plate is moved further away from the photosensitive paper, greater diffusion is effected. This increase in diffusion simulates an increase in the overlap of two Airy discs.

Figure 29A:

FIG. 29*a* shows the two spot image prior to defocusing.

Figure 29B:
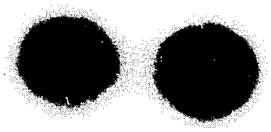

FIG. 29*b* shows the two spot image, the diffusion plate having been placed 4 inches from the photosensitive paper.

Figure 29C:
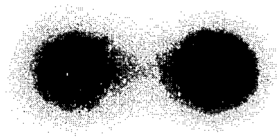

FIG. 29*c* shows the two spot image, the defocusing plate having been placed 6 inches from the photosensitive paper. It should be noted that at 6 inches, the two defocused spots are approaching an overlap.

Figure 29D:
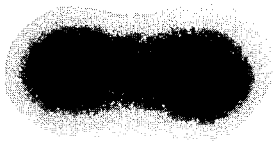

In FIG. 29*d*, the defocusing plate is 8 inches from the photosensitive paper and the two defocused spots simulating Airy discs are now overlapping with a central zone of additive intensity, but still of lesser intensity than the twin peaks formed by the original spots.

Figure 29E:
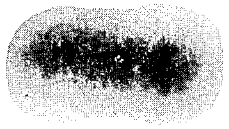

FIG. 29*e* shows the two defocused spots where the defocusing plate is now 10 inches from the photosensitive paper, and, it can be seen, that the two defocused spots are at a level of overlap where the central zone of additive intensity is approaching the intensity of the individual spots centers.

Figure 29F:
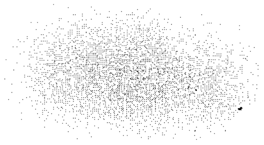

In FIG. 29*f*, where the defocusing plate is now 12 inches from the photosensitive paper, resolution of the two spots appears to have been lost as the increase in the overlap has caused the formation of a still brighter central additive zone. The original spots have almost lost their individual identity and are not really distinguishable as separate.

Figure 29G:
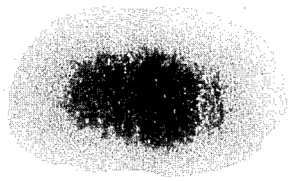

In FIG. 29*g*, the defocusing plate is now 14 inches from the photosensitive paper and resolution is apparently lost.

Figure 29H:
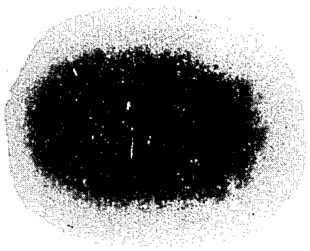

In FIG. 29*h*, the two original round spots are now almost merged into one large oval spot as the defocusing, having been placed 16 inches from the photosensitive paper, has caused an overlapping of the two Airy discs, almost forming a single Airy disc.

Thus, it can be seen that as two Airy discs approach one another, the central zones overlap in brightness until, finally, resolution is lost. This mechanism of resolution loss has been shown both graphically and photographically.

Figure 30:
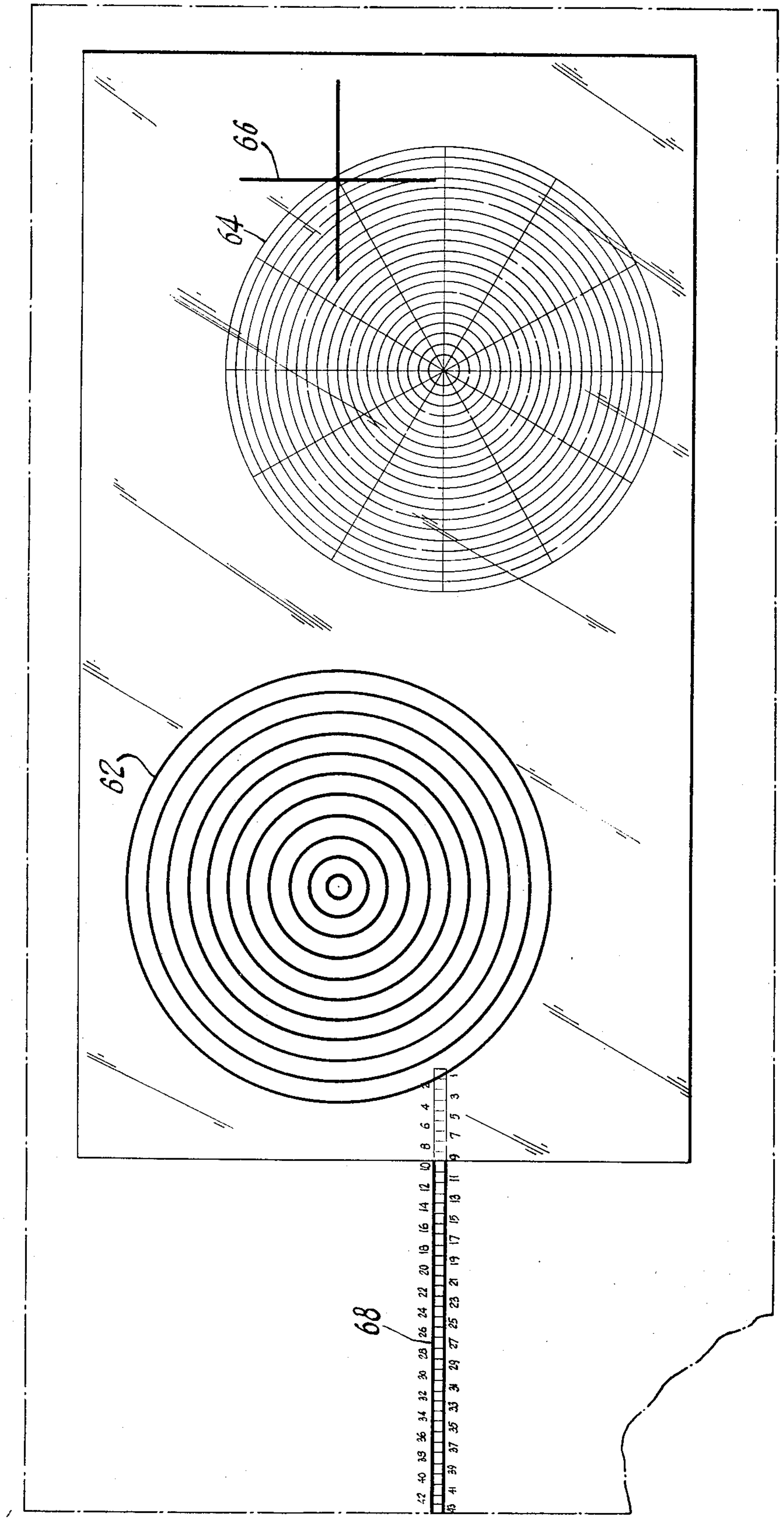

FIG. 30 is a portrayal of how it is possible to graphically determine the pattern of exposure after an Airy disc stimulus has been nutated in relation to a receptor plane. A series of concentric circles has been drawn on a transparent sheet. This drawing 62 provides finite zones of brightness which, when assigned the appropriate brightness values, approximate the pattern of illumination distribution within an Airy disc. Within the central zone and each of the concentric annuli of the Airy disc 62, a different level of illumination occurs. These levels of illumination are calculated by the application of formula (2) discussed previously. Thus, for a given Airy disc, it is possible to determine the illumination within each zone of the Airy disc 62. The nutation device 64 is a grid background on which has been drawn a series of concentric circles divided into sectors. It is feasible to nutate the cross 66, drawn on a transparent sheet, about one of the concentric circles of the nutation device 64. The cross 66 simulates the function of the suspension pin 44 in FIG. 2. The transparent sheet simulates the function of the clip-board in FIG. 2. By moving the cross 66 around one of the circles of the nutation device 64, it is possible to maintain its orientation in relation to the grid background of the nutation device, just as gravity helped maintain the orientation of the clip-board in FIG. 2. The Airy disc 62 has been drawn at the other end of the transparent sheet containing the cross 66. As the cross 66 at one end of the transparent sheet, is moved about one of the concentric circles of the nutation device 64, the Airy disc at the other end of the transparent sheet describes a circular nutation.

A radial section 68 is provided at the other end of the sheet containing the nutation device. This radial section is divided into equal zones numbered from 1 to 43. When the transparent sheet is placed atop the sheet containing the nutation device so that the center of the cross coincides with the center of the concentric circles of the nutation device — the center of the Airy disc 62 coincides with the center of zone number 1 of the radial section 68. The radial section 68 simulates the function of a radial section of the photosensitive paper. It acts to provide a graphical indication of the degree of illumination received by the receptor plane.

This radial section 68 may then be considered to duplicate the function of a radial section of the photosensitive paper which has been exposed to a nutating Airy disc in an experiment which will be discussed hereinafter.

The concentric circles of the nutation device 64 have provided thereon twelve stop position, as shown, which stop positions are utilized to graphically determine, by orienting the intersection of the cross at each stop position, the amount of illumination within each of the 43 divisions of radial section 68. That is, at any given time, a particular zone of Airy disc 62 (on the transparent sheet) may be said to illuminate one of the 43 divisions of radial section 68.

The transparent sheet is placed atop the sheet containing the nutation device 64 and the radial section 68. A particular radius of nutation having been selected, the center of the cross on the transparent sheet is aligned with the intersection of the circle corresponding to the selected radius of nutation and any radial line denoting a stop position. At the other end of both sheets, the Airy disc is then atop the radial section, the center of the Airy disc in horizontal alignment with the center of the cross. This horizontal alignment is accomplished by orienting the Airy disc center and the cross center on the same row of squares in the grid, this grid, previously mentioned, being the background on which the nutation device has been drawn. The superimposition of the transparent sheet over the nutation device results in some or all of the divisions of the radial section being overlaid by the Airy disc. A tabulation is then made of each of the 43 divisions of the radial section, assigning values to each division, corresponding to the brightness value of the overlying Airy disc zone. Those divisions of the radial section not overlaid by the airy disc will, of course, be assigned values of zero. The transparent sheet is then moved to the intersection of the next radial line and the same radius, this intersection being the next stop position. This next stop position may be either clockwise or counter-clockwise adjacent to the previous stop position, as long as the later stop positions all follow one another in the same clockwise or counter-clockwise direction. After horizontally aligning the centers of the Airy disc and the cross, with respect to the grid background of the sheet containing the nutation device, another tabulation of the illumination deposited on the radial section, is made. The second tabulation of the illumination in each division of the radial section, is added to the first.

This process is continued through all twelve stop positions. The final tabulation represents the total illumination received by each division of the radial section in the twelve stop positions in a complete cycle of nutation. Since any radial section of the receptor plane could have been selected for the same result, only one radial section is necessary for the reconstruction of a point spread function diagram, this diagram representing the point spread function resulting from the nutation of an Airy disc stimulus as it illuminates a receptor plane.

Figure 31C:
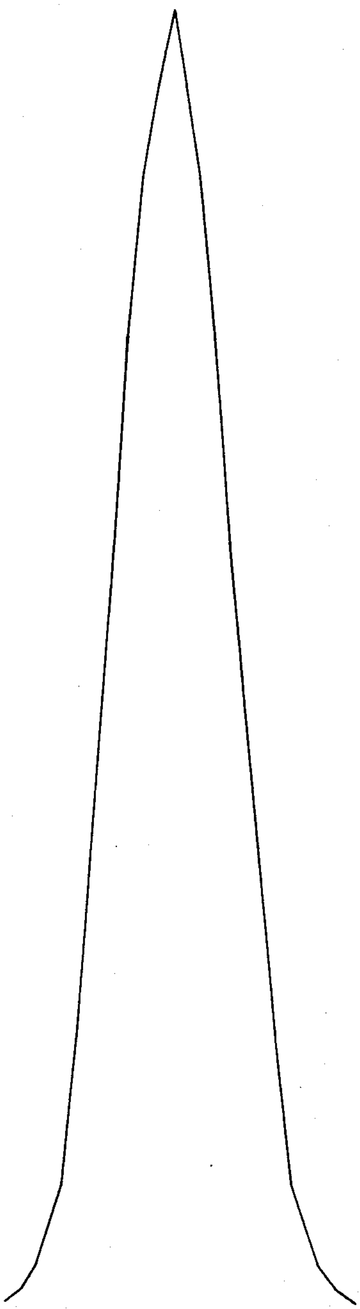
Figure 31A:
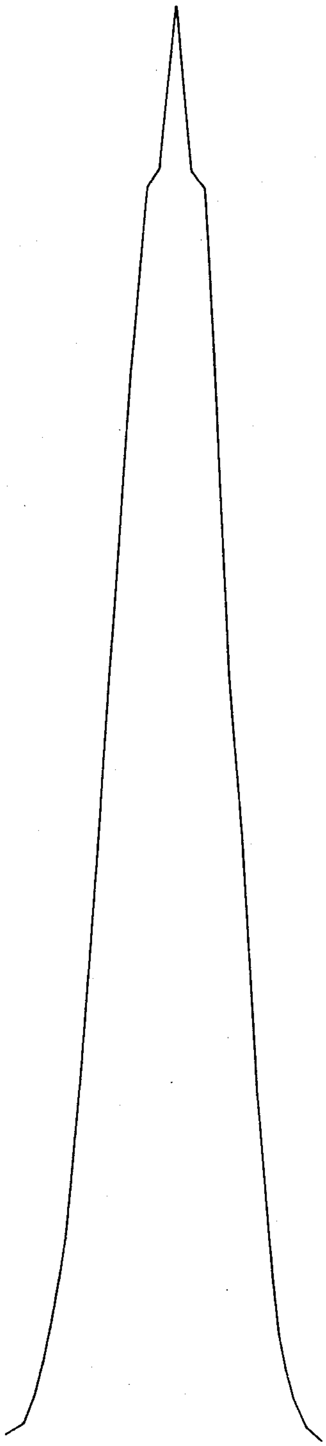
Figure 31B:
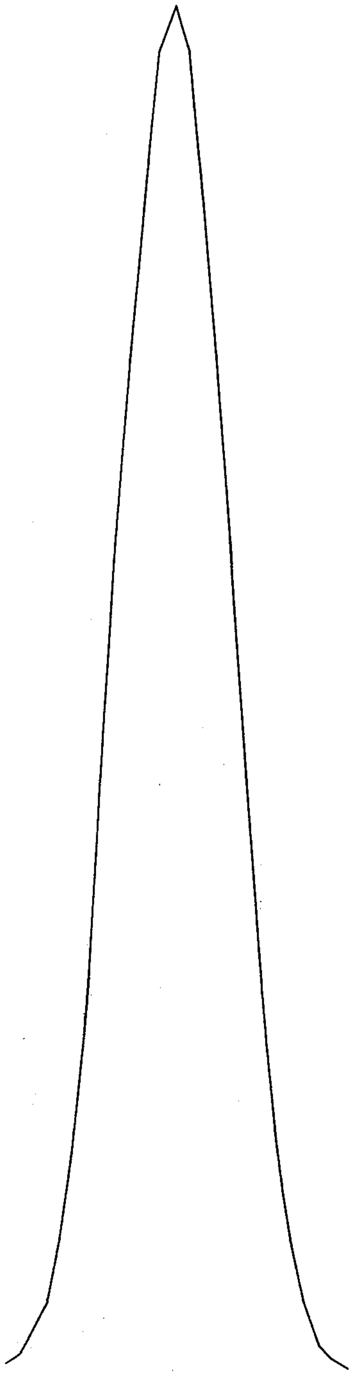
Figures 31D, 31E, 31F:
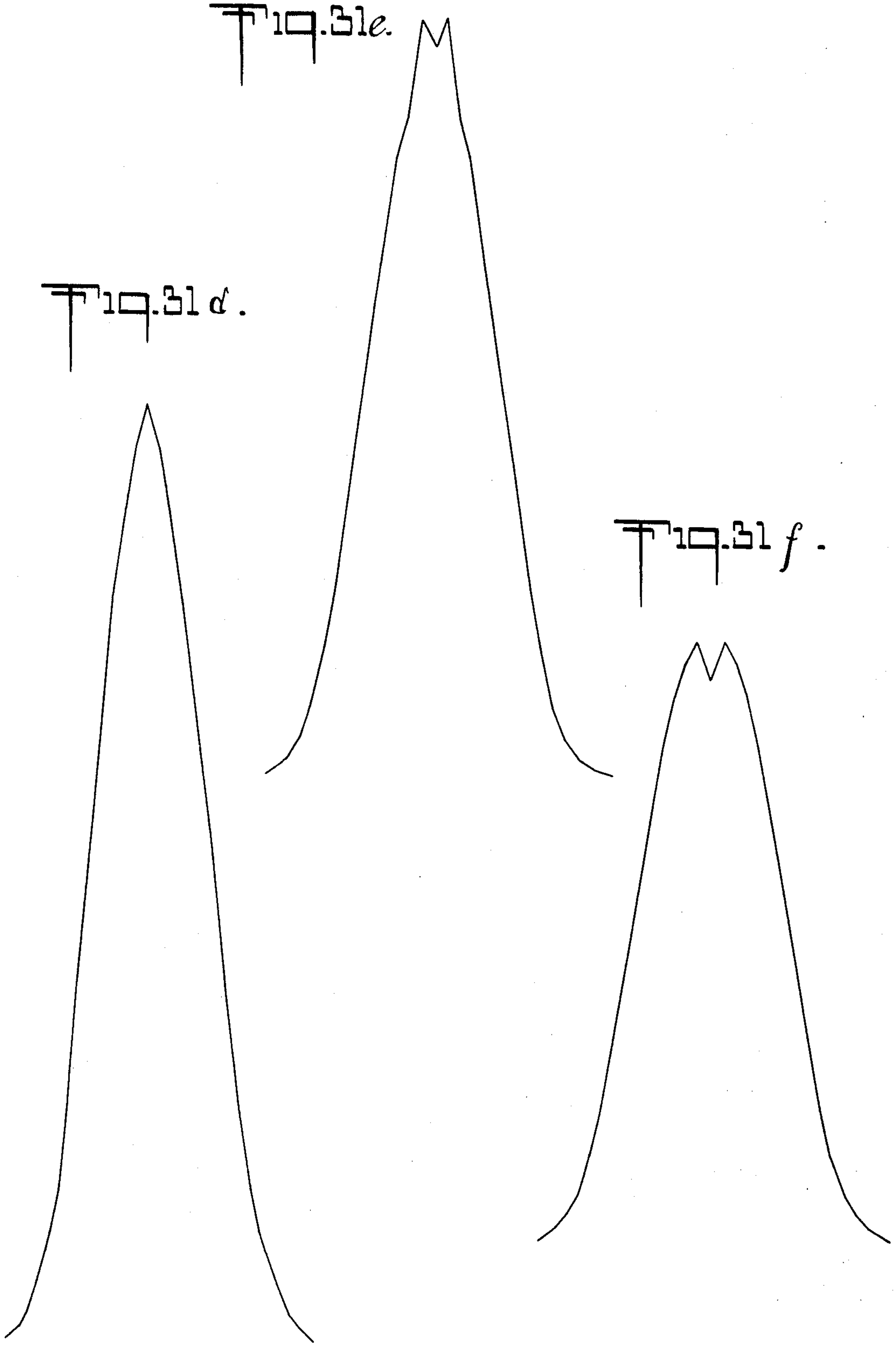
Figure 31G:
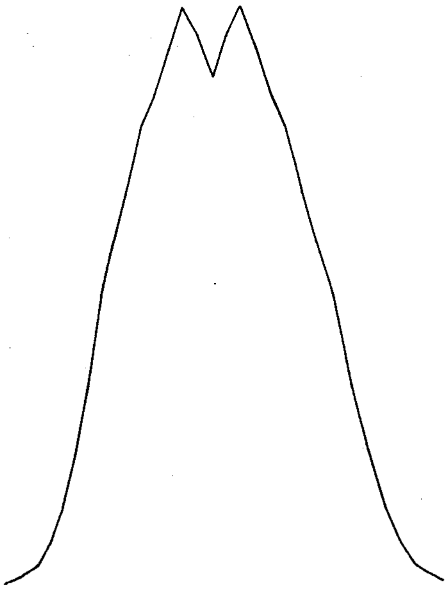
Figure 31H:
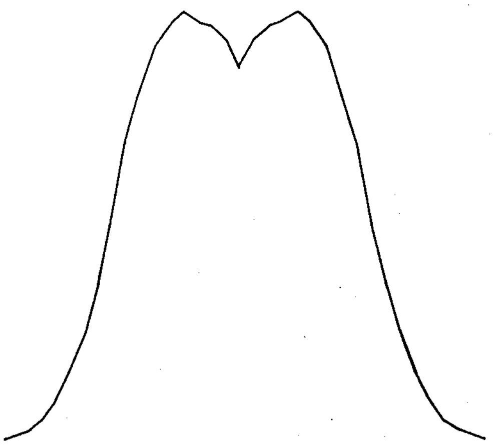
Figure 31I:
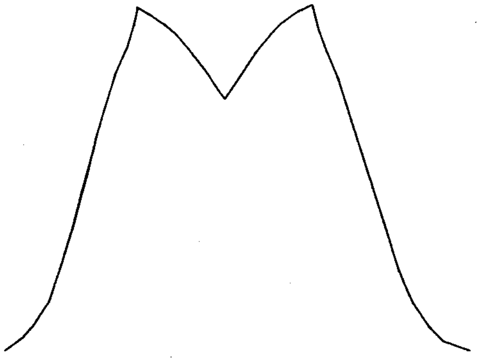
Figure 31J:
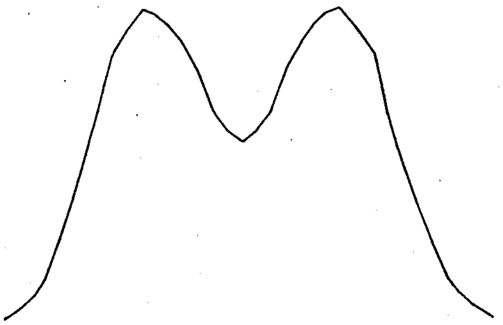
Figure 31K:
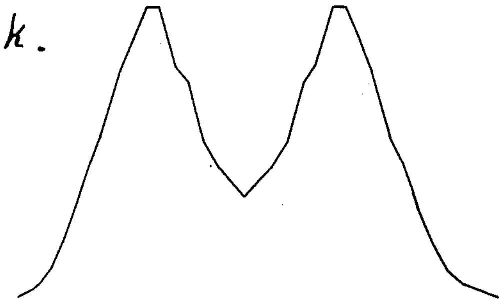
Figure 31L:
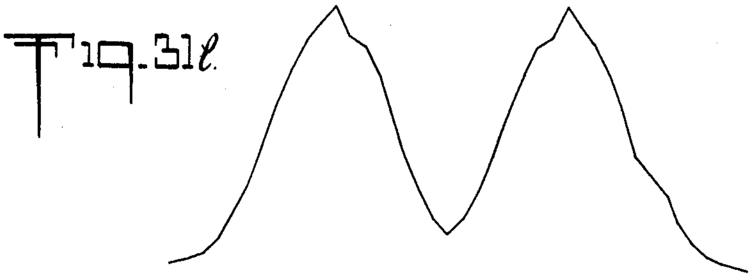
Figure 31M:
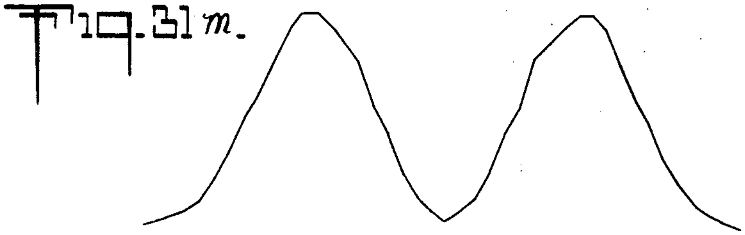
Figure 31N:
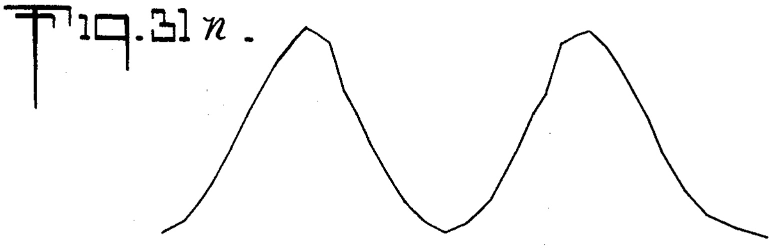

In FIG. 31*a* through FIG. 31*n*, there are shown a series of graphs, each portraying the point spread function resulting from the nutation of a single Airy disc (21 units in diameter), the point spread function of which was shown in FIG. 29*g*, and the zonular brightness divisions of which were shown as 62 in FIG. 30. The diameters of nutation range from 1.5 units to 21 units, in increments of 1.5 units. The values were calculated from experimental data determined by the graphical analysis method, using the Airy disc 62, the cross 66, the nutating device 64 of the radial section 68, shown in FIG. 30. The raw data was not integrated, nor were curves employed in connecting the *y* values. The diameters of nutation are as indicated with respect to each figure. In FIG. 31*a*, the diameter of nutation is 1.5 units; in FIG. 31*b*, the diameter of nutation is 3 units; in FIG. 31*c*, the diameter of nutation is 4.5 units; and in FIG. 31*e*, the diameter of nutation is 6 units. It will be noted that, as the radius of nutation is increased, the highest point (representing maximum brightness) of the resultant nutated Airy disc descends, and the width of the base of the nutated Airy disc (the total diameter) increases. It must be firmly understood that the two-dimensional figures in FIGS. 31 are, in fact, merely two-dimensional representations of what are really three-dimensional — the light distribution per unit area, and each representation is really a central section perpendicular to the base, since each light pattern is symmetrical about its vertical axis.

It should be noted further, that, when the radius of nutation reaches 7.5 units, as shown in FIG. 31*e*, a small crater replaces the peak of the light pattern. As the radius of nutation increases, this crater becomes deeper, and there is a widening of both the crater and the base of the distribution pattern, as can be seen with respect to FIG. 31*f* through FIG. 31*n*. The deepening and widening of this crater results in an annular light distribution pattern which, for example, as can be seen in FIG. 31L, when the nutation reaches 18 units, is such that the center of the crater has almost reached the base line, and the width of the pattern is almost twice the width of the original Airy disc, shown in FIG. 28*g*. It should be noted that the total amount of light, that is, the three-dimension volume of light below the curves shown in FIG. 31*a* through FIG. 31*n*. remains constant throughout the entire nutation. This indicates that, even though nutation is occuring, no energy is lost. Although this might not appear obvious in the graphical representations in FIG. 31*a* through FIG. 31*n*, it may again be pointed out that each of these graphical representations and that of the original Airy disc is two-dimensional, and the volume of light that each represents, when calculated in terms of the total brightness deposited on the receptor plane, is equal in the entire nutation series.

Finally in FIG. 31*n*, the diameter of nutation is 21 units (radius = 10.5 units). This means that in any stop position, only one-half of the outermost annulus of the airy disc will stimulate the first division of the radial section. This first division represents the central zone of the brightness pattern after nutation. At this radius of nutation, the brightness in the central zone is minimal. Any further increase in the radius of nutation results in a non-exposure of this central zone. Therefore, futher increases in the radius of nutation would result in the following changes in the pattern of illumination after nutation:

1. an increase in diameter of the central zone of non-exposure,
2. a decrease in the highest point (representing maximum brightness), and
3. an increase in overall pattern diameter.

FIG. 32*a* through FIG. 32*j* are a series of exposures resulting from the projection of a single hole in the opaque first frame of film strip 20 projected through projector 22 onto F–5 Kodabromide paper. Each exposure was filtered by the defocusing plate 25 of "OR15" ground glass interposed between the projector 22 and the photosensitive paper at a distance of 14 inches from the paper. The exposure time was increased with the radius of nutation, since at the larger radii of nutation the exposures were below the sensitivity threshold of the photosensitive paper.

The photosensitive paper 48 was mounted on the clip-board 46 supported by the suspension pin 44 of the pin carriage device 40, which was moved to different positions in the slot 38 of the nutation arm 36 so that the effective length of the nutation arm (and, therefore, the radius of nutation) could be varied between 4 mm. and 36 mm. in increments of 4 mm.

Figure 32A:
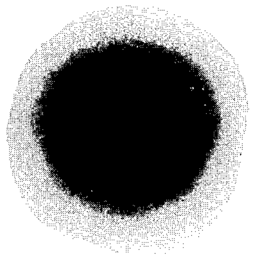
Figure 32B:
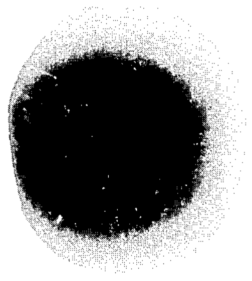
Figure 32C:
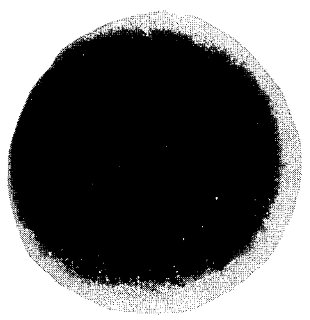
Figure 32D:
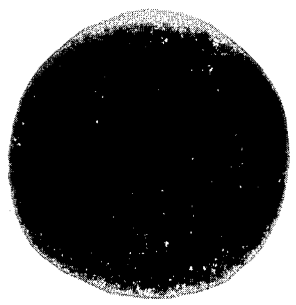
Figure 32E:
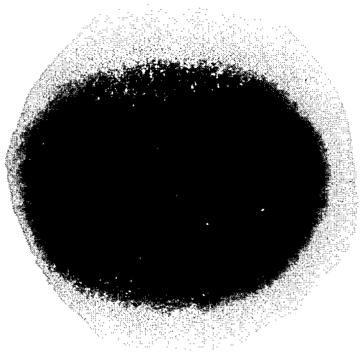
Figure 32F:
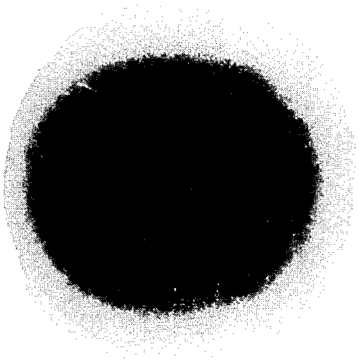
Figure 32G:
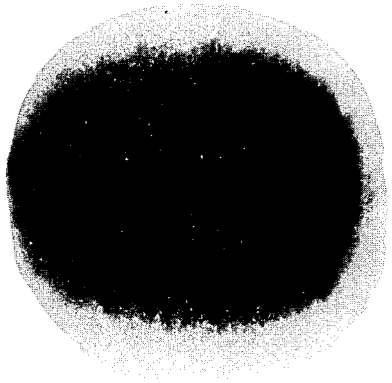
Figure 32H:
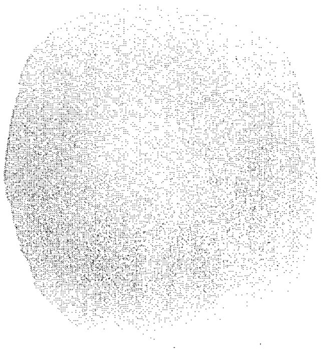
Figure 32J:
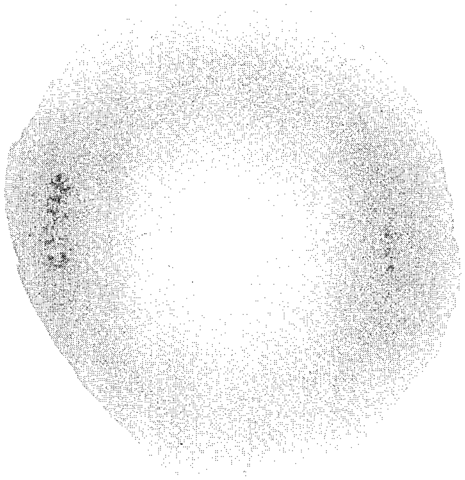
Figure 32I:
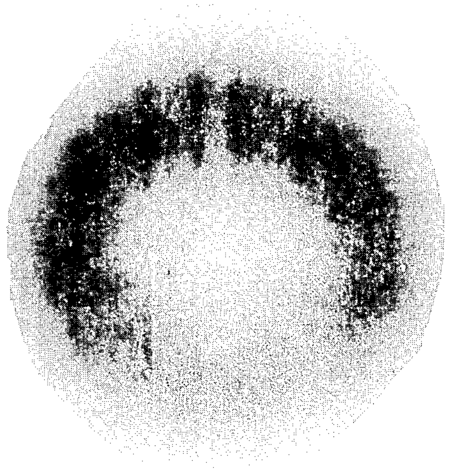

In FIG. 32*a* through 32*j*, there are shown the photographic results of nutating an Airy disc, utilizing the apparatus shown in FIG. 1 and FIG. 2, as just described. The original Airy disc, before any nutation, is shown in FIG. 32*a*. In FIG. 32*b*, the radius of nutation is 4 mm; in FIG. 32*c*, 8 mm; and in FIG. 32*d*, 12 mm. It should be noted that as the radius of nutation increases, the maximum intensity of the spot decreases, and the total diameter of the pattern increases. These changes continue with a 16 mm. radius of nutation as shown in FIG. 32*e*, and a 20 mm. radius of nutation shown in FIG. 32*f*. When the radius of nutation reaches 24 mm. as shown in FIG. 32*g*, the initial appearance of a central crater can just barely be seen. In FIG. 32*h*, at a 28 mm. radius of nutation, the crater in the center of the pattern is now clearly visible. Similarly, at a radius of nutation of 32 mm., as shown in FIG. 32*i*, the central crater is more clearly defined and larger in diameter. It should be further noted that the overall diameter of the pattern has also increased substantially, and the contrast between the zones of greatest and least illumination has lessened.

In FIG. 32*j*, the radius of nutation is now 36 mm. and it should be noted that the crater is becoming both lighter and larger with the further increase of the radius of nutation. The photographic analysis in the FIGS. 32 confirms the graphical analysis displayed in the FIGS. 31.

It is possible, by various means, to simulate an Airy disc of given characteristics by serially nutating the image of a small spot light source in adjacent concentric zones, or in a spiral motion, at varying speeds to effect varying degrees of brightness in the center and in each concentric annulus of a photosensitive receptor plane. There are also other nutational motions which can produce an Airy disc of specified spatial and brightness dimension. The brightness distribution in the image of a point source imaged by a particular optical system, can be duplicated by a specified nutation of a tiny finite spot source. This nutation will produce an image with a brightness distribution which is characteristic of the effects of the aberration and/or diffraction limitations in a particular system. Also, the effect of nutation of a tiny finite spot source of light can duplicate the effect of diffraction of that same tiny finite spot source which images as a modified Airy disc through a given optical system. The real purpose of this discussion is to indicate that, if one can form an Airy disc by a specified manipulation of a tiny finite spot source, it is then possible to determine the nature of the original source from which the Airy disc was formed by a process of "denutation." Since nutation can reproduce the image defects resulting from aberration and/or diffraction in an optical system, it should be obvious that denutations, when properly accomplished, can eliminate aberrations and/or diffraction in an optical system. Thus, it is possible to simulate the effect of diffraction and/or aberrations found in any optical system, and to remove the effects of diffraction and/or aberration by a method of "denutation" and "retrieval" which will be discussed hereinafter.

The next operation is one of denutating a nutated diffraction spot for the improvement of resolution. As was discussed previously, the brightness distribution of a diffraction spot can be simulated by nutating a tiny finite spot light source of uniform intensity, and, accordingly, it is intended in the following discussion to show how a diffraction spot can be denutated in a particular manner so as to return to original tiny finite spot source of light, thus changing the original blurred image into one of higher resolution.

Figure 33:
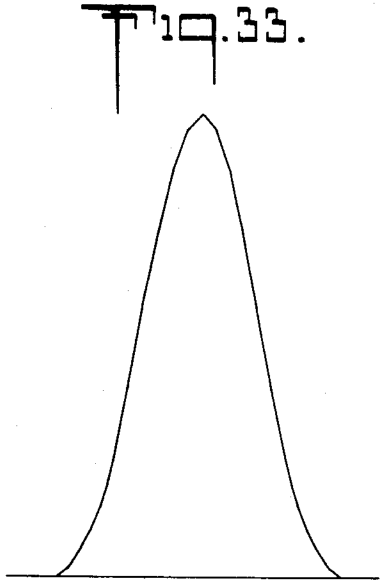
Figure 34:
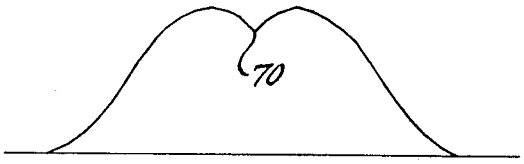

In FIG. 33, there is shown an Airy disc which, as was discussed previously, is similar to a diffraction spot. This Airy disc is then nutated as per the manner discussed with respect to the FIGS. 31, until the crater or depression formed in the center thereof, as shown in FIG. 34, is such that the slope or the change in the depression at the lowermost point of the depression 70 is at a maximum. With respect to the nutations of the Airy disc of the FIGS. 30, this first nutation was achieved by the graphical method, using a diameter of 11.5 units. The aforementioned slope was greatest at this diameter.

The reasoning behind denutation may be described in the following manner: If diffraction of a point source represents a forward motion, and, since the effect of nutation can be made to duplicate the effect of diffraction, then the nutation can also be said to represent a forward motion. Therefore, the original forward motion in the dispersal of energy from a point source is diffraction. The nutation of this diffracted image is then a second forward motion. Now, not knowing the character of the original point source, but knowing the change that has taken place from the first forward motion to the second forward motion, one can then reverse the effect by reversing the motion. This reversal is then made from the end of the first forward motion toward its beginning in the opposite direction.

Therefore, if we know the point spread function as a result of diffraction and/or aberration we know a series of $x$ and $y$ coordinate values. The nutation (the second forward motion) results in the same $x$ values but a new set of $y$ values. Denutation (the reverse motion) consists of formulating a new set of $y$ values, again with the same $x$ coordinates. The forward distance from $y_1$ (a given $y$ value after diffraction) to $y_2$ (the new $y$ after nutation) is $(y_2 - y_1)$. One may then merely proceed that same distance in the opposite direction from the first forward motion (the $y$ value of diffraction) to go in the direction of the original object spot. Therefore, if $Y_1 + ( y_2 - y_1)$ represents the $y$ value after nutation, then $y-(y_2-y_1)$ represents the $y$ value after denutation. After simplification, this $y$ value becomes $2y_1-y_2$.

The object of denutation is the revision of the point spread function, so that the overlap of nearby revised point spread functions will not result in spurious zones of illumination that coule mask the nearby point spread functions as separte. The revised point spread function will contain a central $y$ value surrounded by all the other $y$ values. When nearby point spread functions overlap so that corresponding peripheral $y$ values coincide, these peripheral $y$ values are additive. If any peripheral $y$ value is greater than half the central $y$ value, the addition as a result of overlap of corresponding $y$ values will form a zone of spurious brightness which is greater than the central $y$ values and the individual point spread functions are no longer distinguishable as separate.

Since the $y$ value adjacent to the central $y$ is the greatest of all peripheral $y$ values, it is the magnitude of this adjacent $y$ value relative to the central $y$ which is of paramount importance. Therefore, the first criterion of denutation is a central $y$ value which is more than twice as great as its adjacent neighbor.

Returning to the denutated value of $y$ which was derived as $2y_1-y_2$, in FIG. 34, all the $y$ values after nutation in FIG. 34, are $y_2$ by definition. The central $y_2$ is less than the adjacent $y_2$. Now, considering the central $y$, it may be seen that if central $y_2$ is increased by a factor of $a$, the central $y$ after denutation is decreased. Considering the adjacent $y$ value, if adjacent $y_2$ is increased by the same factor of $a$, this increased adjacent $y_2$ is greater than the central $y_2$. When this increased $y_2$ is subtracted from its corresponding adjacent $y_2$, the denutated adjacent $y_2$ is decreased by a larger amount than the central $y_2$. The greater the $a$ factor, the higher the proportion between the denutated central $y$ and its denutated adjacent neighbor. The first criterion can then be satisfied by the employment of an amplification factor ($a$), because the magnitude of the amplification factor can determine the ratio between the central $y$ and its adjacent neighbor.

It was previously pointed out that one of the consequences of nutation is an increase in the diameter of the base of the nutated Airy disc. At the periphery of the original Airy disc the $y_1$ value is zero. At the same distance from the central y of the nutated Airy disc, the $y_2$ value is finite and positive. Since the denutated value of $y$ is $2y_1-y_2$, and, since at the boundary of the Airy disc before nutation, $y_1$ is zero and $y_2$ is positive, the $y$ value after nutation is seen to be negative. By similar reasoning, all the $y$ values peripheral to this boundary $y$ value will also be negative, as well as some of the $y$ values more central to the boundary $y$. Therefore, the configuration of a denutated Airy disc will include negative zones of illumination. Now, if two nearby Airy discs overlap, any negative $y$ value of one disc which coincides with a positive $y$ value of the other, will have a dampening effect on the positive $y$ value. If the denutated Airy disc is to be recognized, its central $y$ value must be positive. Therefore, the central $y$ value of the revised point spread function after denutation, must have a greater absolute value than the greatest negative $y$ value of this same point spread function. It is a matter of definition that amplification results in an increase of $y_2$. The negative $y$ values result from the positive magnitude of $y_2$, and the amplification results in greater negative $y$ values after denutation. Therefore, a limit must be imposed on the magnitude of the amplification factor. This limit is such that amplification shall not result in any negative $y$ value with a greater absolute value than the central $y$. This is the second criterion for amplification.

Even when the first two criteria for amplification are met, there is yet another ramification of amplification to be considered. If two nearby point spread functions overlap so that the $y$ value of greatest negative magnitude of the first point spread function dampens the central $y$ value of its neighboring point spread function, the $y$ value adjacent to the $y$ value of greatest negative magnitude will also be negative, as will be seen, and it will dampen the positive $y$ value adjacent to the central $y$. This double dampening will disturb the relationship between the central $y$ and its immediate neighbor. The first criterion, restated, is that the central $y$ value must exceed twice the value of its immediate neighbor. The double dampening may prevent the fulfillment of the first criterion. Therefore, the dampening effect of the $y$ value of greatest negative magnitude upon the central $y$, and the dampening effect of the immediately adjacent negative $y$ value on the $y$ value immediately adjacent to the central $y$, must be such that this double dampening fails to hinder the satisfaction of the first criterion. This is the third criterion for amplification.

Now some general formulas may be developed. The following subscripts may be assigned to $y$:

"1" denotes the $y$ value, at a given $x$ coordinate, after diffraction,

"2" denotes the $y$ value, at a given $x$ coordinate, after nutation,

"3" denotes the $y$ value, at a given $x$ coordinate, after amplification,

"4" denotes the $y$ value, at a given $x$ coordinate, after denutation, $c$ denotes the central $y$, $d$ denotes the $y$ adjacent to the central $y$, $n$ denotes the $y$ value of greatest negative magnitude, and $p$ denotes the $y$ value adjacent to $y_n$.

The amplification factor is generally designated by the letter $a$. The following subscripts may be assigned to $a$:

"1" denotes the amplification factor necessary for the satisfaction of the first criterion, "2" denotes the amplification factor necessary for the satisfaction of the second criterion, and "3" denotes the amplification factor necessary for the satisfaction of the third criterion. Amplification is accomplished by the application of the following formula:

$$y_3 = ay_2 \qquad (3)$$

Denutation is accomplished by the application of the following formula:

$$y_4 = y_1 - (y_3 - y_1) \qquad (4)$$

After simplifying formula 4, one may substitute, using the values of formula 3, to arrive at the following:

$$y_4 = 2y_1 - ay_2 \qquad (5)$$

Criterion 1 may be expressed as follows:

$$y_{4c} > 2y_{4d} \qquad (6)$$

Substituting, using the values from formula 5, one arrives at the following:

$$2y_{1c}a_1y_{2c} > 2y_{1d} - a_1y_{2d} \qquad (7)$$

If, however, criterion 1 falls just short of being met, then the following will be true:

$$2y_{1c} - a_1y_{2c} = 2y_{1d} - a_1y_{2d} \qquad (8)$$

and, isolating $a_1$, one arrives at the following:

$$a_1 = 2(y_{1d} - y_{1c})/(y_{2d} - y_{2c}) \qquad (9)$$

If formula 9 prevails, the central y will be exactly twice the value of its adjacent neighbor. In order to fulfill the first criterion, therefore, a minimal increase in the value of $a_1$, as determined in formula 9$m$ will suffice. This will result in a value for the central $y$ which is more than twice the value of its immediate neighbor.

Criterion 2 may be expressed as follows:

$$y_{4c} > y_{4n} \qquad (10)$$

Substituting, using the values from formula 5, one arrives at the following:

$$2y_{1c} - a_2y_{2c} > 2y_{1n} - a_2y_{2n} \qquad (11)$$

If, however, criterion 2 falls just short of being met, then the following will be true:

$$2y_{1c} - a_2y_{2c} = 2y_{1n} - a_2y_{2n} \qquad (12)$$

and, isolating $a_2$, one arrives at the following:

$$a_2 = 2(y_{1n} - y_{1c})/(y_{2n} - y_{2c}) \qquad (13)$$

If formulat 13 prevails, the central $y_4$ will be exactly equal to the negative $y_4$ of greatest magnitude. In order to fulfill the second criterion, therefore, a minimal decrease in the value of $a_2$, determined in formula 9, will suffice. This will result in a value for the central $y_4$ which has a larger absolute value than the $y_4$ of greatest negative magnitude.

Criterion 3 may be expressed as follows:

$$Y_{4c} + y_{4n} > 2(y_{4d} + y_{4p}) \qquad (14)$$

Substituting, using the values from formula 5, one arrives at the following:

$$2y_{1c} - a_3y_{2c} + 2y_{1n} - a_3y2_n > 2(2y_{1d} - a_3y_{1d} + 2y_{1p} - a_3y_{1p}) \qquad (15)$$

If, however, criterion 3 falls just short of being met, then the following will be true.

$$2y_{1c} - a_3y_{2c} + 2y_{1n} - a_3y_{2n} = 2(2y_{1d} - a_3y_{1d} + 2y_{1p} - a_3y_{1p}) \qquad (16)$$

and, isolating $a_3$, one arrives at the following:

$$a_3 = \frac{2(y_{1d} + y_{1p}) - y_{1c} - y_{1n}}{y_{1d} + y_{1p} - \frac{1}{2}(y_{2c} + y_{2n})} \qquad (17)$$

If formula 17 prevails, the dampened central $y_4$ will be exactly twice the value of its adjacent neighbor. In order to fulfill the third criterion, therefore, a minimal decrease in the value of $a_3$, determined in formula 17, will suffice. This will result in a value for the dampened central $y$ which is more than twice the value of its dampened immediate neighbor.

Summarizing, there are three criteria for the determination of the final amplification factor and this factor may be calculated, tentatively, by the application of formula 9, formula 13 or formula 17. If denutation does not satisfy all three criteria, the process will not yet have resulted in the revision of the point spread function to meet the requirement for maximum resolution. The process will have, however, as will be shown, resulted in a revised point spread function capable of higher resolution than before.

The method of determining the satisfaction of criteria will now be described. First the $y$ value of greatest negative magnitude must be selected. This is accomplished by the application of formula 18 (the formula for denutation without amplification) to all $y$ values in the point spread function of the original Airy disc and the nutated Airy disc, and the selection of the $y$ value of greatest negative magnitude.

$$y_4 = 2y_1 - y_2 \qquad (18)$$

Next in order is the determination of the $y$ value of next greatest negative magnitude, which will be shown to lie immediately adjacent to the $y$ value of greatest negative magnitude. The identity of the central $y_4$ is known, it has the same $x$ coordinate as the central $y_1$. The identity of its immediately adjacent neighbor is also established.

Now that the four key $y$ locations have been identified, formula 9, formula 13 and formula 17 are applied for the determination of $a_1$, $a_2$ and $a_3$. The first criterion will be satisfied by an increase in $a_1$ as previously discussed. If this increased $a_1$ is used as the amplification factor, and it is larger than $a_2$, then $a_2$ would be too large to satisfy the second criterion. This is true because $a_2$ must be diminished to satisfy the second criterion. Then the first denutation cannot succeed in maximizing the resolution capability of the revised point spread function, although its resolution capability will have been increased. If, however, the increased $a_1$ is smaller than $a_2$, then the first two criteria can be satisfied by using the increased $a_1$ as the amplification factor.

Now, if the same increased $a_1$ is used as the amplification factor, and it is larger than $a_3$, then $a_3$ would be too large to satisfy the third criterion. This is true because $a_3$ must be diminshed to satisfy the third criterion. Then the first nutation-amplification-denutation cycle cannot succeed in maximizing the resolution capability of the revised point spread function, although its resolution capability will have been increased.

If, however, the increased $a_1$ is smaller than both $a_2$ and $a_3$, then all three criteria can be satisfied by using the increased $a_1$ as the amplification factor and the resolution capability of the revised point spread function will have been maximized. Since only a minimal increase in $a_1$ is smaller than both $a_2$ and $a_3$.

Now the question arises as to the magnitude of the amplification factor to be used for a given denutation if this denutation cannot succeed in maximizing the resolution capability of the revised point spread function. If $a_1$ is used as the amplification factor, and $a_1$ is larger than $a_2$, then the $y_4$ of greatest negative magnitude will dampen the central $y_4$ when two point spread functions overlap so that the central $y_4$ of one point spread function coincides with the $y_4$ of greatest negative magnitude of the other. Another cycle of denutation will result in an increase in the magnitudes of both the central $y_4$ and the $y_4$ of greatest negative magnitude, so that the new dampening of the central $y$ will fail to satisfy the second criterion. Therefore, the use of $a_1$ as the amplification factor is ill-advised, in this case, since it will preordain failure in maximizing the resolution capability of the revised point spread function after the next denutation.

If $a_2$ is used as the amplification factor in a given denutation cycle that cannot succeed, it is smaller than $a_1$. Then after the next denutation, both the central $y_4$ and the $y_4$ of greatest negative magnitude will have been increased. But this time, one would expect a slightly greater increase in the central $y_4$ so that the dampening effect of the $y_4$ of greatest negative magnitude, when two point spread functions overlap as previously defined, will not obliterate the central $y_4$ as a positive brightness value. Also, since the next denutation cycle will increase the magnitude of the central $y_4$ relative to its immediately adjacent neighbor, each successive cycle of nutation-amplification-denutation will increase the resolution capability of the revised point spread function until maximization has taken place.

Figure 35:
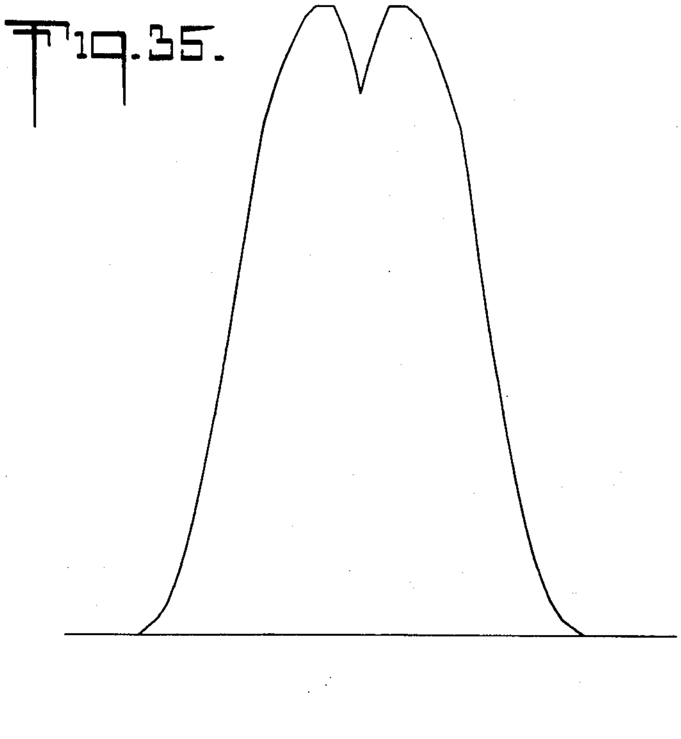

Returning to the experimental model, FIG. 34 shows the point spread function after the first nutation. A denutation without amplification was performed using the data displayed in FIG. 33 and FIG. 34. When $a$, $a_2$ and $a_3$ were calculated, it was determined that the first denutation could not maximize the resolution capability of the revised point spread function after this denutation. Therefore, $a_2$ was selected as the amplification factor for the first cycle of nutation-amplification-denutation. In FIG. 35, there is shown the amplified point spread function of FIG. 34, amplified by a factor of 4.3. but

Figure 36:
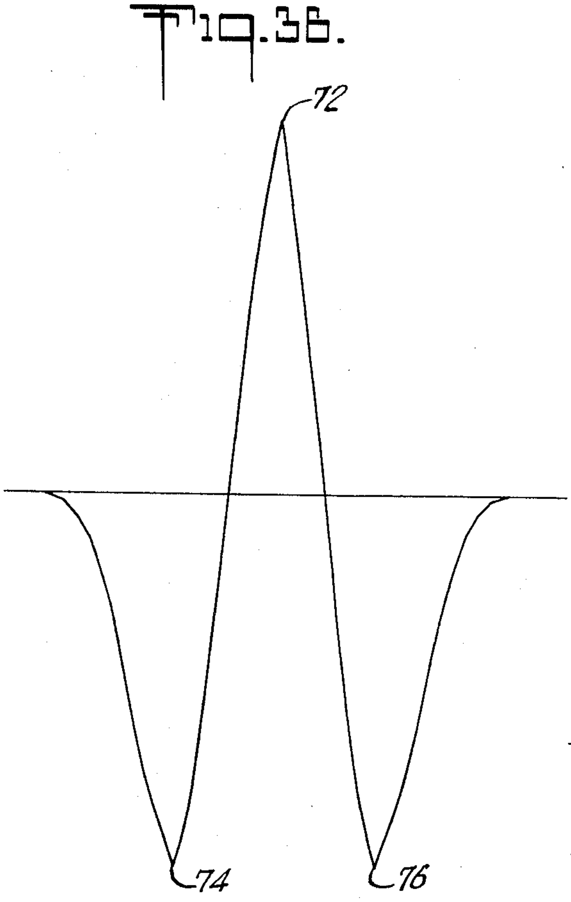

The final step in the first cycle was denutation the result of which is shown in FIG. 36. Thus, it can be seen that there are two negative zones in the resultant cross section, having negative apices 74 and 76 and a positive apex 72. Since this curve shows but a cross section of a three-dimensional figure, it should be pointed out that the negative apices 74 and 76 really represent the lip of a negative crater. These negative apices 74 and 76 have a slightly lesser absolute value than positive apex 72 so that central point 72 remains positive after dampening in later subtractive steps.

Figure 37:
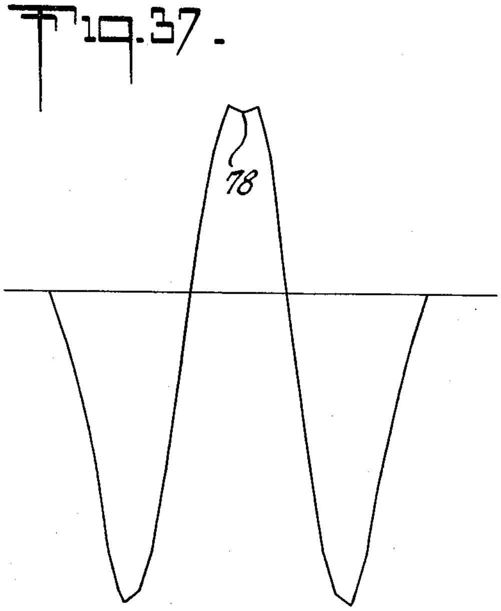
Figure 38:
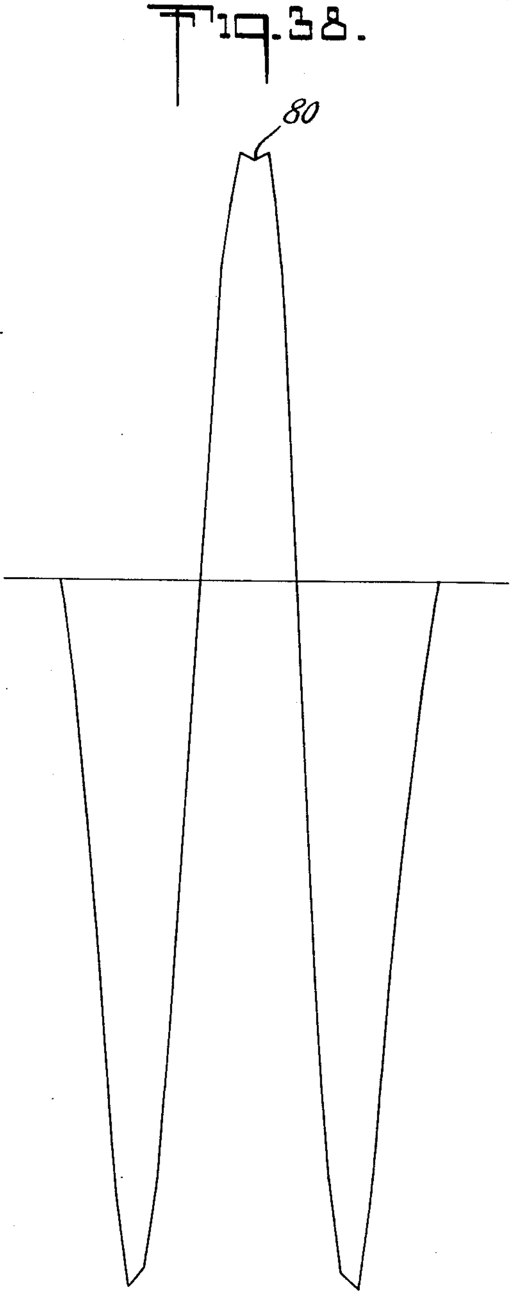

After denutation, the revised point spread function shown in FIG. 36, is again iteratively nutated at various radii to determine the radius of nutation at which the central point has its slope at a positive maximum. This radius proved to b 3.5 units. The maximum positive slope is shown as point 78 in FIG. 37. By application of the formulas and utilizing the method previously described, $a_1$ , $a_2$ and $a_3$ were then calculated. This time, a comparison of $a_1$ , $a_2$ and $a_3$ revealed that this cycle of nutation-amplification-denutation would be successful. The value of $a_1$ was slightly increased to fulfill the first criterion and the point spread function shown in FIG. 37 was amplified by a factor of 2.3. The result of this amplification is shown in FIG. 38. This places the resultant amplified point 78 of FIG. 37, now denoted as 80 in FIG. 38 above those in the original first denutation shown in FIG. 36. Therefore, after the application of formula 5 for denutation, the point spread function of the original Airy disc in FIG. 33 is shown to have resulted in a final revision having maximum resolution capability.

Figure 39:
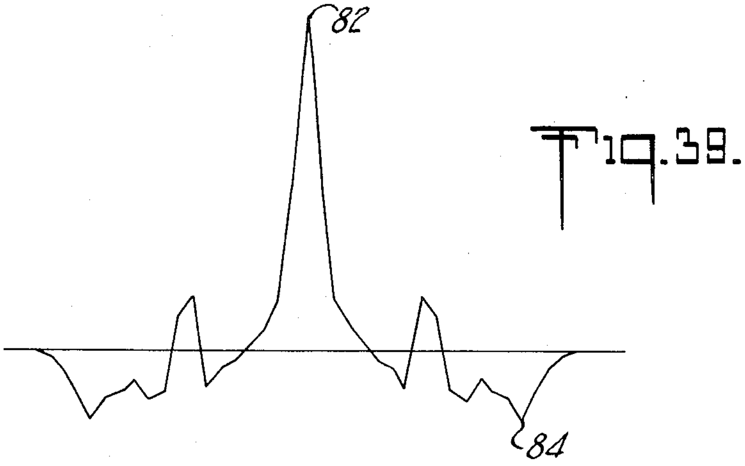

FIG. 39 shows the final revision of the point spread function, achieved after the second denutation. Maximum resolution for a particular grid size is achieved when all three criteria are met. This is the case in the revised point spread function in FIG. 39.

First the apex 82 is more than twice the value of the $y$ coordinate, 1 $x$ unit to either side of the apex. Second, if two revised point spread functions, each identical to that shown in FIG. 39, overlap so that the lowest nadir 84 of one, coincides with apex 82 of the other, the two point spread functions are still identifiable and distinguishable as separate. This is because the apex 82 has a higher absolute value than the nadir 84, and remains a positive value after being dampened. Third, if the same overlap relationship is postulated, the double dampening of apex 82 and the $y$ value to either side of it, fails to disturb the greater than 2:1 relationship in the magnitude of these two values.

Figure 40A:
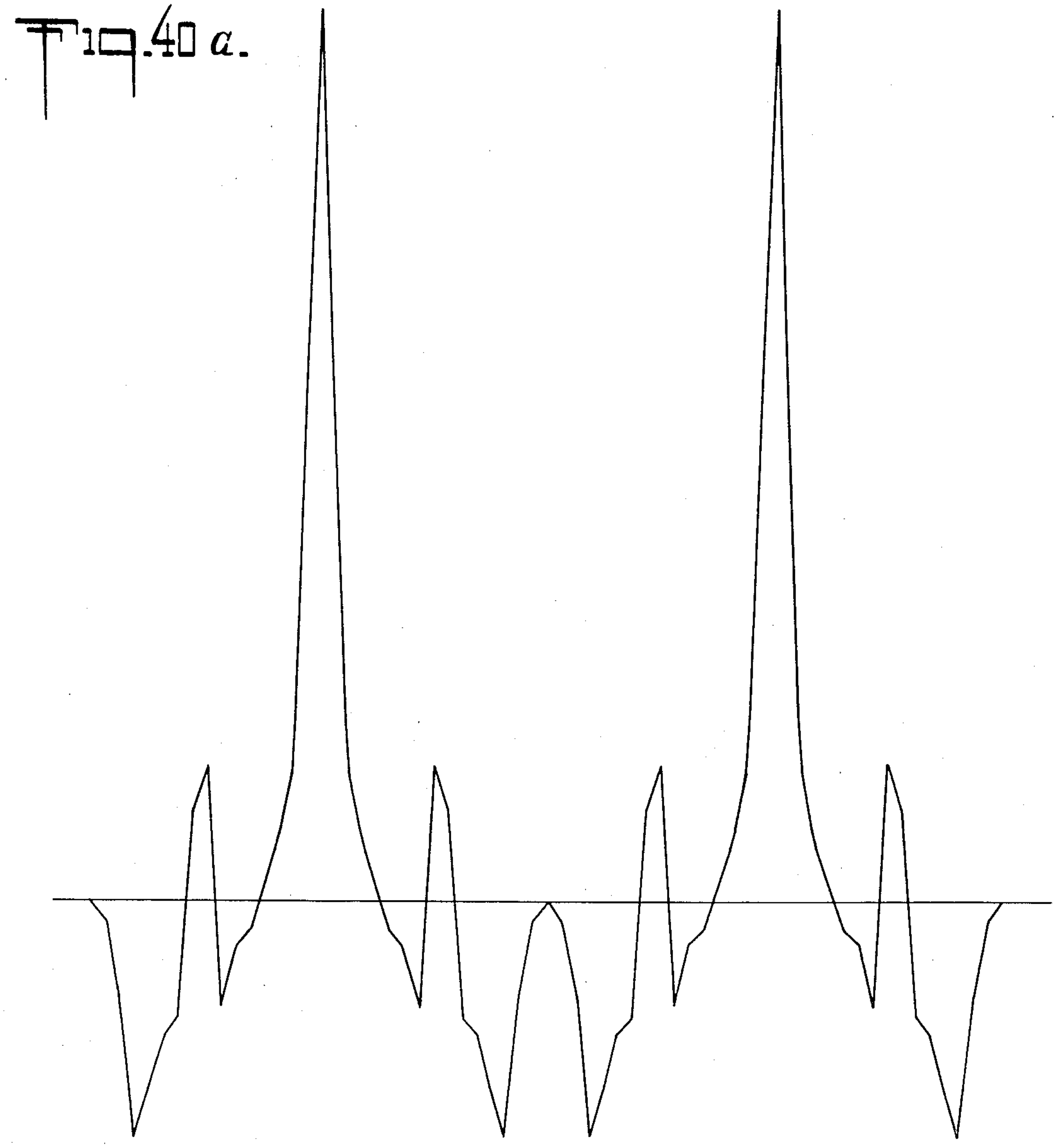

The next group of figures portray a series of overlapping pairs of equal reconstituted Airy discs, each 33 units in diameter, the separation of their centers varying from 32 units to 0 units in increments of 4 units. The solid lines denote the point spread functions of the combinations and the dotted lines denote the individual point spread functions of each component within the zone of overlap. Thus, in FIG. 40*a*, there are shown two reconstituted Airy discs, their apices separated by 32 units.

Figure 40B:
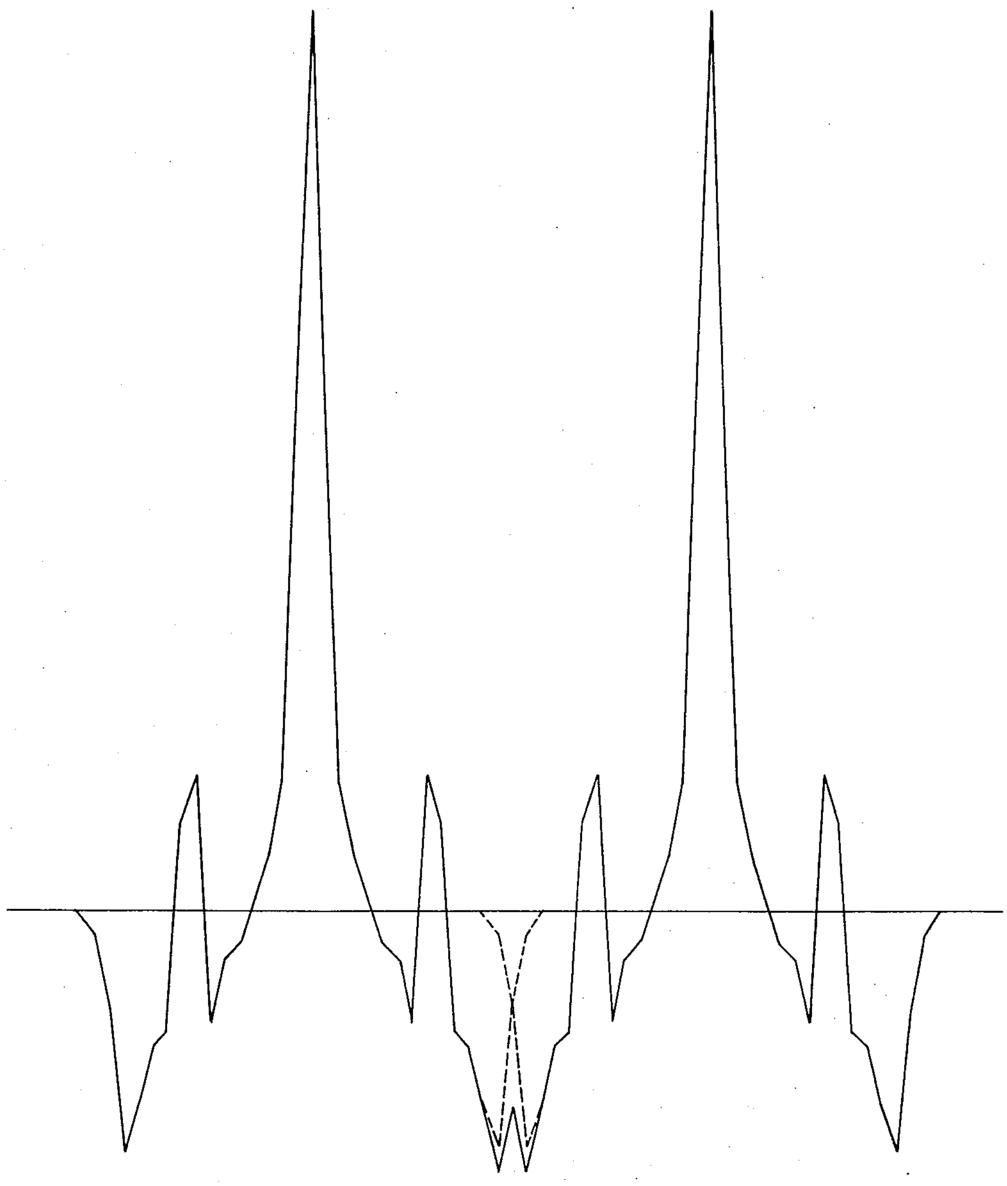

FIG. 40*b* shows the two reconstituted Airy discs with their apices separated by 28 units.

Figure 40C:
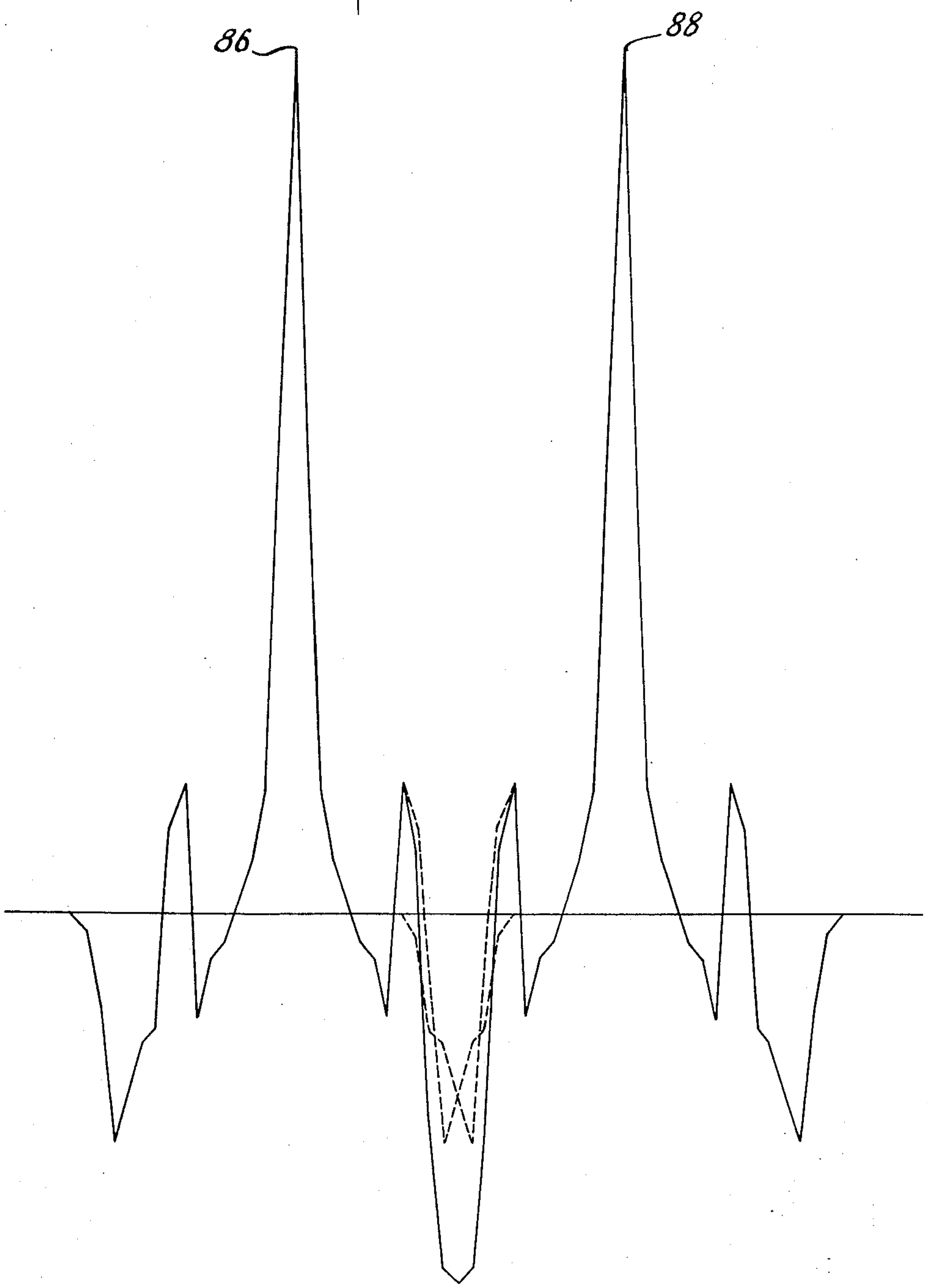

FIG. 40*c* shows the two reconstituted Airy discs with their apices 86 and 88 separated by 24 units.

Figure 40D:
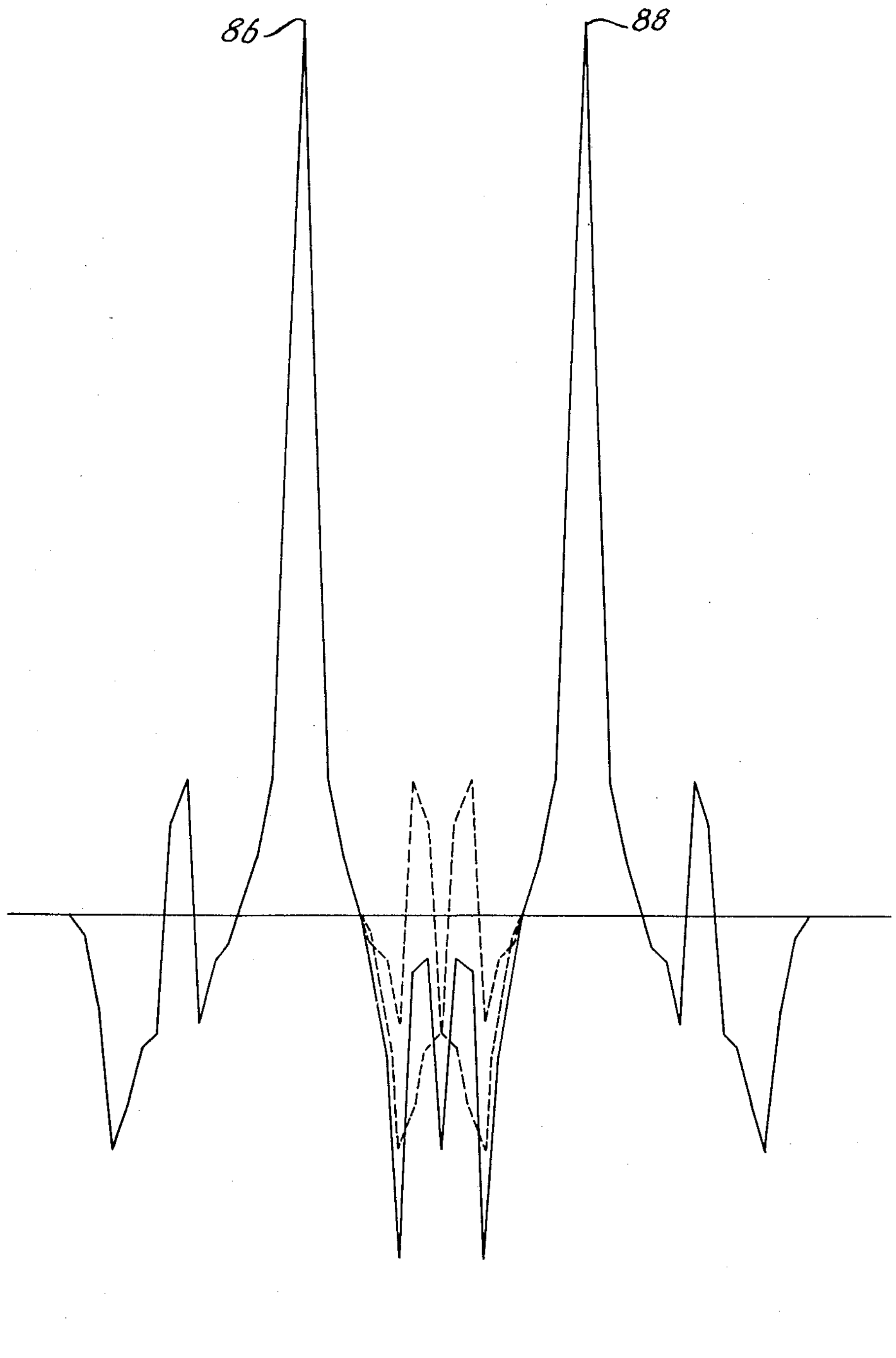

FIG. 40*d* shows the two reconstituted Airy discs with their apices 86 and 88 separated by 20 units.

Figure 40E:
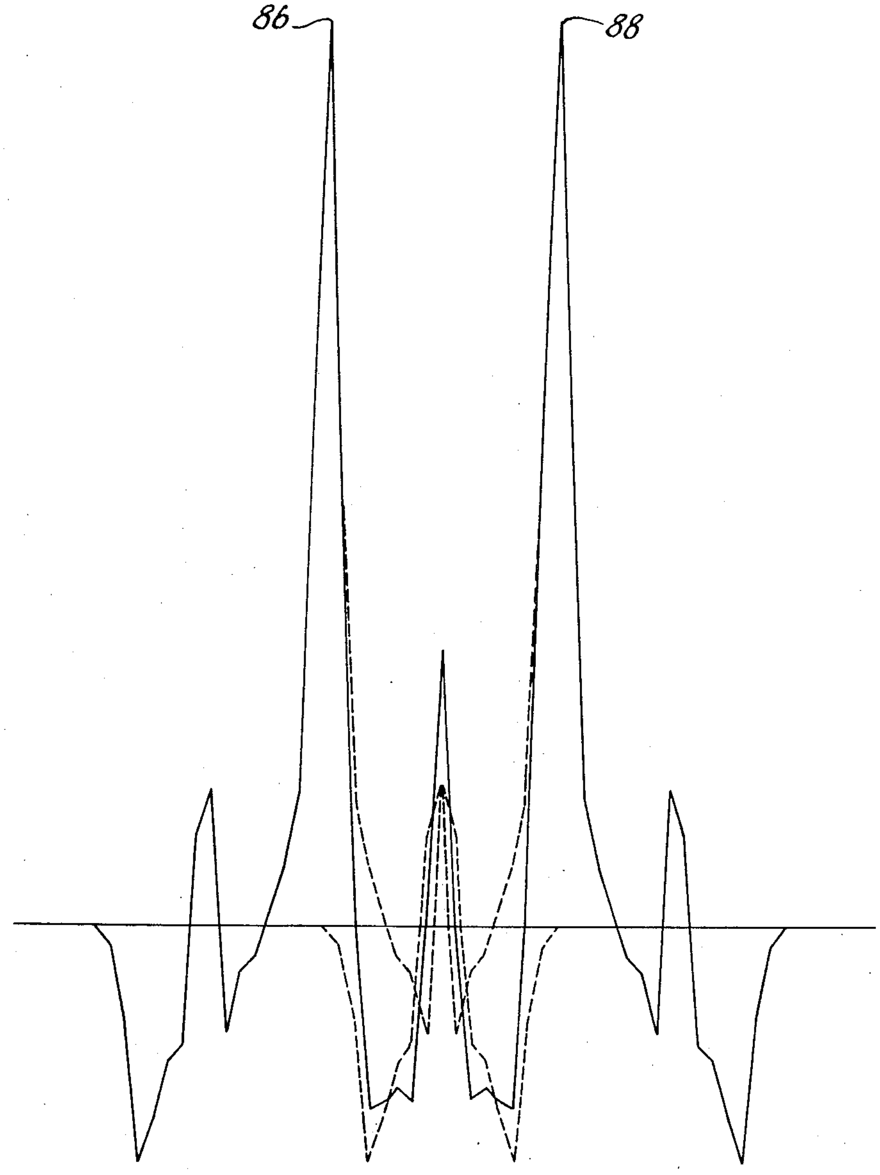

FIG. 40*e* shows the two reconstituted Airy discs with their apices 86 and 88 separated by 16 units.

Figure 40F:
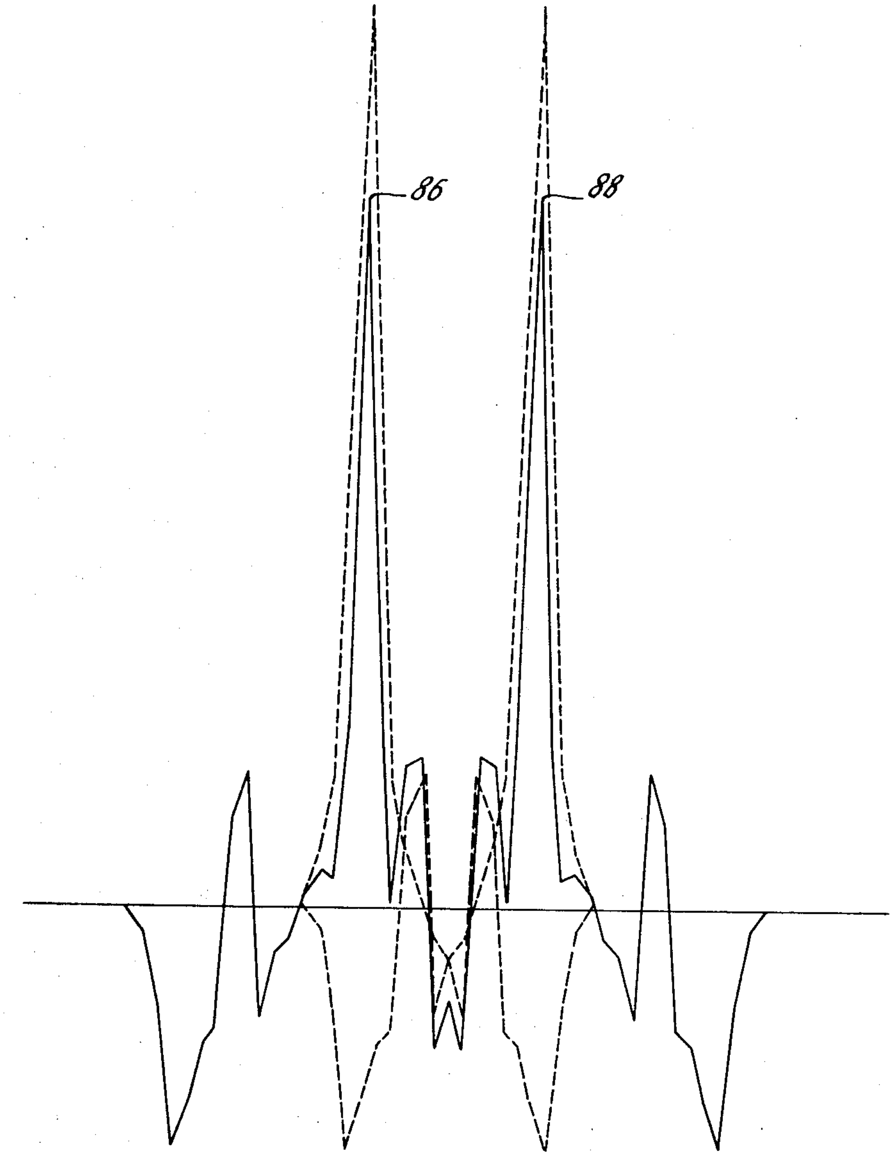

FIG. 40*f* shows the two reconstituted Airy discs with their apices 86 and 88 now only 12 units apart. It should be noted that at this separation, each of the two respective apices has been dampened by the nadir of its neighboring reconstituted Airy disc. However, this has not prevented resolution of the two as separate, since each original apex is individually identifiable as representing a brightest point in the pattern of illumination.

Figure 40G:
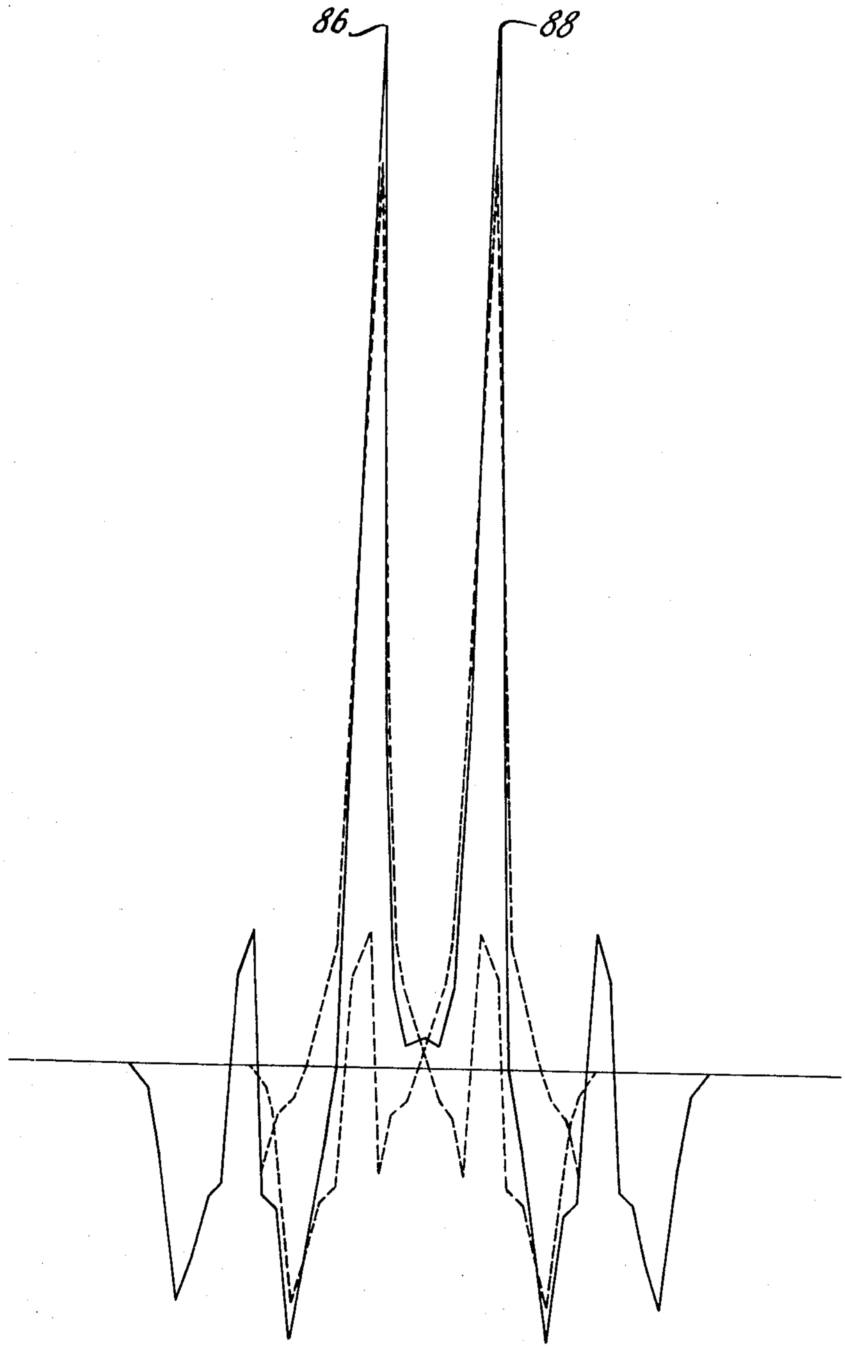

In FIG. 40*g*, the separation between the respective apices is now only 8 units and the opposite effect has occured, namely — that positive zones in each of the reconstituted Airy discs have additively brightened the original apices, resulting in a greater contrast between the heightened apices and their surround.

Figure 40H:
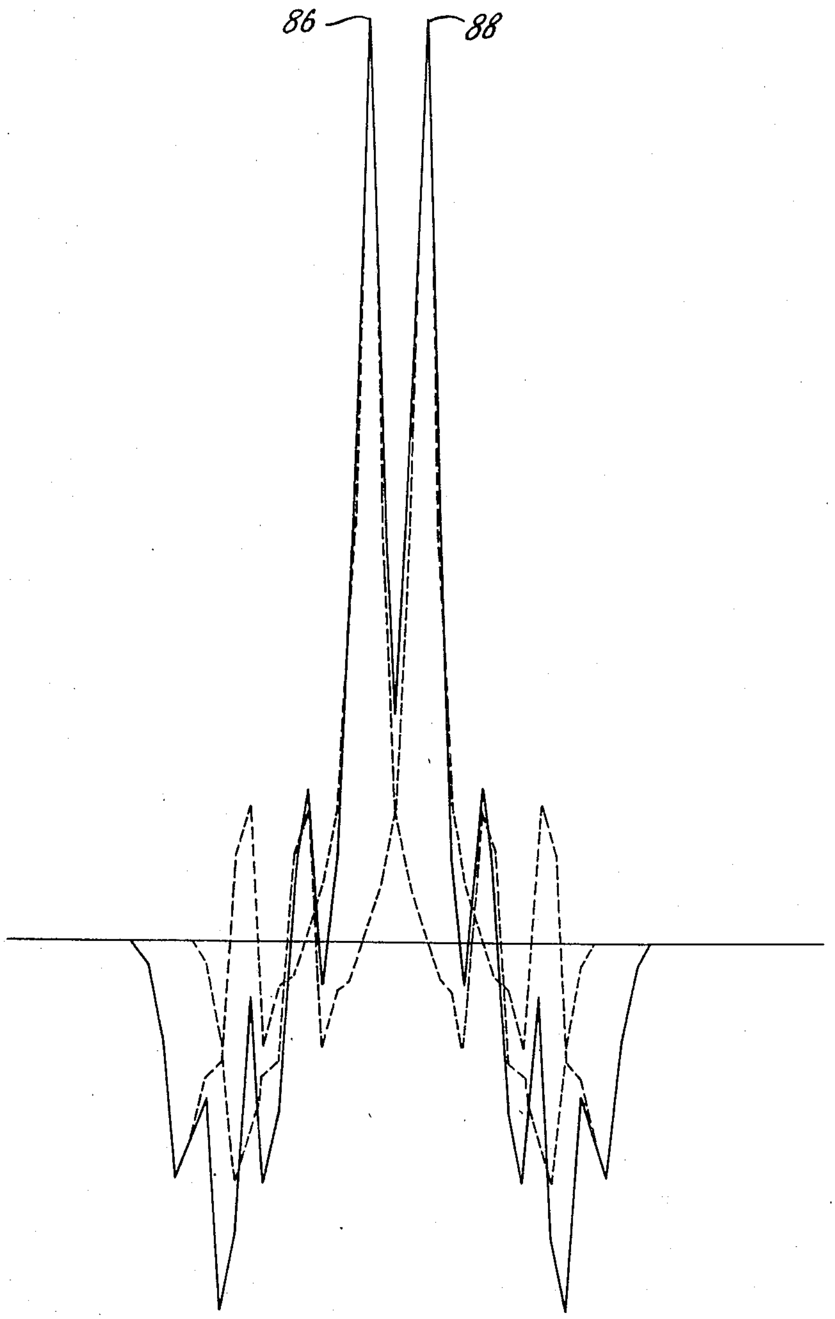

In FIG. 40*h*, the apices 86 and 88 are, in fact, only 4 units apart, but they are still recognizable as separte.

Figure 40I:
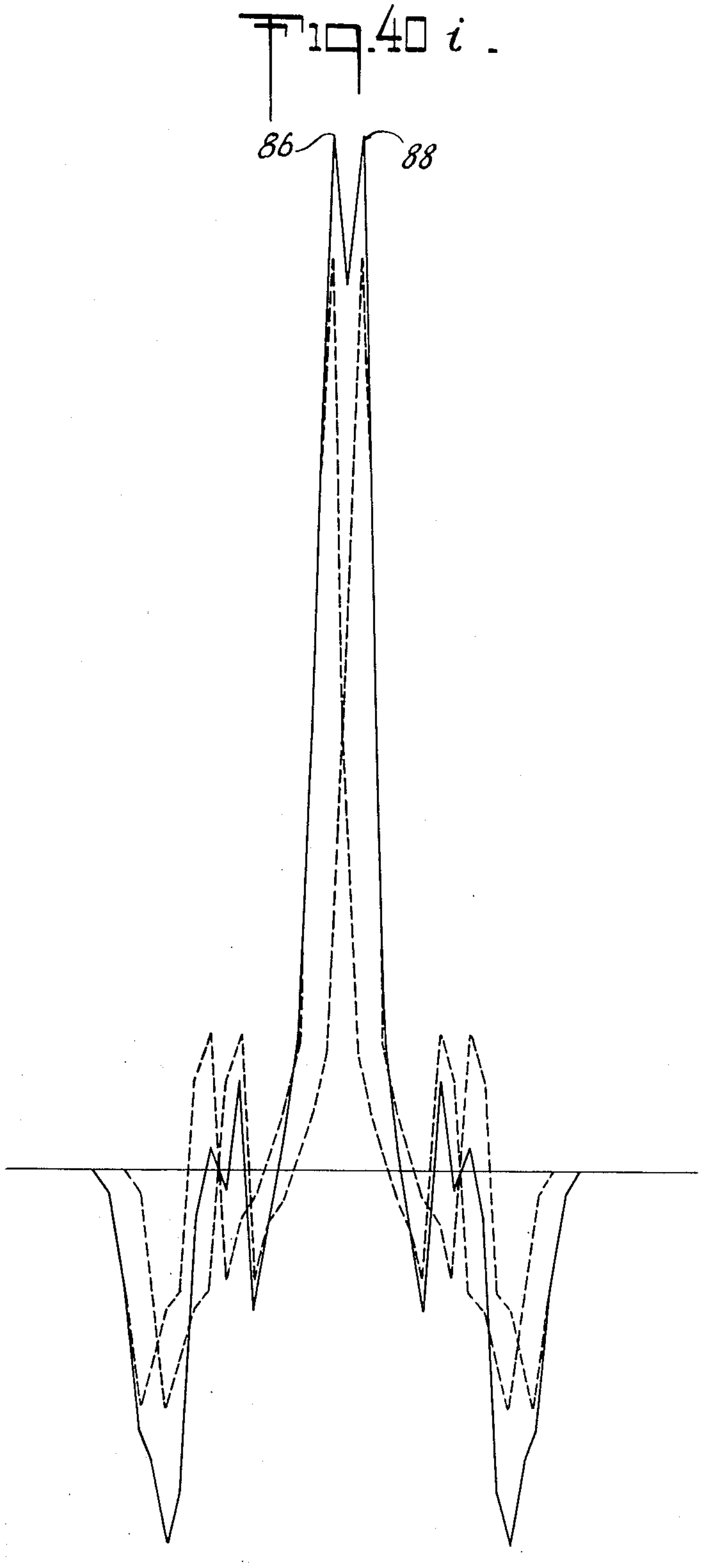

FIG. 40*i* shows the two Airy discs separated by but 2 units and they are recognizable as separate since their respective apices 86 and 88 are the brightest points in the resultant pattern.

Having thus, in effect, shown the results of overlap in nearby point spread functions, and having reviewed some of the principles of denutation, a practical example of the method for resolving a multiple overlap complex of Airy discs will be shown. The next series of figures will portray the build-up of the combined point spread function of 5 overlapping Airy discs, randomly spaced. They will also show the change in the pattern of illumination as each new Airy disc is added to the combination and the manner in which in which the resultant combination is manipulated to effect complete resolution. The method evolved in the present invention, as previously described will be utilized. The solid lines denote the point spread functions of each Airy disc combination and the dotted lines denote the components of each new combination consisting of the point spread functions of each new Airy disc as it is added to the previous Airy disc combination.

Figure 41A:
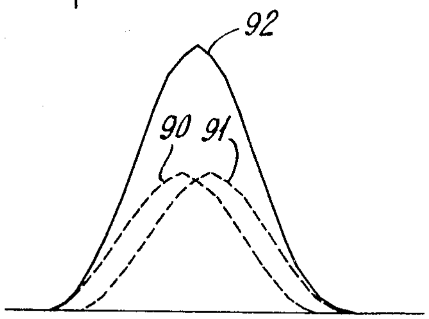

To begin, in FIG. 41*a*, there are shown two Airy discs 90 and 91, the accummulation of whose brightnesses form the first Airy disc combination 92.

Figure 41B:
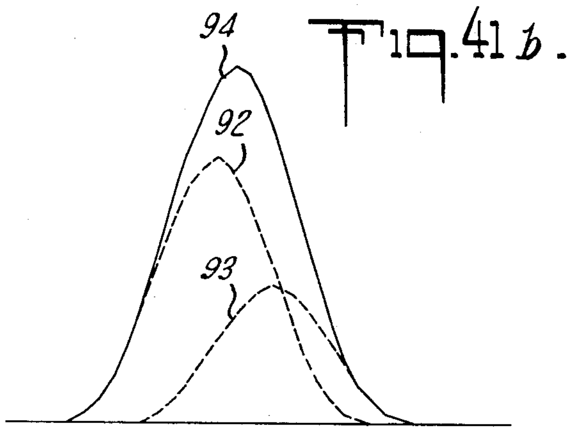

In FIG. 41*b*, a third Airy disc 93 is added to the two Airy disc combination 92, the third Airy disc 93 out of phase with Airy discs 90 and 91, to form a three Airy disc combination 94.

Figure 41C:
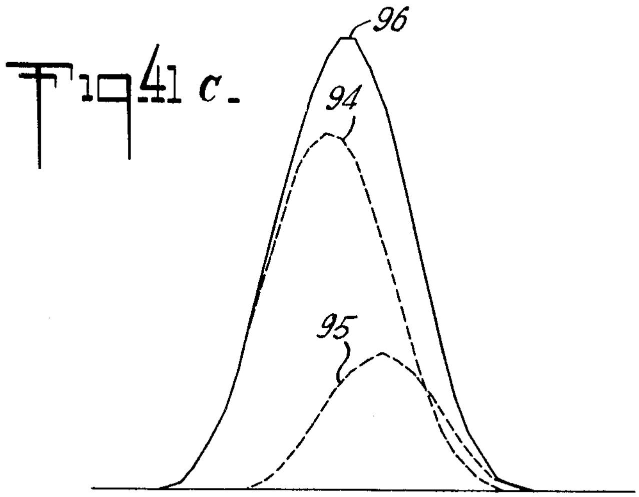

In FIG. 41*c*, a fourth Airy disc 95 is added to the three Airy disc combination 94, the fourth Airy disc 95 out of phase with Airy discs 90, 91 and 93, to form a four Airy disc combination 96.

Figure 41D:
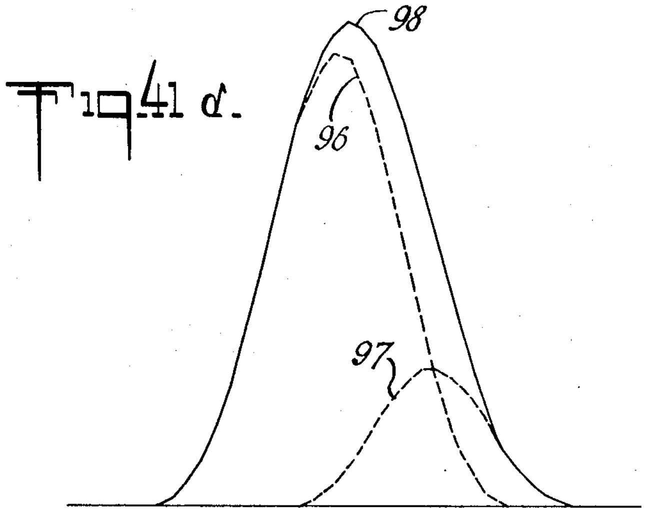

In FIG. 41*d*, a fifth Airy disc 97 is added to the four Airy disc combination 96, the fifth Airy disc 97 out of phase with Airy discs 90,91,93 and 95 , to form a five Airy disc combination 98.

The method of manipulating the five Airy disc combination will be explained, using the figures that follow to demonstrate the retrieval of the five original point sources of light, responsible for the Airy discs which combined. Five image points will be retrieved to correspond to the five object point as they originally existed in space, prior to diffraction.

Figures 42, 42A, 42B, 42C:
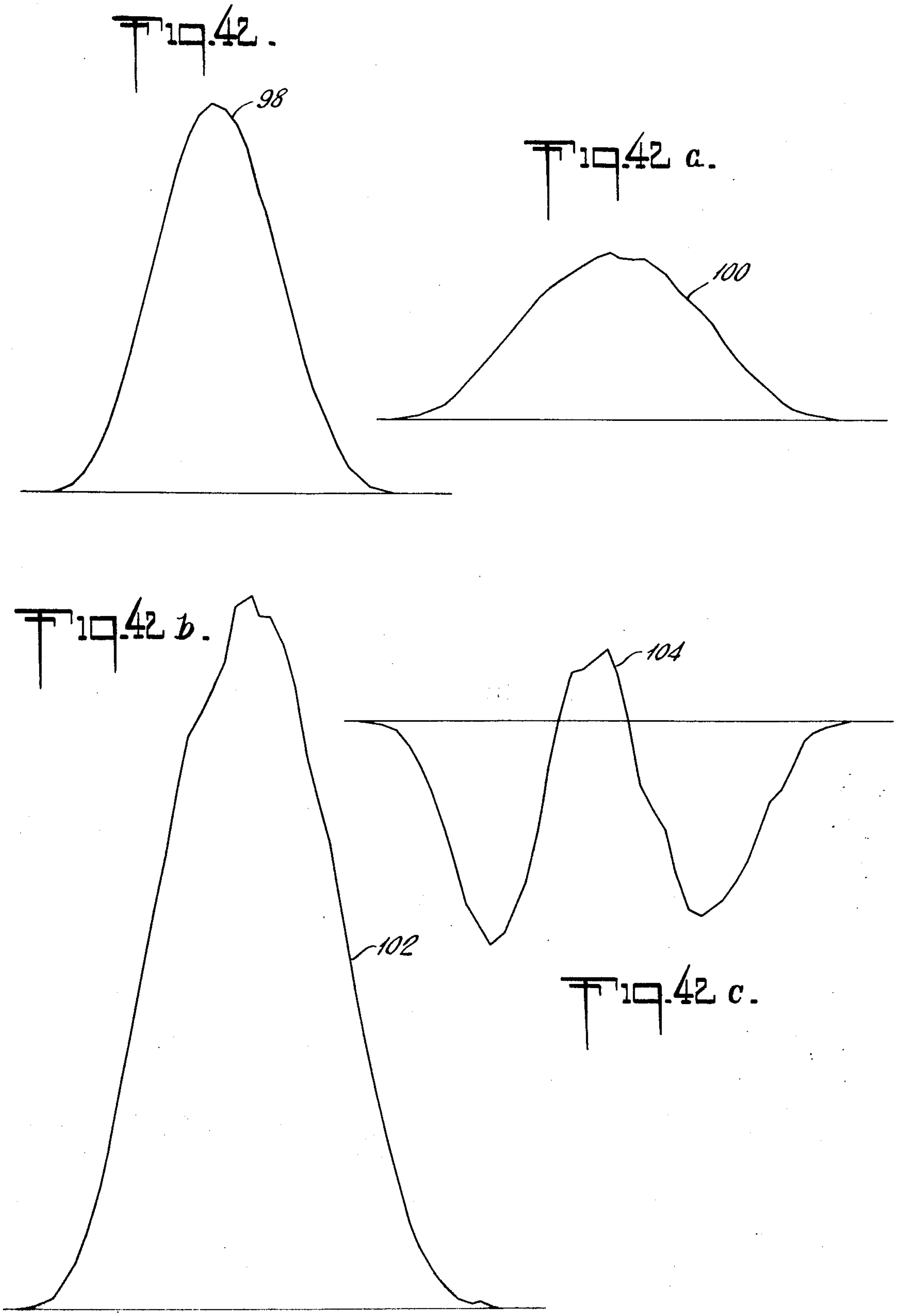

FIG. 42 shows a representative section of the point spread function complex 98 of the five Airy disc combination. This is the brightness distribution pattern of an image of an "unknown" object, this image formed by a diffraction-limited optical system. The reconstitution of this image is accomplished by the procedure illustrated in FIG. 33 through FIG. 39 as previously described. This procedure includes the use of the previously calculated parameters in two cycles of nutation-amplification-denutation.

The first step in the reconstitution, is nutation of the pattern shown in FIG. 42. The combined point spread function complex of which 98 in FIG. 42 is a representative section, is nutated in a circular pattern, with a diameter of nutation of 11.5 units, as discussed with respect to FIG. 34. This first nutation results in the first revision of the original combined point spread function complex 98, and the representative section of this complex after the first nutation is shown as 100 in FIG. 42*a*.

The second step as evolved in the previously discussed method, is amplification by a factor of 4.3. This previous discussion was with respect to FIG. 35. The amplification results in the second revision of the revised point spread function complex after the first amplification is shown as 102 in FIG. 42*b*.

This third step, as evolved in the previously discussed method, is denutation. This previous discussion was with respect to FIG. 36. Formula 4 was applied, using each pair of corresponding y values as displayed in FIG. 42 and FIG. 42*b*, to arrive at a denutated y value. The resultant denutated y values are shown as 104 in FIG. 42*c*. This first denutation results in the third revision of the point spread function complex and 104 in FIG. 42*c* is the representative section of this complex after the first denutation.

Figure 42D:
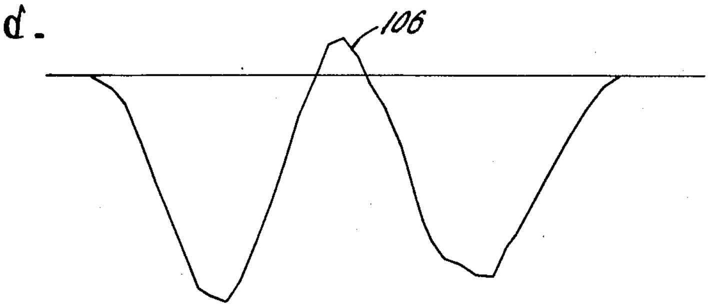

The fourth step, as evolved in the previously discussed method, is a second nutation — this second nutation being the nutation of the third revision of the combined point spread function complex represented by 104, in a circular pattern, using a diameter of nutation of 3.5 units. The previous discussion was with respect to FIG. 37. This second nutation results in the fourth revision of the combined point spread function complex and the representative section of this complex after the second nutation is shown as 106 in FIG. 42*d*.

Figure 42E:
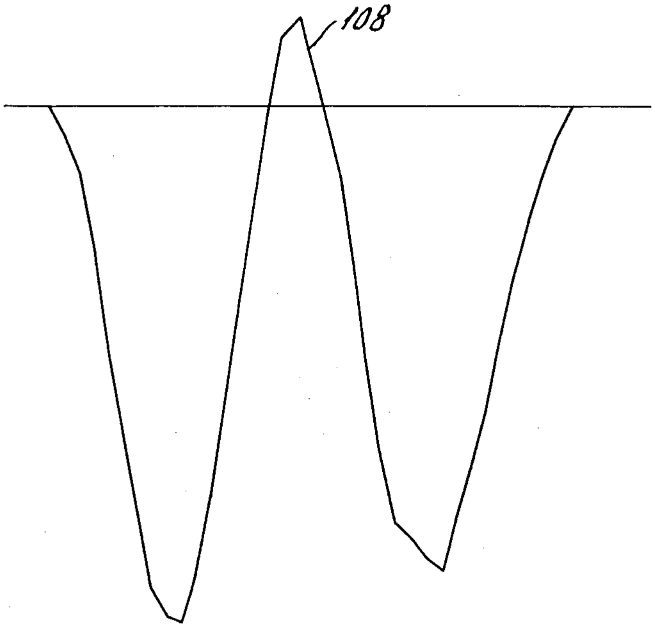

The fifth step, as evolved in the previously discussed method, is amplification by a factor of 2.3. This previous discussion was with respect to FIG. 38. The amplification results in the fifth revision of the combined point spread function complex, and the representative section of this complex after the second amplification is shown as 108 in FIG. 42*e*.

The sixth and final step, as evolved in the previously discussed method, is a second denutation. This previous discussion was with respect to FIG. 39. Formula 4 was applied, using each pair of corresponding *y* values as displayed in FIG. 42*c* and FIG. 42*e*, to arrive at a final denutated *y* value. The resultant *y* values are shown as 110 in FIG. 42*f*. This second denutation results in the sixth and final revision of the point spread function complex, and 110 in FIG. 42*f* is the representative section of this complex after the final denutation.

Figure 42F:
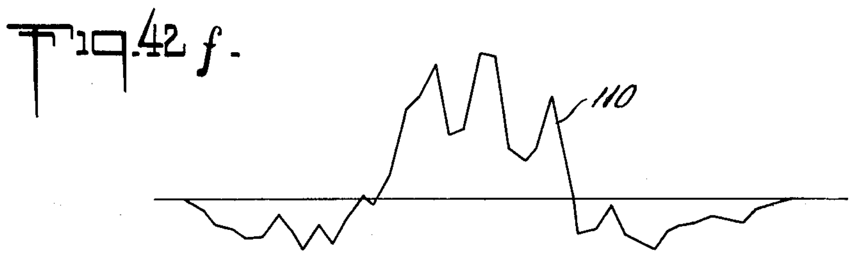

FIG. 42*f*, then, represents a display of the representative section of the finally revised combined point spread function complex. This revision is a reconstitution of the point spread function complex, resulting from an unknown combination of overlapping Airy discs, shown in FIG. 42.

A discussion is now in order of the method for the retrieval from a reconstituted combined point spread function complex, of individual image points which correspond to original object points, this complex resulting from the manipulation of an image after diffraction, of a pattern of unknown object points. The reconstitution complex more closely resembles, but does not yet correspond, to the original object points. This discussion with respect to the FIG. 40 showed that, within the limits of grid size, two reconstituted Airy discs may overlap so that their centers may be separated by but 2 units, and still be distinguishable as separate. Now, if the two original overlapping Airy discs as imaged by a diffraction-limited optical system are unequal in brightness, the central point in the brighter Airy disc, after reconstitution, is still the brightest point in the pattern after the final revision of the combined point spread function complex. Therefore, with respect to the two overlapping reconstituted Airy discs, it may be stated that the brightest point or points in a pattern that has been reconstituted, correspond in location to real, not spurious, point or points in object space.

If three reconstituted Airy discs overlap so that the distance between each of their centers is equal, and they are also of equal brightness, their centers will still be the brightest points in the final pattern of reconstitution. This is true because when the third disc is added to the other two already discussed, and it is of equal brightness, it causes either an equal dampening or an increase in the brightness of the centers of the first two discs and suffers the same effect from the other two. When the three discs are equidistant, each of their centers coincides with identical brightness zones of the other two, and is equally heightened or dampened. If the additive effect, whether positive or negative, of one reconstituted Airy disc overlapping another will not result in the loss of identity of the other, the addition of a third disc, therefore, will not result in a loss of identity between the first two.

If the three equidistant overlapping Airy discs are of unequal brightness, it is apparent that the center of the brightest disc is the brightest point in the resultant pattern. Therefore, it may be concluded that when three equidistant Airy discs overlap, the brightest point or points in the resultant pattern correspond in location to an original object point or points before diffraction.

Now, if three reconstituted Airy discs whose centers are not equidistant overlap, a new condition prevails. The third disc may either: (1) heighten the centers of the first two; (2) dampen the centers of the first two; or (3) dampen the center of one and heighten the center of the other. The first possibility may be considered.

If the centers of the first two are heightened, they cannot be heightened equally, unless the center of the third is equidistant from the centers of the other two. This is true because nowhere in the point spread function of the third are two *y* values of equal intensity except when they are equidistant from the center. This possibility has already been discussed.

Now, if the centers of the first two are at a minimum separation of 2 units, and all three are not equidistant, the center of the third must lie more than 2 units from at least one of the first two. If the third heightens both the first two, the third, in turn, is also heightened by both the first two. Now, in FIG. **40*i***, the *y* value midway between apices 86 and 88 must be increased by the addition of a third reconstituted Airy disc so that this midpoint is greater than both 86 and 88 in order to cause a loss of identity of at least one of the apices as a location corresponding to an original object point. An increase in this mid *y*, along with increases in 86 and 88 so that the mid *y* has greater brightness can only take place when a peak from the overlap of a third reconstituted Airy disc coincides with the mid *y*. The only positive peak, other than at the center, lies a number of units peripheral to the center of the third reconstituted Airy disc. This peripheral positive peak may be seen clearly in FIG. 39. The effect of the overlap of the first two reconstituted Airy discs on the third may now be considered in this circumstance.

The center of the third is reciprocally heightened by the first two. The peripheral positive peaks of each of the first two cannot both coincide with the *y* value adjacent to the central *y* of the third, because they are not equidistant from the third. However, the *y* values adjacent to the peripheral peaks of the first two will coincide with the center of the third. Both these values are positive and will heighten the central *y* value of the third. The central *y* value of the third, then, must be greater than the spurious mid *y* value between the first two. The *y* values adjacent to the central *y* of the third will each coincide with the *y* values adjacent to the peripheral positive peaks of the first two. Since each pair of these coinciding values is less than half the intensity of the central *y*, the heightened central *y* of the third is still of greater brightness. Therefore, the heightened central *y* of the third is the brightest point in the resultant pattern of illumination.

Considering the second of the three possibilities, if the addition of a third reconstituted Airy disc results in a dampening of both centers of the first two reconstituted Airy discs, the mid *y* between the centers of these first two must also be dampened. Only at the periphery, in the pattern of reconstitution of the third can this mid *y* be dampened less than the centers of both the first two. This is at the location of the positive peak in the negative zone. If the dampening effect of this peak, when it coincides with the mid *y*, is to suppress apices 86 and 88, the positive slope of its peak must not exceed the negative slope of the mid *y*. As this is not so, the mid *y* cannot be the brightest point in the pattern of reconstitution — nor can any other non-centrally. Again, the center of one of the reconstituted Airy discs is the brightest point in the pattern of illumination.

The third possibility that was mentioned, is where the addition of a third reconstituted Airy disc overlaps two other overlapping Airy discs, dampening the brightness of the center of one, and heightening the brightness of the center of the other. In this case, the brighter of the original pair to which the third has been added, may be compared to the third. Since the third dampens one of the original two, it suffers a reciprocal dampening. Also, since the third heightens one of the original two, it gains a reciprocal increase. Only a spurious brightness zone between the brighter of the original two discs and the third, which zone is brighter than the centers of both, can mask an image point as corresponding to an original object point. It has already been established that the centers of the three reconstituted Airy discs are not equidistant, in this case, since, if they were, each disc would have an identical additive effect upon the other two. This possibility has already been considered. One of the $y$ values between the brightest of the original two and the third must be increased to a value greater than both their centers in order to mask the identity of one of their centers as corresponding to an original object point. The $y$ value immediately adjacent to the central $y$ of the third has less than half the intensity of its central $y$. The highest positive peak in the brighter of the two original reconstituted Airy discs, is less than the value of this adjacent $y$ value. Therefore, their combination will still be less in value than that of the center of the third reconstituted Airy disc, and, thus one of the central $y$'s still remains the brightest point in the pattern of illumination of the combined point spread function.

Therefore, it may be concluded that when a third reconstituted Airy disc overlaps two others, under any and all circumstances, at least the brightest point in the resultant pattern of illumination corresponds to an original object point. By similar reasoning, one arrives at a key conclusion which makes possible the retrieval of image points for a resultant point-by-point correspondance with object points. This conclusion is that, at least the brightest point in a reconstituted image complex of overlapping Airy discs corresponds in location to an original object point.

Figure 43A:
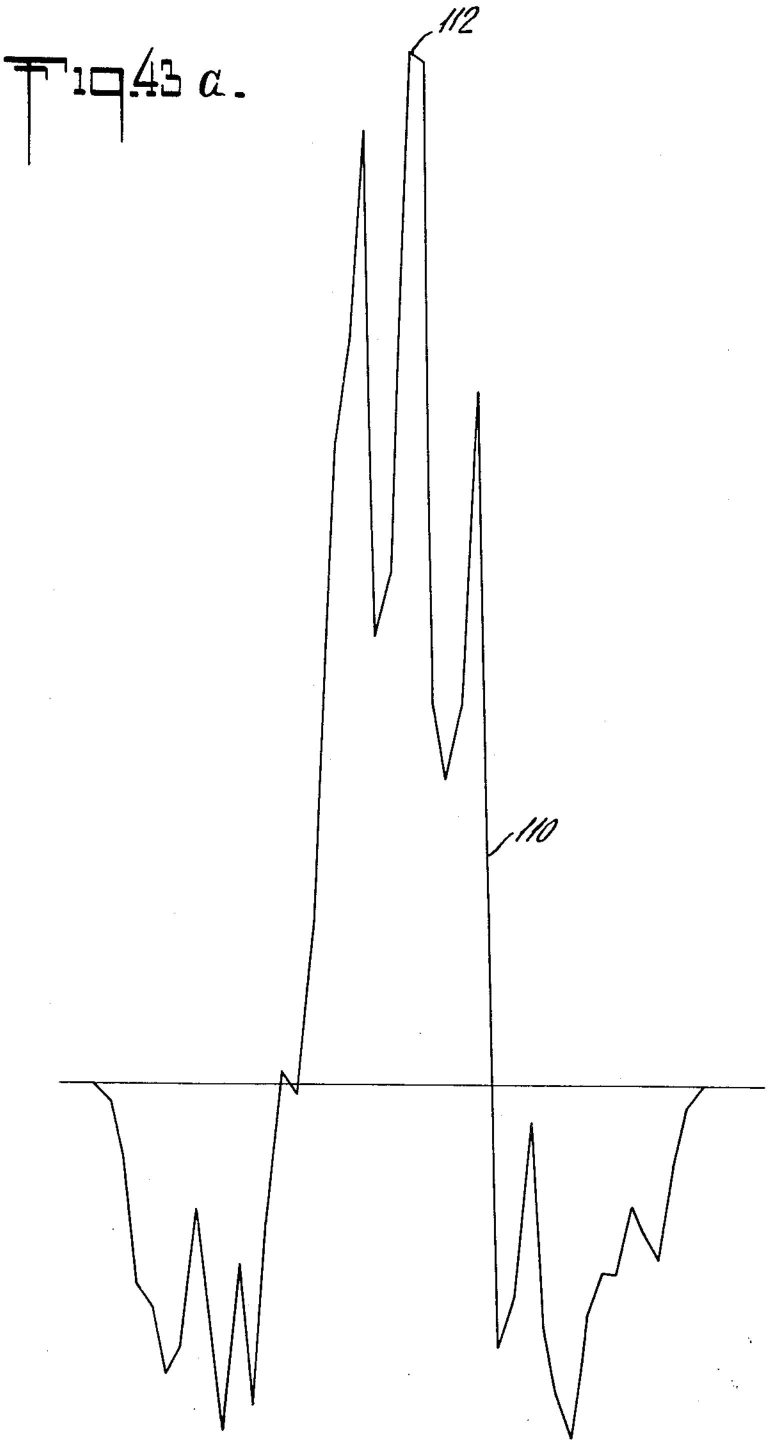

The scale of the representative section 110 in FIG. **42*f* has been increased for purposes of clarity. The result of this amplification is shown in FIG. 43*a*. Point 112 in FIG. 43*a* is the brightest point in the reconstituted point spread function complex, and, therefore, as per the previous discussion, it represents the location of a real object point. This real object point, after diffraction by a diffraction-limited system, followed by the manipulation in two cycles of nutation-amplification-denutation results in a reconstituted Airy disc proportional to that shown in FIG. 39**. This pattern may have been dampened and/or heightened by nearby reconstituted overlapping Airy discs since the pattern under consideration is held to be unknown with respect to its origins.

If an image point at 112 is retrieved from the complex, the point spread function of a reconstituted Airy disc with its center at 112 must be subtracted from the complex. This is considered permissible as it is known that the $x$ coordinate at point 112 is the $x$ coordinate corresponding to a real object point. The question now arises as to the scale of the image point and the corresponding point spread function to be subtracted. Again, point 112, although representing a real $x$ coordinate may have an incorrect $y$ coordinate. If the $y$ coordinate of point 112 correctly represents the central brightness as corresponding to an original object point a 1:1 scale between the reconstitution complex and the reconstituted Airy disc can be assumed for subtraction. If 112 is either heightened or dampened as a result of overlap of nearby point spread functions, a 1:1 scale does not correctly represent the central $y$ brightness as corresponding to that of an original object point.

Now, the question arises as to the effect upon the remainder of the point spread function complex after subtraction, of an incorrectly amplified reconstituted Airy disc point spread function. This can be answered by assigning values to the various $y$ coordinates. First, each of the $y$ values in the reconstituted complex may be assigned a subscript denoting its $x$ coordinate. Therefore, $y_1$ represents the $y$ brightness value at $x$ coordinate 1, $y_2$ represents the $y$ brightness value at $x$ coordinate 2, etc. Second, each of the $y$ values in the reconstituted Airy disc in FIG. 39 may be designated as primed ('). Third, each of the $y$ values of the reconstituted Airy disc point spread function is assigned a subscript corresponding to an $x$ coordinate in the reconstituted complex, beginning with the central $y$ of the reconstituted Airy disc point spread function which corresponds to the brightest $y$ in the com-plex.

In FIG. **43*a*, the $x$ coordinate of point 112** then, corresponds to the coordinate of the central $y$ of the reconstituted point spread function to be subtracted. All the other $y$'s of the reconstituted point spread function are then assigned $x$ coordinate subscripts, according to their $x$ coordinate locations, now that the reconstituted Airy disc point spread function has been "overlaid" upon the reconstituted point spread function complex.

Now, if the brightness value of point 112 is spurious as a result of dampening and/or brightening by the overlap of nearby reconstituted Airy discs, then the actual reconstituted Airy disc point spread function whose center is at the $x$ coordinate of point 112, is artificially amplified to an unknown extent. This unknown amplification factor may be assigned a value of $a$. Therefore, in the elimination procedure, $ay'$ is the expression that denotes the $y$ value to be deducted from the $y$ of the reconstituted point spread function complex at any given $x$ coordinate. It follows, then, that the remainder at any $x$ coordinate after subtraction or elimination is the quantity $(y-ay')$.

Two $x$ coordinate positions may now be considered and these may be designated 1 and 2. If, after elimination, the y values at these coordinates are equal, then the following equation is correct:

$$Y_1-ay_1'=y_2-ay_s' \qquad (19)$$

Then, isolating a, one derives the following:

$$a=(y_2-y_1)/(y_2\mathbf{a}{:}-y_1') \qquad (20)$$

Now, if the amplification factor is changed by the addition of $b$, equation 20 is changed to the following:

$$(y_2-y_1)/(y_2\mathbf{a}{:}-y_1')=a+b \qquad (21)$$

Then, by grouping similarly subscripted variables, one finally arrives at the following:

$$y_1-y_1'(a+b)=y_2-y_2'\,(a+b) \qquad (22)$$

Each side of equation 19 refers to the brightness value at a particular $x$ coordinate, after an elimination, where the resultant $y$ values are equal after this elimination. The $y_1'$ and $y_2'$ values were the respective $y$ values of a reconstituted Airy disc at $x$ coordinates 1 and 2. Both values were amplified by a factor of a in equation 19. As previously state, equation 19 was constituted to demonstrate equality of brightness at these $x$ coordinates after elimination.

However, when the amplification factor is changed by the addition of any quantity to which is assigned the variable $b$, it is seen that, in equation 22, the remaining brightness after the elimination of differently amplified $y$ values is still equal at $x$ coordinates 1 and 2.

Similar reasoning can show that if the brightness at $x$ coordinates 1 and 2 are unequal, with the use of a given amplification factor, they remain unequal and retain the same brightness rank after elimination. Also, by similar reasoning, the other *y* values in the overlapping portion of the remainder will retain the same rank by brightness, regardless of the magnitude of the amplification factor of the reconstituted Airy disc point spread function. Therefore, the highest *y* value in the remainder after subtraction, corresponds in location to an original object point, regardless of magnitude of the amplification factor of the reconstituted Airy disc point spread function. Therefore, the highest *y* value in the remainder after subtraction corresponds in location to another original object point, despite the magnitude of the amplification factor.

Figure 43B:
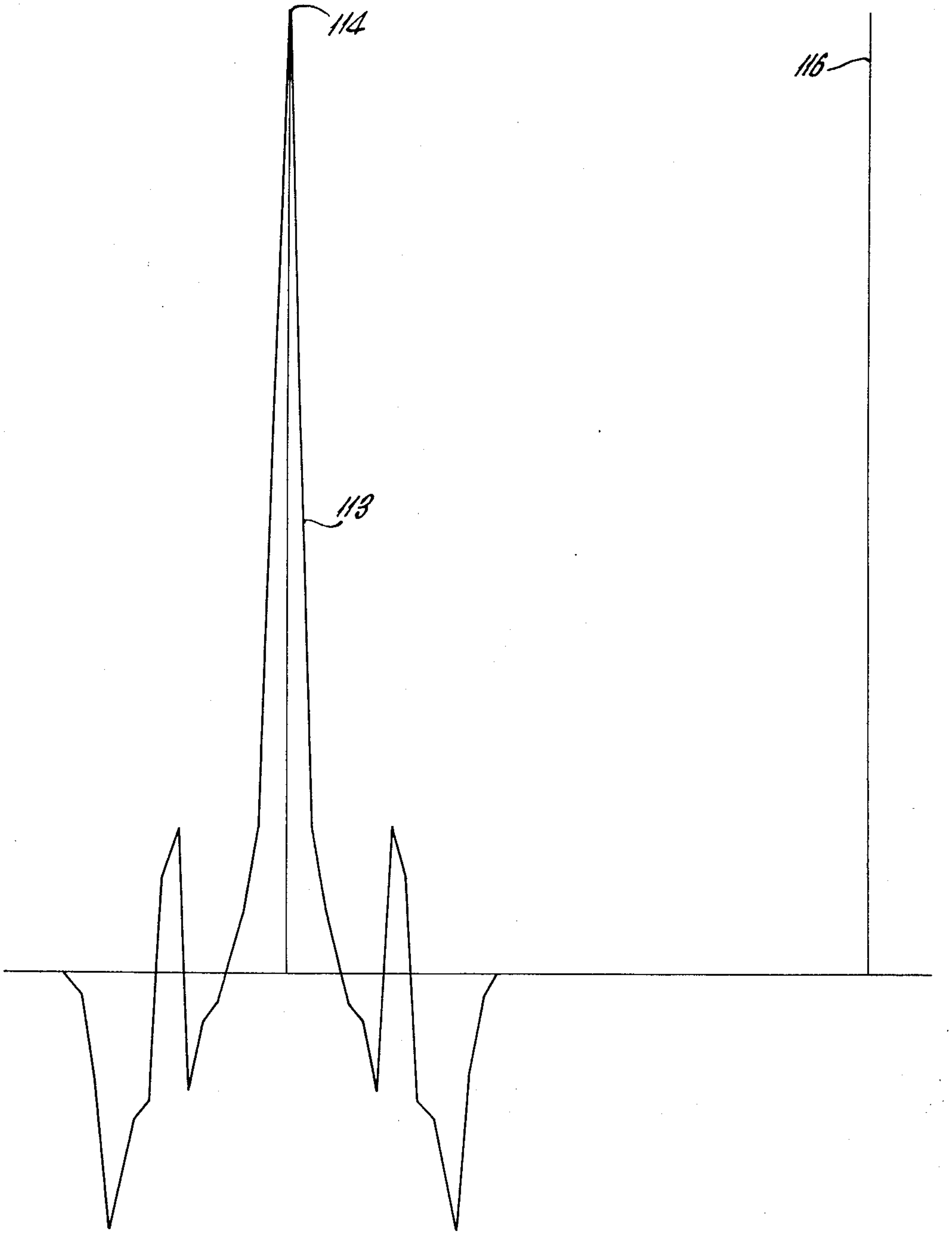

To proceed with the elimination, the reconstituted Airy disc of FIG. 39 is amplified so that its center corresponds in brightness to the y coordinate of 112 in FIG. 43*a*. This amplification is shown as 113 in FIG. 43*b*. The y coordinate of 112 in FIG. 43*a*, which corresponds to the central *y* value of 114 in FIG. 43*b*, is then placed to one side of FIG. 43*b*, and is shown as 116. Now, 116 represents a retrieved image point which represents an original object point, on another grid, but does not necessarily correspond to it in brightness. This subtraction is the first elimination from the point spread function complex — this complex being the reconstitution after manipulation of the original five Airy disc overlap complex.

Figure 43C:
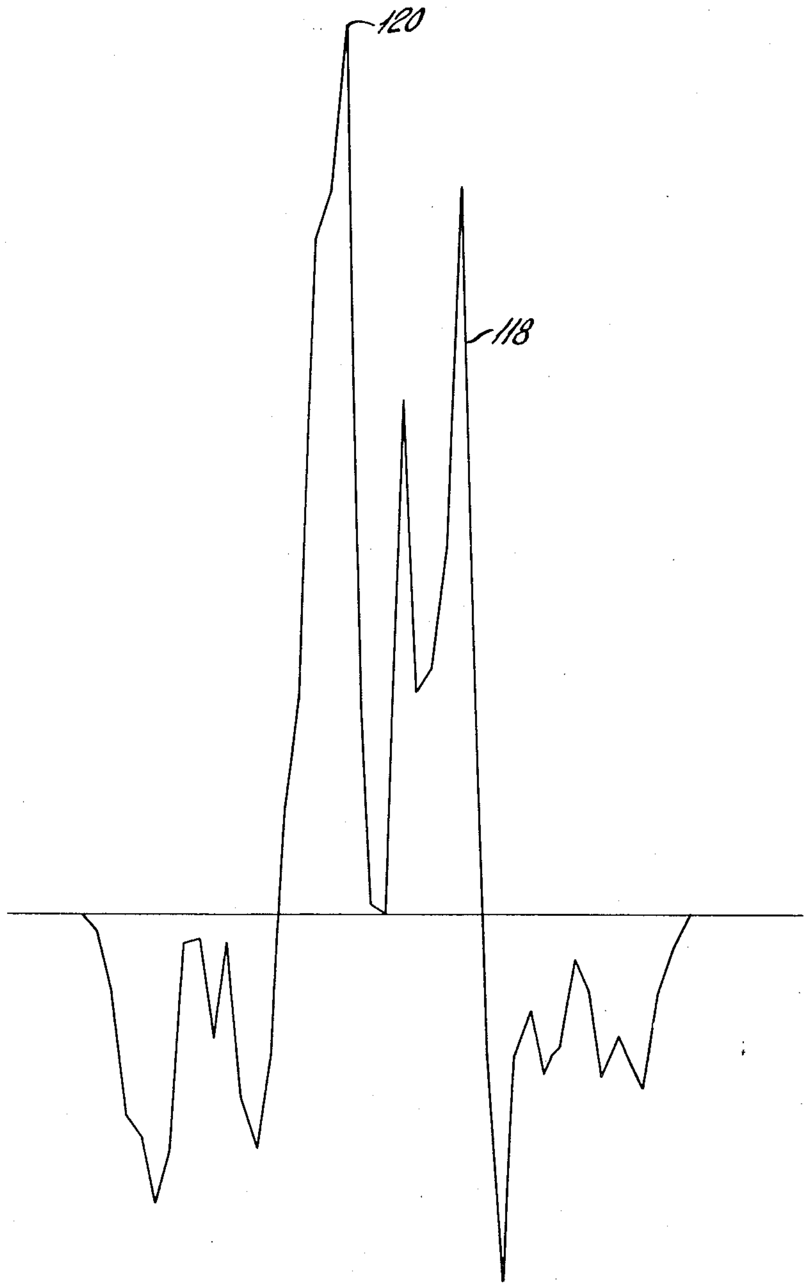

The remainder after the first elimination is shown as 118 in FIG. 43*c*. By the reasoning previously discussed, the brightest point 120 in the remainder again represents an image point which corresponds in location to a real object point.

Figure 43D:
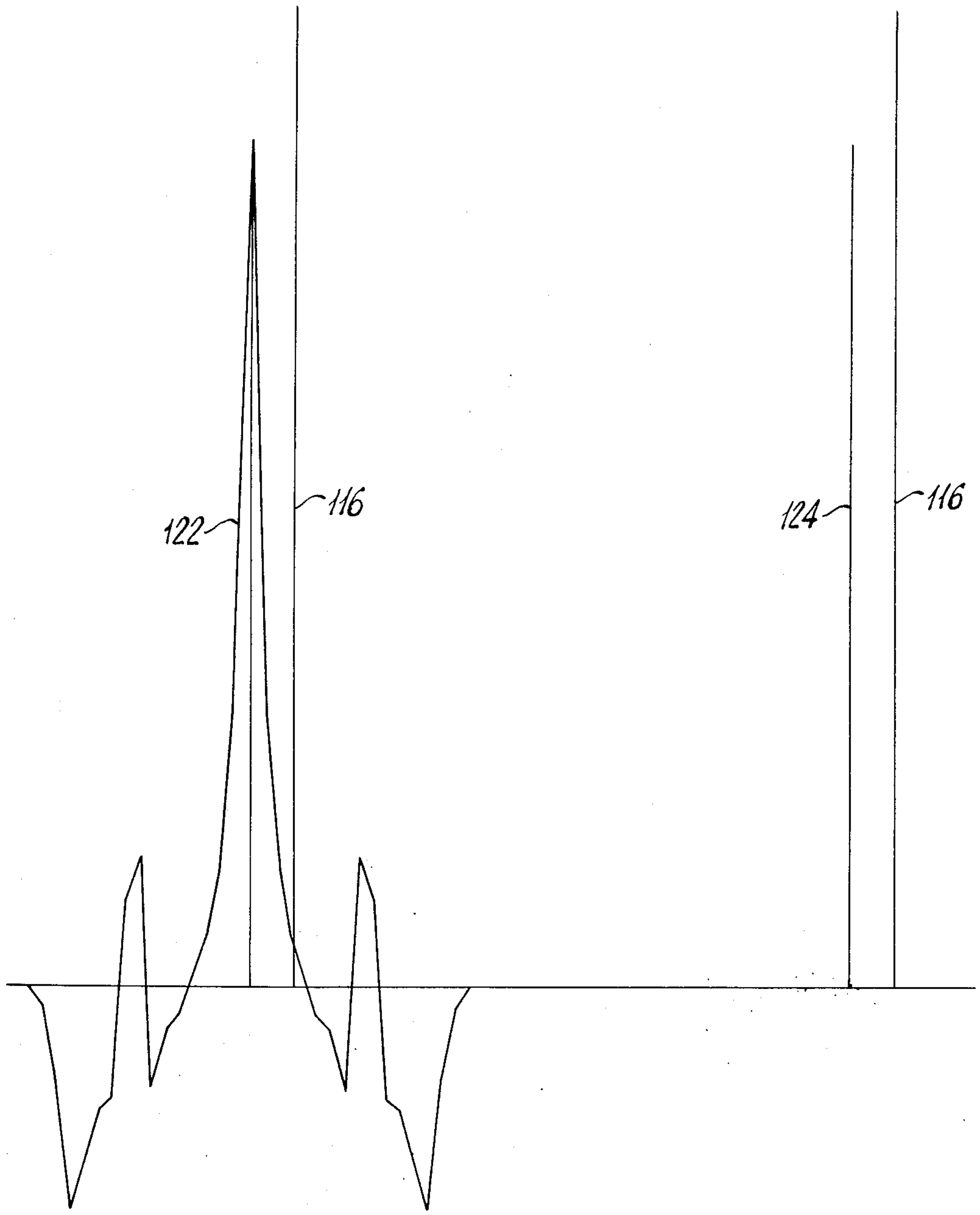

Again, the reconstituted Airy disc of FIG. 39 is amplified, this time so that its center corresponds in brightness to the *y* coordinate of 120 in FIG. 43*c*. This amplification is shown as 122 in FIG. 43*d*. The *y* value of 120 in FIG. 43*c*, which corresponds to the central *y* value of 122 in FIG. 43*d* is then placed to one side of FIG. 43*d*, alongside of 116, from the previous elimination, and is shown as 124. Now, 116 and 124 represent two image points on another grid which correspond in location, but not necessarily in brightness, to two original object points. The first retrieved image point 116 also appears on the same grid as the amplified reconstituted Airy disc point spread function in FIG. 43*d*, to demonstrate the spatial relationship of the *x* coordinates.

Figure 43E:
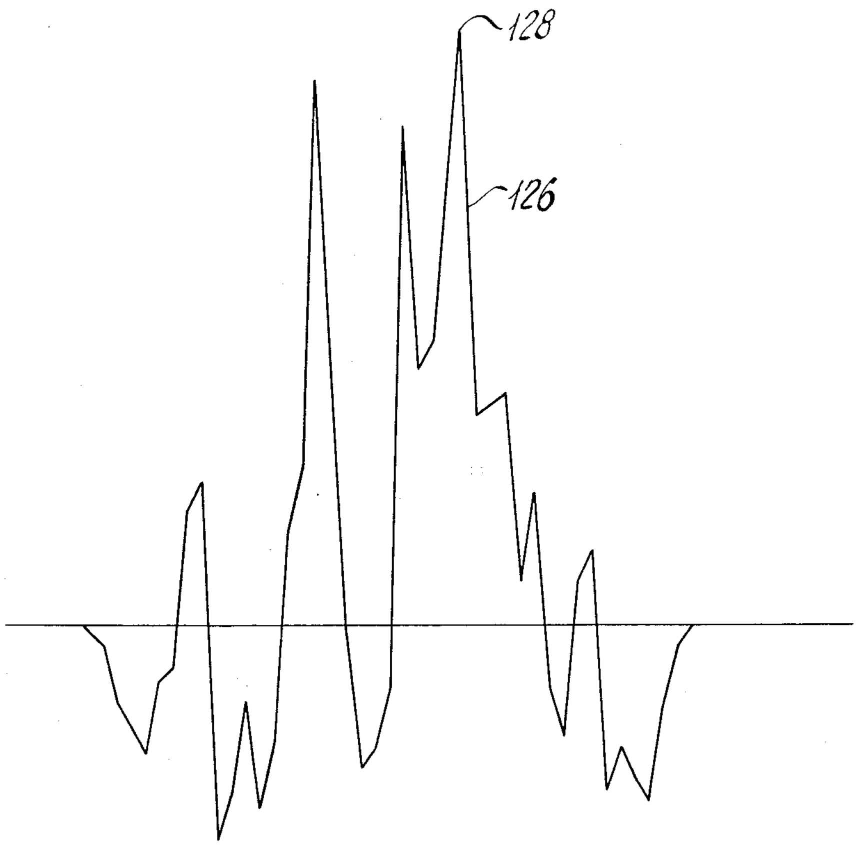

The remainder of the point spread function complex after the second elimination is shown as 126 in FIG. 43*e*. The brightest point in this elimination is designated as 128, which represents an image point corresponding in location to a real object point.

Figure 43F:
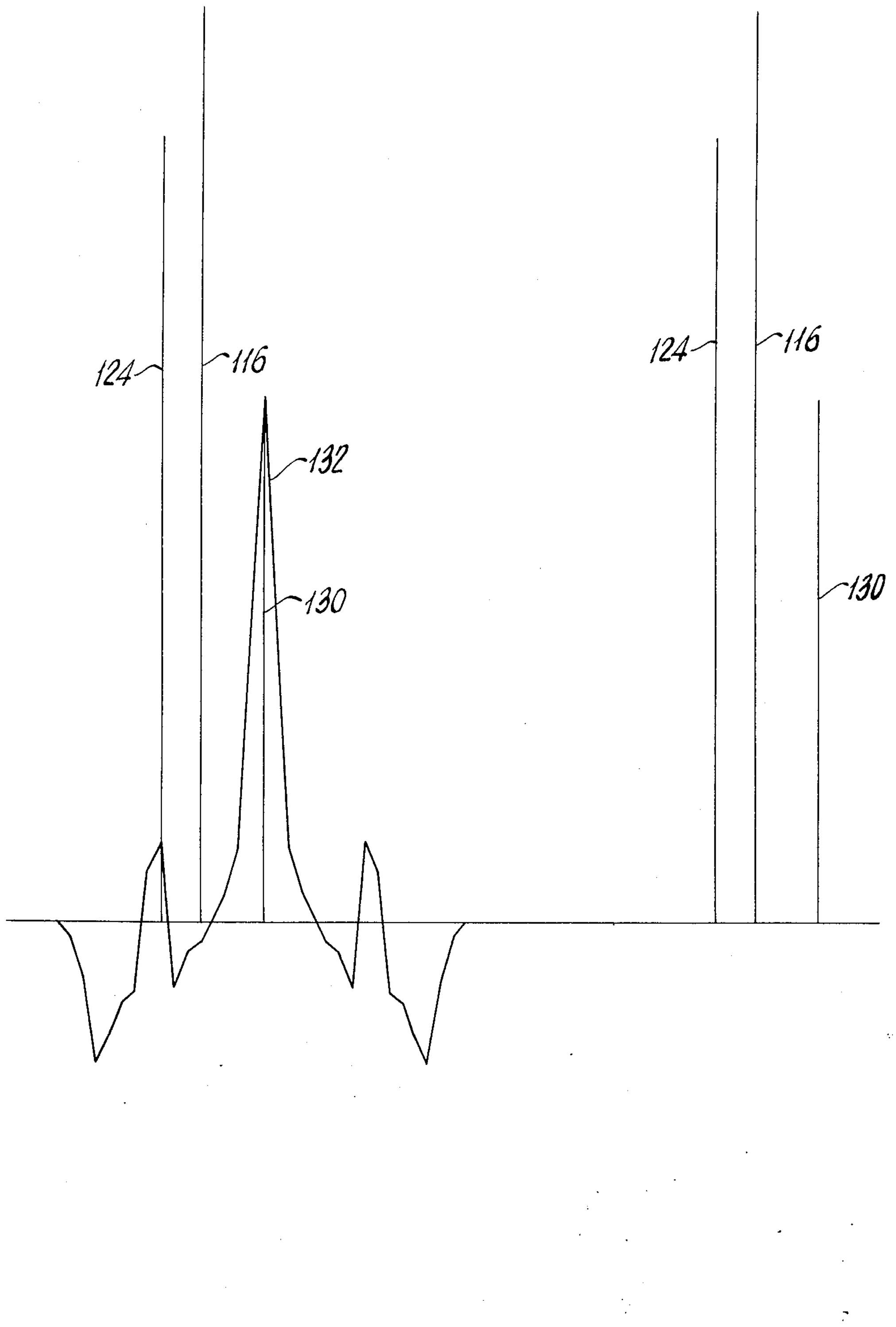

The amplification of the reconstituted Airy disc of FIG. 39, its center corresponding in brightness and location to 128 in FIG. 43*e*, is shown as 132 in FIG. 43*f*. Retrieved image points 116 and 124 are shown in the same grid as the amplified reconstituted Airy disc 132 which is eliminated from the remainder 126 in FIG. 43*e* to demonstrate their spatial relationship with one another, and with the central *y* 130 of the reconstituted Airy disc 132. The three retrieved image points 116, 124 and 130 are also shown in their own grid in FIG. 43*f*.

Figure 43G:
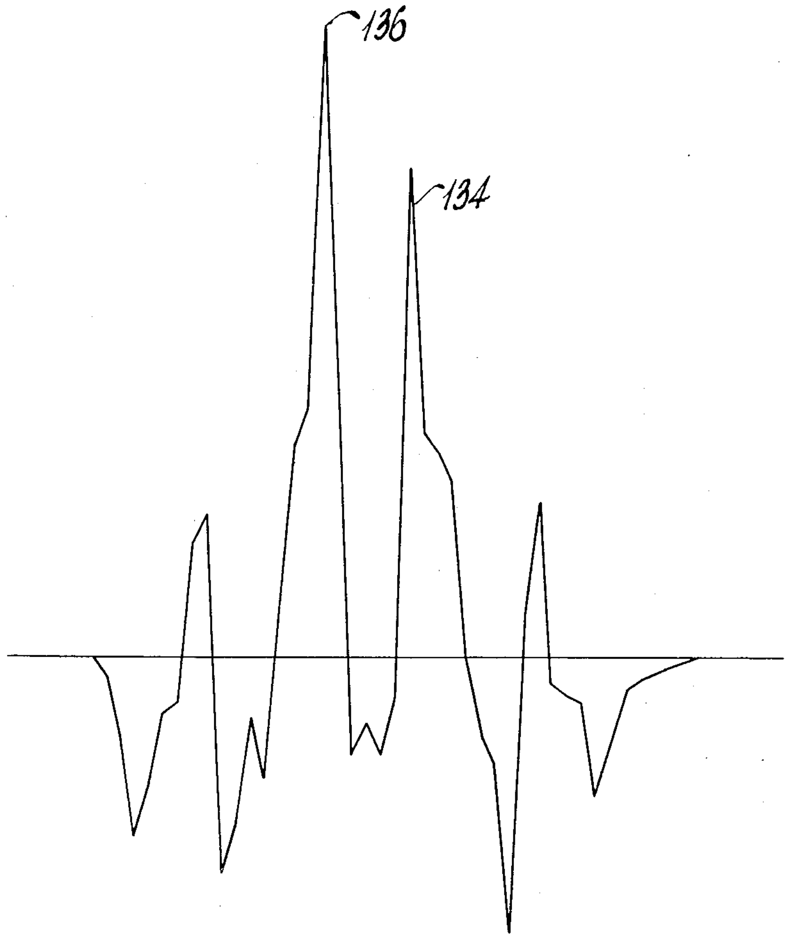

The remainder of the point spread function complex. after the third elimination is shown as 134 in FIG. 43*g*. The brightest point in this remainder is designated as 136, which represents an image point corresponding in location to a real object point.

Figure 43H:
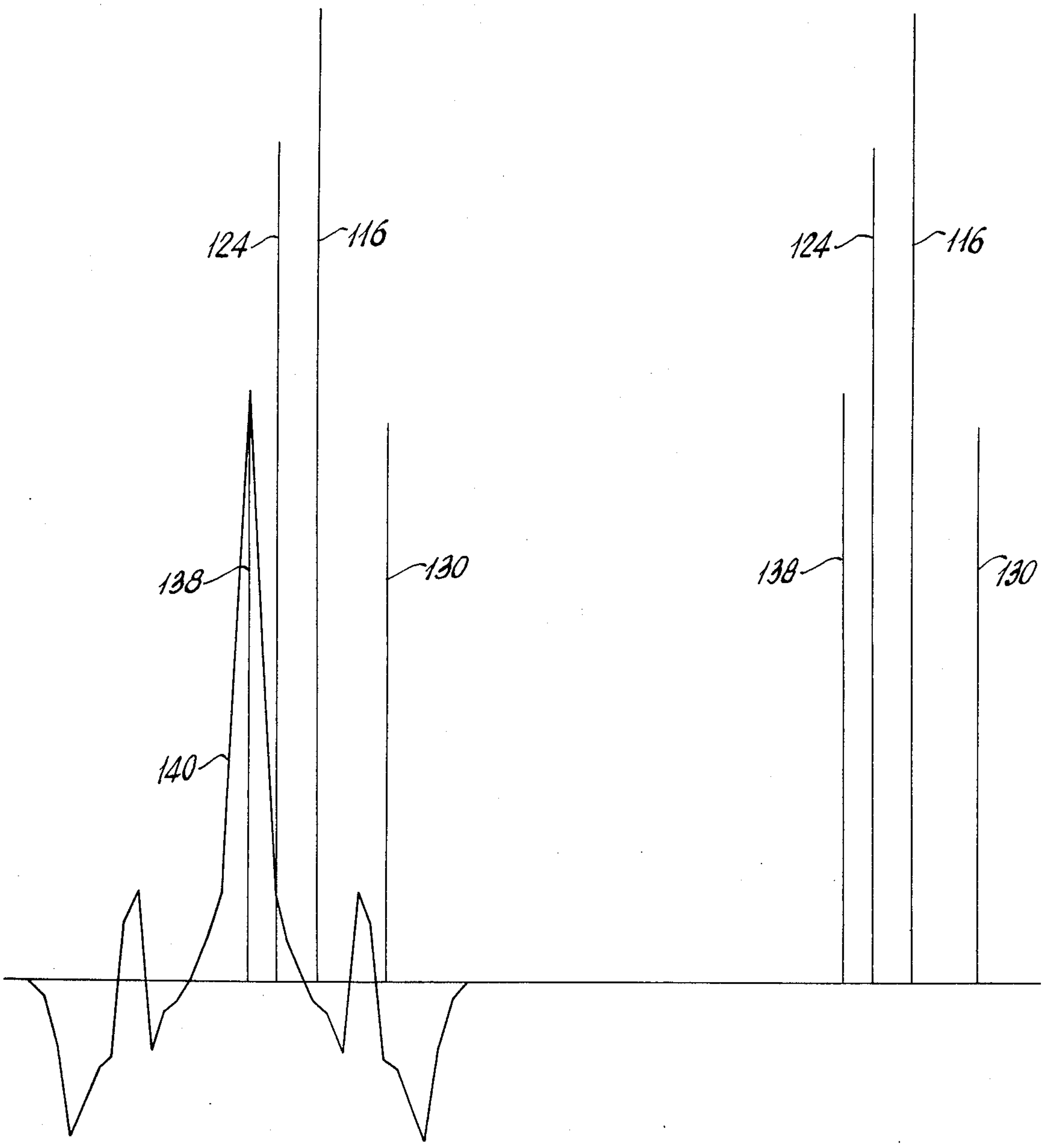

The amplification of the reconstituted Airy disc of FIG. 39, its center corresponding in brightness and location to 136 in FIG. 43*g*, is shown as 140 in FIG. 43*h*. Retrieved image points 116, 124 and 130 are shown in the same grid as the amplified reconstitute Airy disc 140 which is eliminated from the remainder 134 in FIG. 43*g*, to demonstrate the spatial relationship with one another and the central *y* 138 of the reconstituted Airy disc 140. The four retrieved image points 116, 124, 130 and 138 are also shown in their own grid in FIG. 43*h*.

Figure 43I:
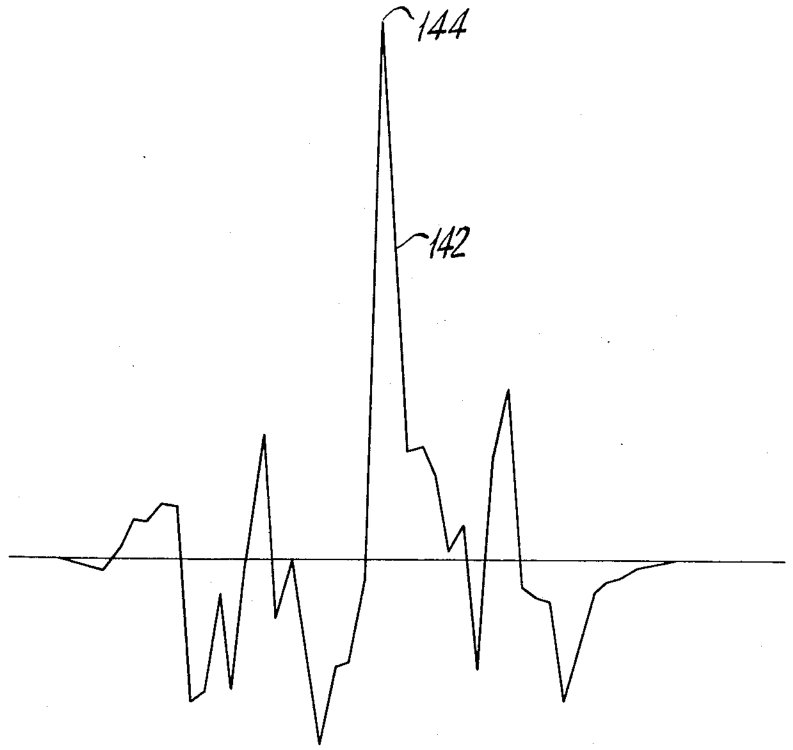

The remainder of the point spread function complex after the fourth elimination is shown as 142 in FIG. 43*i*. The brightest point in this remainder is designated as 144, which represents an image point corresponding in location to a real object point.

Figure 43J:
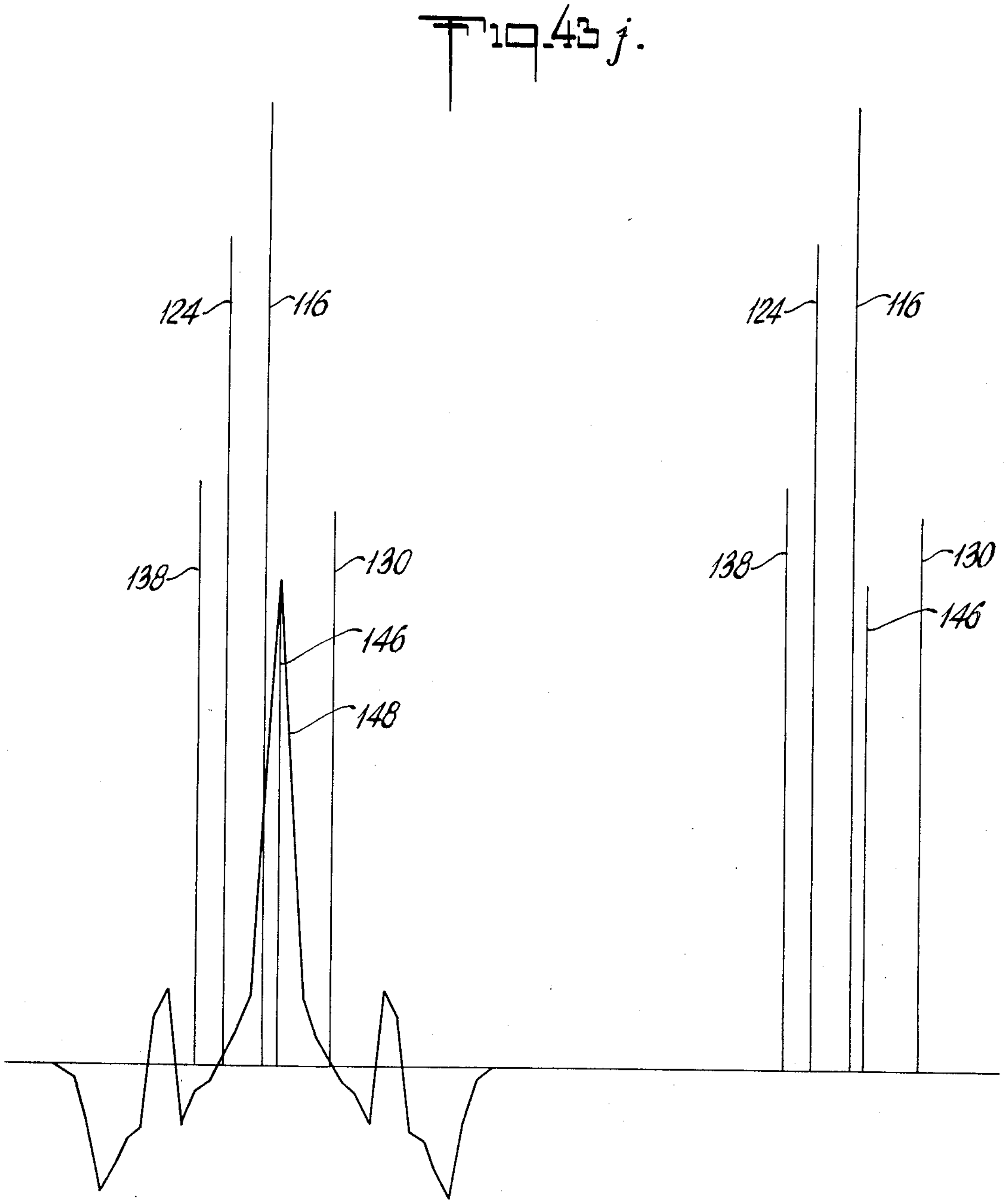

The amplification of the reconstituted Airy disc of FIG. 39, its center corresponding in brightness and location to 144 in FIG. 43*i* is shown as 148 in FIG. 43*j*. Retrieved image points 116, 124, 130 and 138 are shown in the same grid as the amplified reconstituted Airy disc 148 which is eliminated from the remainder 142 in FIG. 43*i*, to demonstrate the spatial relationship with one another and the central *y* 146 of the reconstituted Airy disc 148. The five retreived image points 116, 124 130, 138 and 146 are also shown in their own grid in FIG. 43*j*.

Figure 43K:
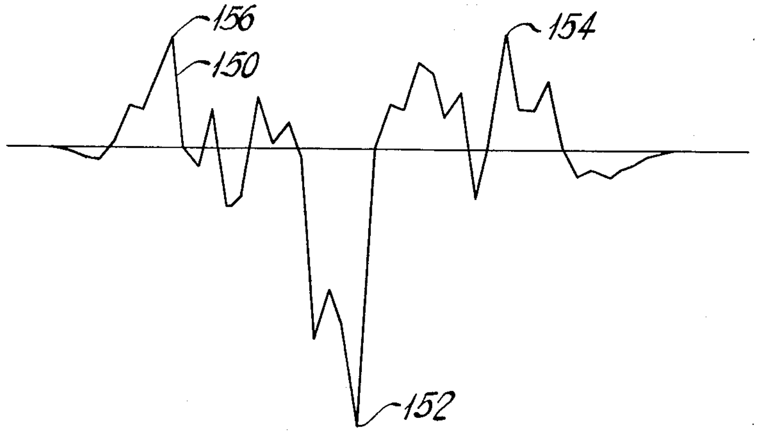

The remainder of the point spread function complex after the fifth elimination is shown as 150 in FIG. 43*k*. Of all the actual values from which 150 was drawn, the *y* coordinates at points 154 and 156 appear to be the brightest of the reconstituted point spread function complex after this fifth elimination. It may also be noted that the nadir has been designated 152 in FIG. 43*k*. This nadir is the greatest absolute *y* value in the complex. The *x* coordinate of this nadir is the same *x* coordinate as the brightest point 112 in the original reconstituted point spread function complex before any eliminations, shown in FIG. 43*a*. It was previously discussed that when the first elimination was made, the subtrahend was a reconstituted Airy disc point spread function of unknown amplification. It was unknown because the magnitude of the highest point of the complex might have been at least partially due to its dampening and/or brightening by neighboring point spread functions within an overlap area. Now, it may be seen that point 112 was heightened by the overlap of a nearby reconstituted Airy disc or discs, since at the same *x* coordinate, after the fifth elimination, there is a negative *y* remainder of higher absolute value than any other *y* value in the complex.

If nearby reconstituted Airy discs overlap so that their nadirs coincided, their centers would still be of greater absolute value than their combined nadir. This can be seen by visualizing an overlap midway between those shown in FIG. 40*b* and FIG. 40*c*. Therefore, it must be concluded that when any nadir in the remainder of a reconstituted point spread function complex has a greater absolute value than any other *y* value in this complex, this nadir resulted from a particular elimination that was spuriously amplified. Thus must be true when the *x* coordinate of the nadir has already been established as corresponding to a real object point. This is true of the $x$ coordinate of 152. In this case, it must be concluded that the very first reconstituted Airy disc point spread function to be eliminated, shown as 113 in FIG. 43*b*, was amplified beyond its true value. The excessive amplification may now be restored to the reconstituted point spread function complex.

This is accomplished by a fractional amplification of the Airy disc in FIG. 39, so that its central $y$ value coincides with the negative $y$ value at nadir 152 and adding, instead of subtracting. The $y$ values of this amplified reconstituted Airy disc point spread function are added to the remainder of the reconstituted point spread function complex after the fifth elimination.

Figures 43L, 43M:
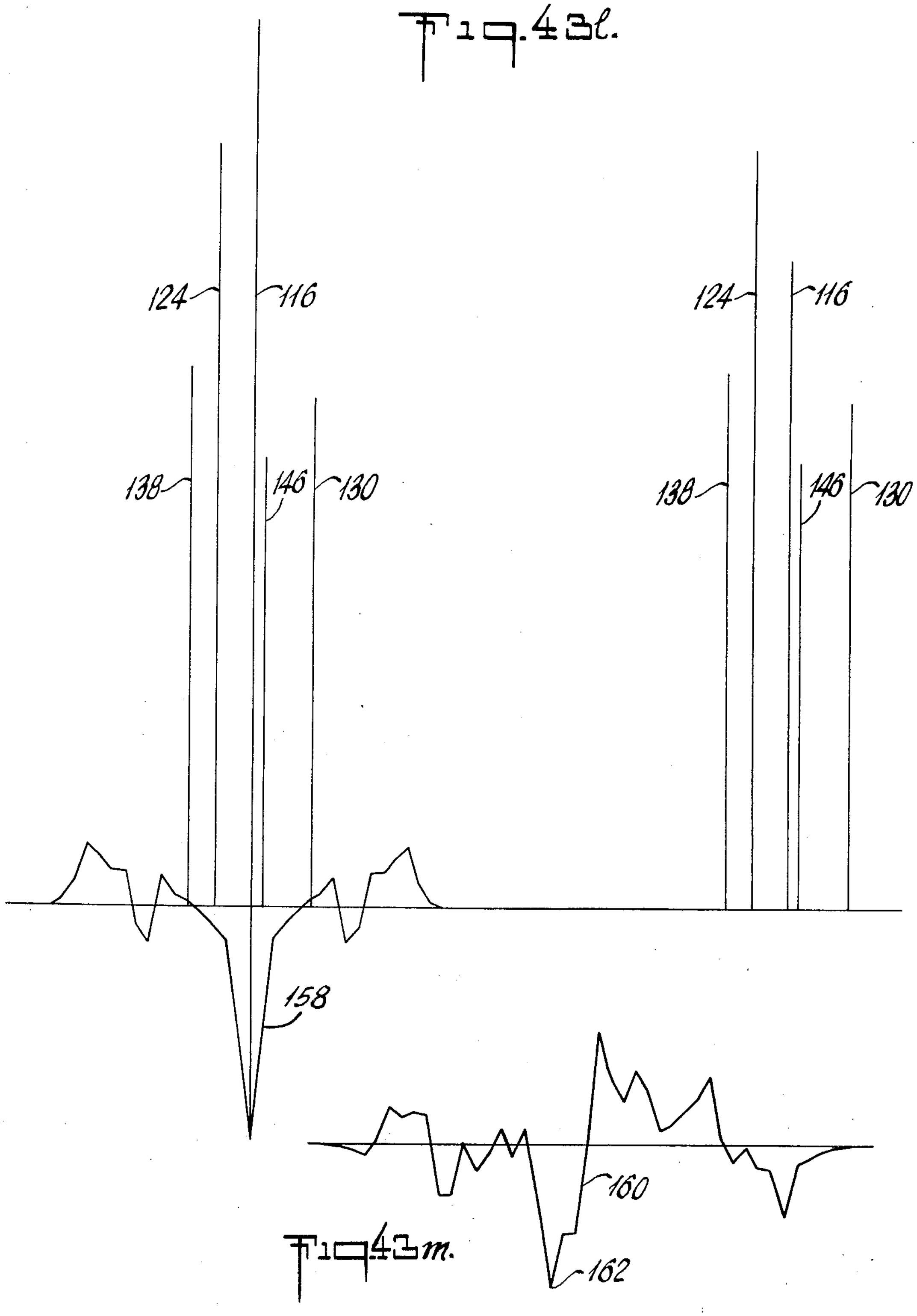

The amplification of the reconstituted Airy disc of FIG. 39, its center corresponding in brightness and location to 152 in FIG. 43*k* is shown as 158 in FIG. 43L. Retrieved image points 116, 124, 130, 138 and 146 are shown in the same grid as the amplified reconstituted Airy disc 158 which is eliminated from 150 in FIG. 43*k*, to demonstrate the spatial relationship with one another and the central $y$ of the reconstituted Airy disc 158. When this reconstituted Airy disc point spread function is eliminated from the previous remainder, its values have been added to the remainder, and, consequently, its central $y$, which is at the same $x$ coordinate as 116, is subtracted from its brightness. The previous $y$ value at 116 is shown in FIG. 43L above the central $y$ value of the "inverted" Airy disc point spread function, and at the same $x$ coordinate.

FIG. 43L also shows retrieved image points after the sixth elimination. The five retrieved image points, except 116 are the same as those in their own grid in FIG. 43*j* — namely, 124, 130, 138 and 146. Image point 116, however, has a lesser value than in FIG. 43L because of the subtraction just carried out.

The remainder of the point spread function complex after the sixth elimination is shown as 160 in FIG. 43*m*. Just as in FIG. 43*k*, the greatest absolute $y$ value is a nadir, rather than a positive apex. This nadir is again due to the excessive amplification of a previously eliminated reconstituted Airy disc point spread function since it has the same $x$ coordinate as 124, previously retrieved.

The Airy disc point spread function of FIG. 39 is again fractionally amplified, this time so that its central $y$ value coincides with the negative $y$ value at nadir 162, and the $y$ values of the fractionally amplified reconstituted Airy disc point spread function are added to the remainder of the reconstituted point spread function complex after the sixth elimination.

Figure 43N:
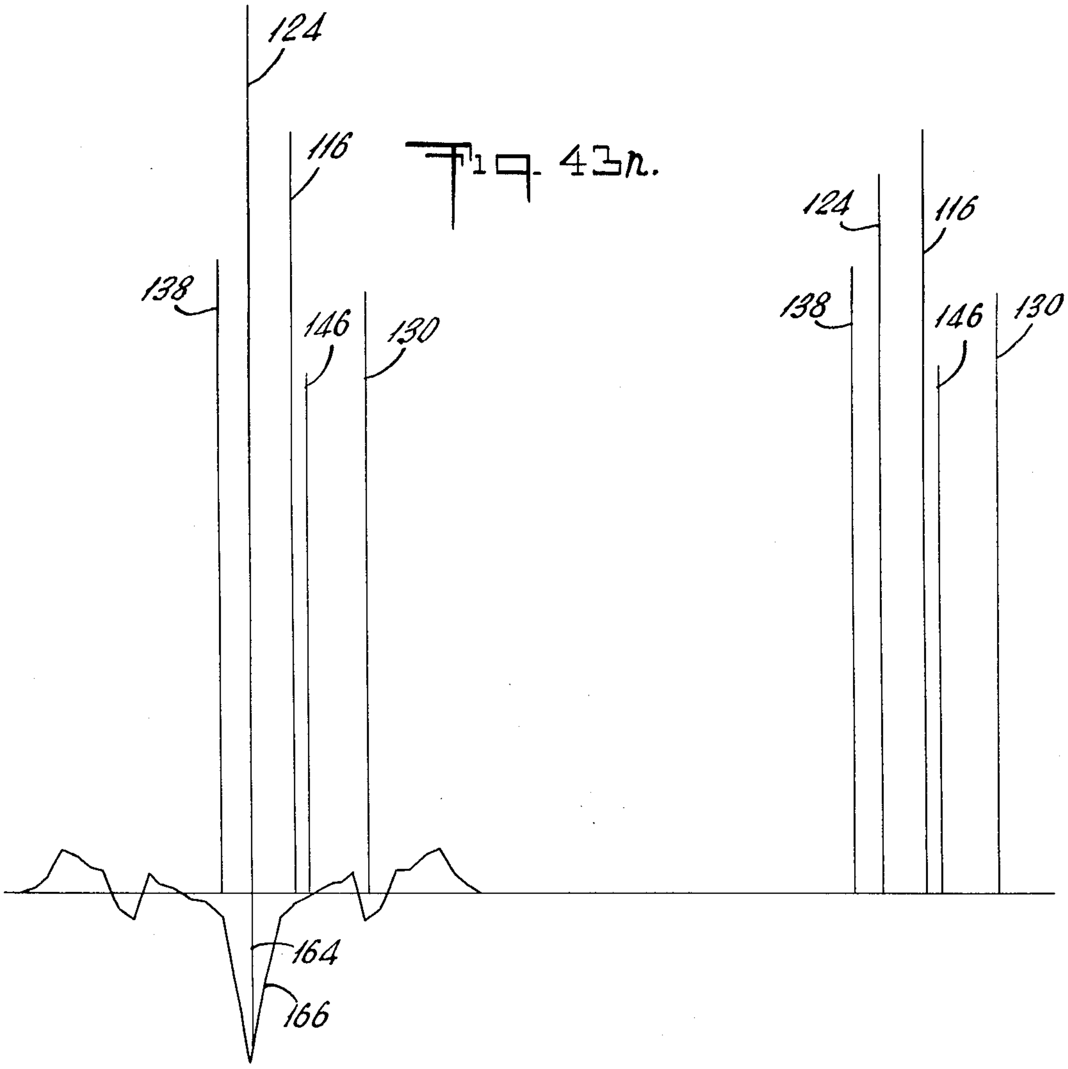
Figure 43O:
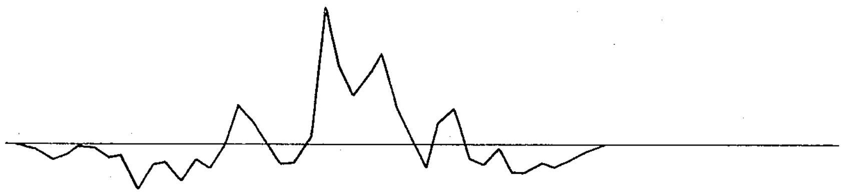
Figure 43P:
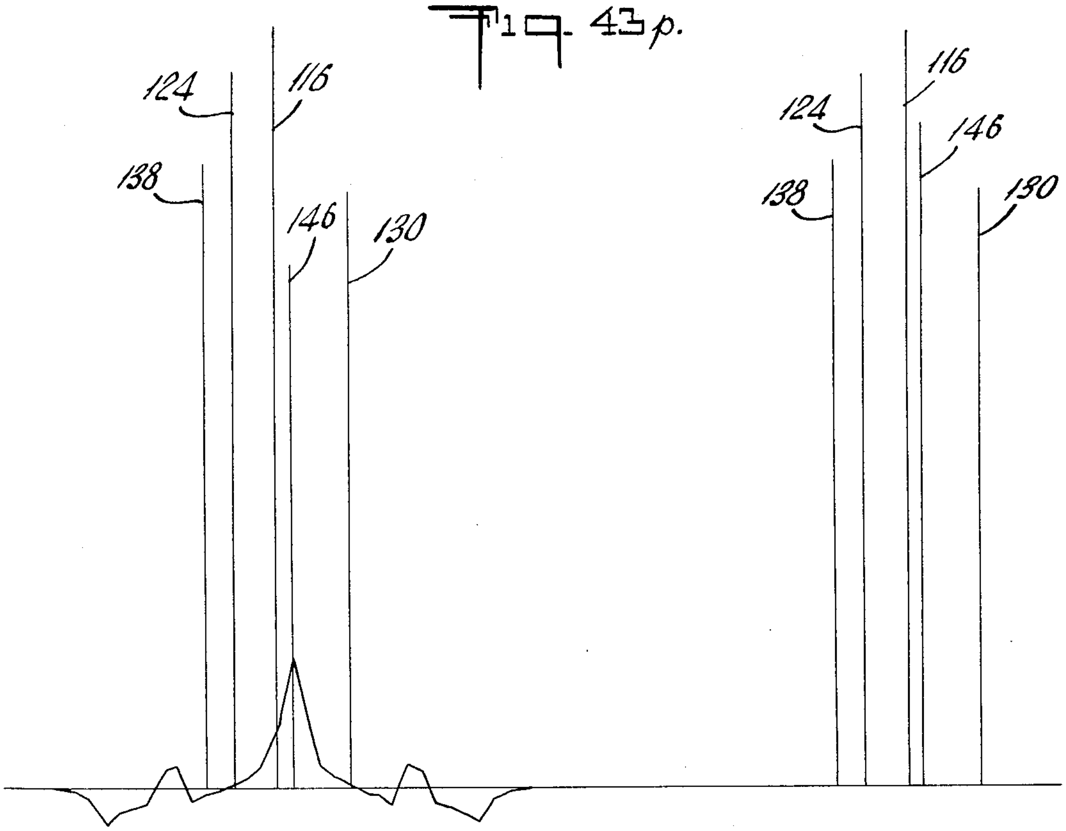
Figure 43Q:
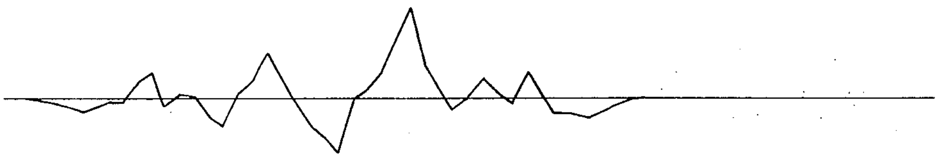
Figure 43R:
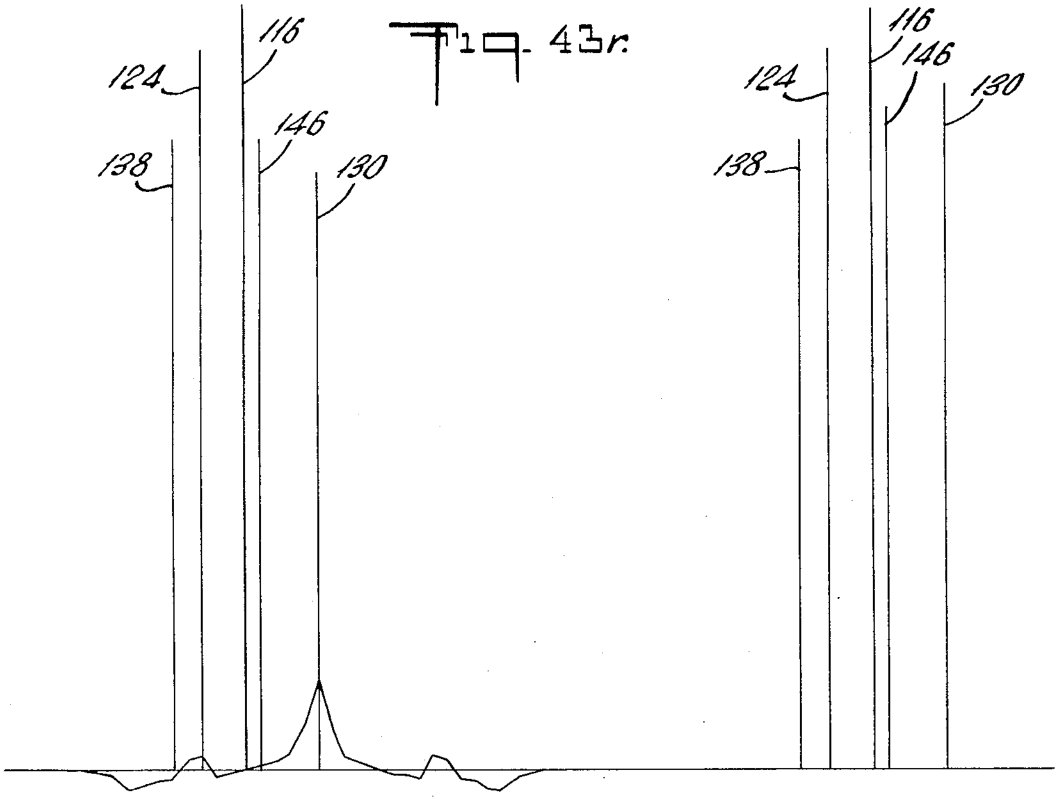
Figure 43S:
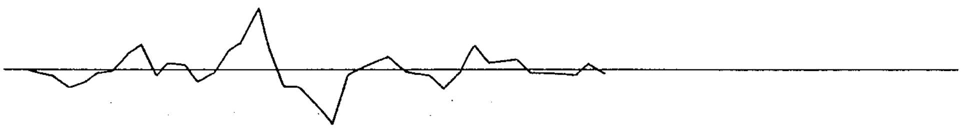
Figure 43T:
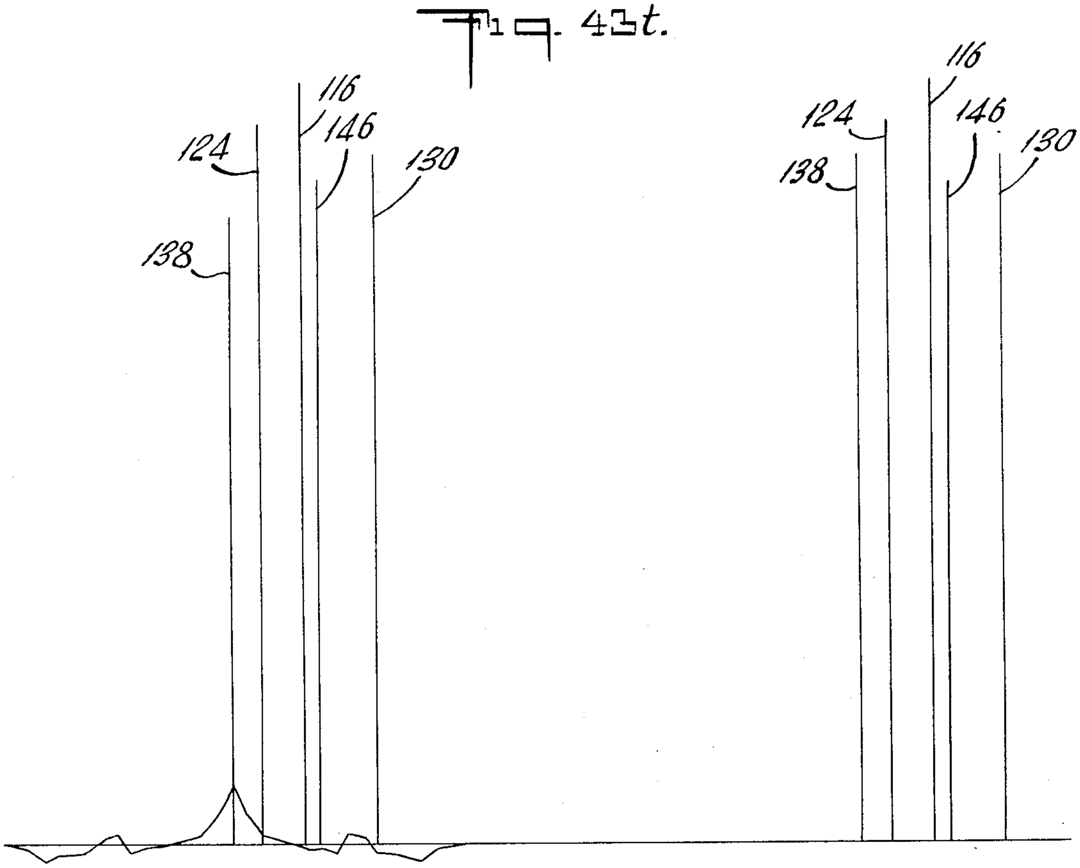
Figure 43U:
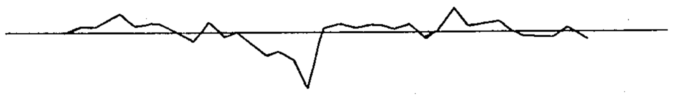
Figure 43V:
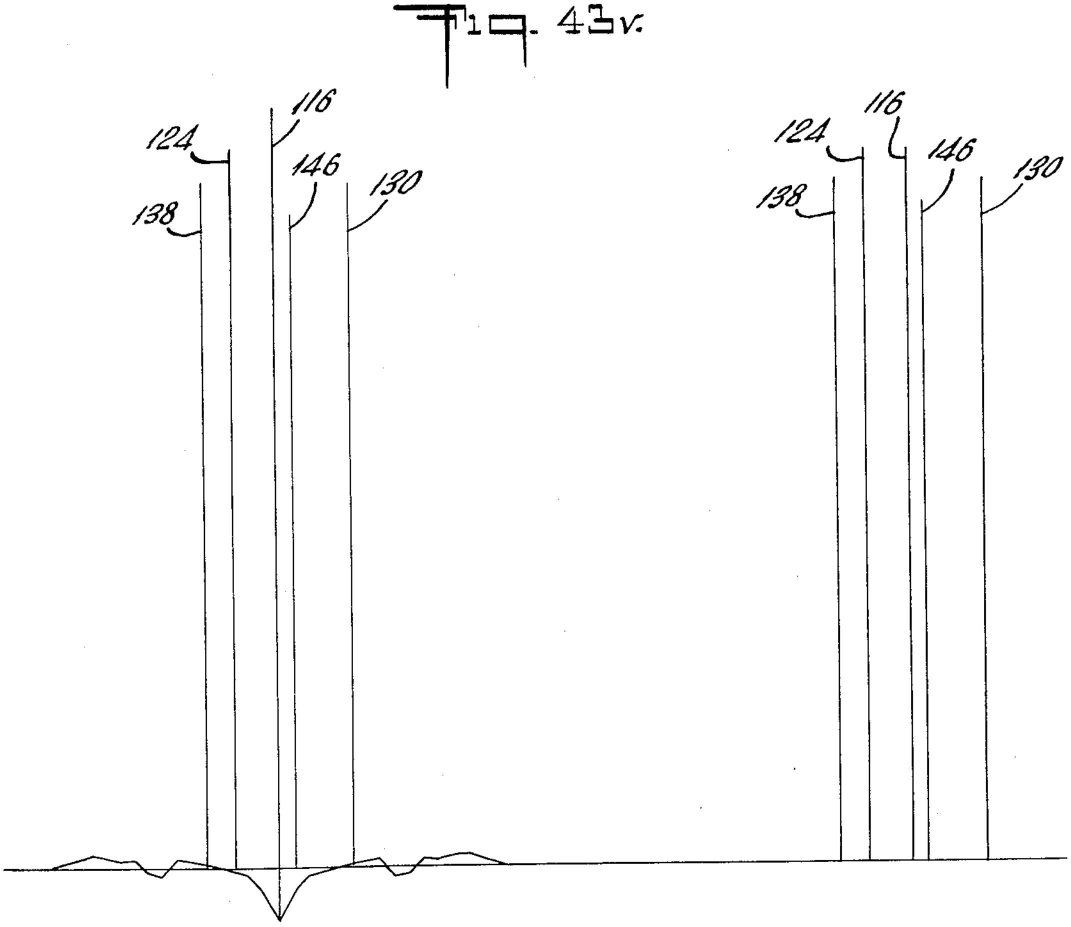
Figure 43W:

The amplification of the reconstituted Airy disc of FIG. 39, its center corresponding in brightness and location to 162 in FIG. 43 m is shown as 164 in FIG. 43*n*. Retrieved image points 116, 124, 130, 138 and 146 are shown in the same grid as the amplified reconstituted Airy disc 166 which is eliminated from remainder 160 in FIG. 43*m*, to demonstrate the spatial relationship with one another and the central $y$ 164 of the reconstituted Airy disc 166. When this reconstituted Airy disc point spread function is eliminated from the previous remainder, its values are added to the remainder, and, consequently, its central $y$, which is at the same $x$ coordinate as 124 is subtracted from the brightness at this point. The $y$ value at 124 shown in FIG. 43*n* above the central $y$ value of the "inverted" Airy disc point spread function, but at the same $x$ coordinate.

FIG. 43*n* also shows the retrieved image points after the seventh elimination. The five retrieved image points, except 124 are the same as those in their own grid in FIG. 43L — namely, 116, 130, 138 and 146. Object point 124, however, has a lesser value than in FIG. 43L as a consequence of the subtraction just carried out.

FIG. 43*o* through FIG. 43*x* show five more eliminations where the procedure just discussed is followed. In the eighth elimination, shown in FIG. 43*p*, image point 146 is increased. In the ninth elimination, shown in FIG. 43*r*, image point 130 is increased. In the tenth elimination, shown in FIG. 43*t*, image point 138 is increased. In the 11th elimination, shown in FIG. 43*v*, image point 116 is decreased. In the 12th elimination, shown in FIG. 43*x*, image point 146 is increased.

Figure 43X:
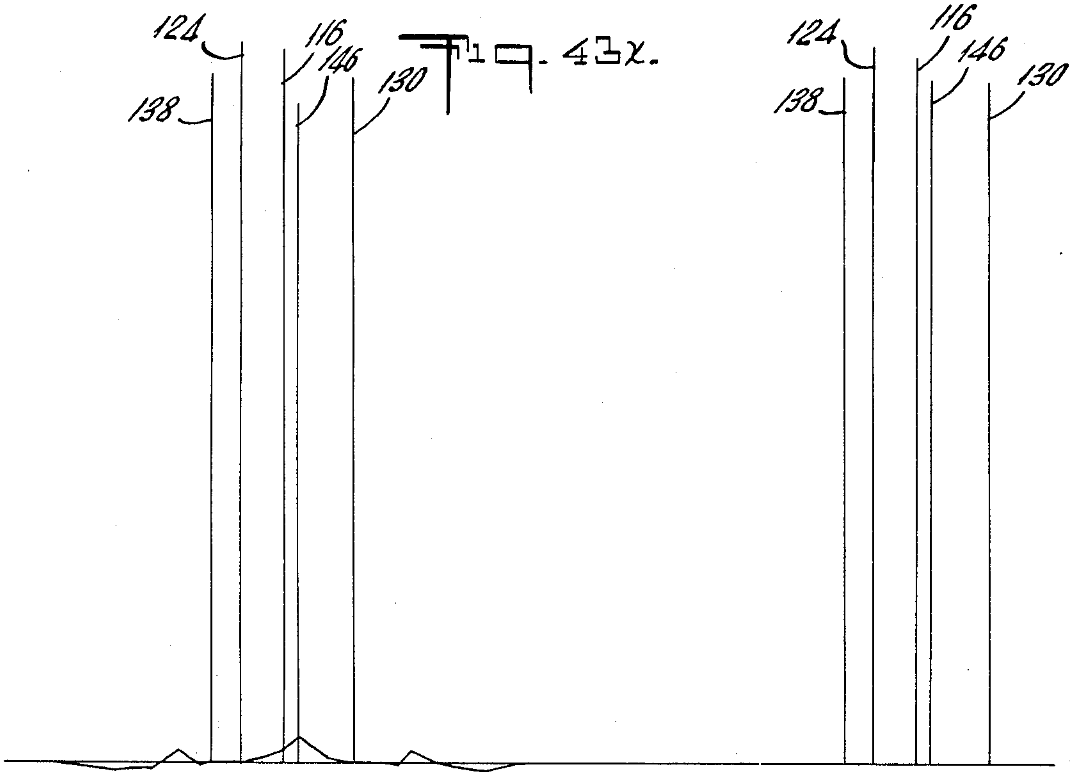

Thus, in the retrieved point grid, in FIG. 43*x*, it may be seen that the five image points are of almost equal intensity. They also correspond in location to the centers of the original five Airy discs shown in the FIGS. 41. It may also be observed that a number of phenomena occur during the retrieval procedure.

First, it may be noted that as image points are retrieved, they do not correspond in brightness to their respective object points. As the retrieval proceeds, however, the brightness of the image points are adjusted by the system until they more closely approximate their corresponding object points. The retrieval may continue until the brightness adjustments result in a level of approximation with the object points deemed sufficient. The closeness of the approximation will depend upon the goals of the particular application of the system.

Second, it may be noted that the brightness distribution shown in FIG. 43*a* consists of positive and negative zones of brightness. FIG. 43*a* shows a particular representative section of the brightness distribution pattern, and in this pattern which is actually three dimensional, when the negative brightness is subtracted from the positive brightness, there is a certain resultant "volume" of positive brightness. This resultant volume of brightness changes as each elimination takes place. Also, as each elimination takes place, the change in the resultant volume of brightness is reflected by the sum total of the volumes of the brightness of the retrieved image "points." This is because the retrieved image "-points" are not really points at all. In two dimension they are squares in a grid, and in three dimension they are "bars" of brightness, each bar representing a brightness volume or amount of energy. Therefore, at each level of elimination, the grand total of the brightness energy of the remainder of the reconstitution complex and the retrieved image "points" remains constant. At no time is there any loss of energy. The energy is merely transferred from one grid to another.

Third, when the y coordinate of greatest absolute value is positive, the elimination results in a transfer of positive energy from the remainder of the reconstituted point spread function complex to the retrieved image point grid. This results in a reduction of energy in the reconstitution complex. Conversely, when the y coordinate of greatest absolute value is negative, the elimination results in a transfer of energy in the opposite direction — namely, the spurious brightness given up by the retrieved image point grid serves to restore energy to the reconstitution complex. These changes are seen in two dimension as changes in the areas under and over the curves in the FIGS. 43.

In previous discussions, with respect to the retrieval of image points from the brightness distribution pattern resulting from a defocused system, it was stated that the method for eliminating the spurious surrounds was deferred for a later discussion. It was shown that mere nutation was sufficient for the reconstitution of an image where defocusing of object points resulted in spot images of uniform brightness. The retrieval of image points from these overlapping spot images is accomplished by the same method as described for diffraction-limited images.

First, the pattern of illumination of one reconstituted spot is determined by graphical analysis. Then this pattern is amplified so that its central $y$, value corresponds to the $y$ value of greatest absolute magnitude in a given reconstitution complex. The elimination then proceeds, step-by-step, in the manner previously described, until an approximation is achieved which is consonant with the requirements for the particular application of the system.

In the reconstitution of overlapping spots, each of uniform brightness, a radius of nutation was selected to satisfy the criterion as explained — namely, that throughout a complete cycle of nutation, a circumscribed central area of the receptor plane is constantly exposed to the nutating spot. Reconstitution may also be accomplished by another method. This would require a different criterion for the selection of the radius of nutation. This criterion is the same as that stated for the nutation of an Airy disc. Namely, that the radius of nutation must be sufficiently large so as to result in a small circumscribed central zone of lesser exposure in the center of the receptor plane. This zone of lesser exposure is analagous to the crater or depression shown in FIG. 34. Now, by definition, the defocused spots of the graphical analyses were of uniform brightness throughout. Therefore, the edge of the spot is a demarcation between total brightness and zero brightness. The new criterion for the radius of nutation of this spot in the second schema for reconstitution, is that it exceeds the radius of the spot itself by one-half a grid square unit. Nutation with this radius results in a central zone grid square of zero brightness, since this central grid square was never exposed to the nutating spot. The nutated exposure is then amplified as per the criteria of amplification previously described, followed by denutation. The reconstitution of this spot requires but one cycle of nutation-amplification-denutation, since the nutated exposure has a central $y$ of zero and the $y$ value adjacent to its is quite large. Retrieval of the image points then follows the first denutation as per the method already discussed with respect to the FIGS. 43.

Therefore, the same method, using the same criteria, may be applied for the retrieval of an image to point-by-point correspondance with the object in systems which cause a point object to image as either a spot of uniform brightness or an Airy disc.

All the aforegoing has dealt with two types of images, the first where the spot image of a point object has uniform intensity, and the second where the spot image of a point object has the brightness distribution of an Airy disc. Either image may be manipulated to retrieve image points for a point-by-point correspondance with object points and the criteria for this manipulation may be the same for either image form. Now, in the continuum of brightness distribution in the image of a point object, there are certain parameters which prevail with respect to both image forms analyzed:

1. The image of the point is round, and
2. The brightness of the round spot image may be either uniform or non-uniform.
3. Where the brightness is not uniform, and the point of greatest brightness is at the center of the pattern, and, also
4. Where the brightness is not uniform, it continually decreases from the center to the periphery, and, finally,
5. Where the brightness is not uniform, the brightness in any concentric infinitessimal annulus is in itself uniform.

If the system as described is applicable to each extreme of this continuum, it is also applicable to any and all image forms within the continuum where the a aforementioned parameters prevail.

The first required parameter just mentioned is that a point object images in a spot that is round. The system for retrieval of a point image which corresponds to a point object calls for nutation in a circular motion. The first parameter may be changed so that a point object results in an oval spot without changing any of the other parameters. A new condition now prevails. If the major axis of the oval spot is considered, it is possible to select a radius of nutation, according to the criterion discussed — namely, that the slope of the depression or crater in the revision formed by nutation is at a maximum. However, if nutation is performed in a circular motion, with any given radius, the slope must vary in different axes. If, again, the major axis of the oval spot is considered, it is possible to select a radius of nutation according to the criterion so that a principal section perpendicular to the major axis shows the required maximum slope. The principal section parallel to this axis, however, will not fulfill the criterion. A different radius must be selected for the minor axis so that the second principal section will satisfy the criterion for maximum slope. Since the meridional axes of an oval vary in their length, then the radius of nutation must vary to satisfy the criterion of maximum slope. The variation in radius, therefore, requires nutation in an oval direction so that in any axis of the spot, nutation will result in a revision of the point spread function that fulfills the criterion of maximum slope, and this applied to all meridional axes. The radius of nutation is longest in the meridian of the major axis, and shortest in the meridian of the minor axis. Therefore, the revised point spread function will also have an oval configuration. The same changes are effected from the nutation of an oval spot as of a round spot, except that these changes are meridionally asymmetrical.

The next step is amplification, and the amplification factor is determined by the comparjsion of $a_1$, $a_2$ and $a_3$ from formula 9, formula 13 and formula 17. These formulas require the use of the $y$ value immediately adjacent to the $y$ of greatest negative magnitude. Since the circular spot is symmetrical and so is its first revision, all the corresponding "adjacent" $y$ values are the same. This is not so with either the original oval spot or its first revision. It has already been shown that the criterion of maximum slope will yield two different principal raddi, one for each principal axis. The maximum slope then, will vary in the two principal meridians. Therefore, the amplification factor will have to be effective in the meridian of least resolution capability, which is that of the major axis. The important $y$ values then, are those adjacent to both the central $y$ and the $y$ value of greatest negative magnitude in the meridian of the major axis. The other adjacent $y$ values need not be taken into consideration.

The final phase of the first cycle is denutation. This will result in a revised point spread function of higher resolution than that of the original spot. Depending upon the brightness distribution within the original spot, a second or even third cycle of nutation-amplification-denutation takes place until all three previously discussed criteria have been satisfied.

The final revision, therefore, will satisfy all the criteria. This final revision, then serves as the reconstitution basis for each elimination to follow, just as the reconstituted revised point spread function of FIG. 39 serves in the procedure as discussed with respect to the FIGS. 43. The final revision of the oval point spread function is amplified to the greatest absolute $y$ value and this amplification is then subtracted from or added to the reconstituted point spread function complex and each remainder, as each image point is retrieved or modified.

The first of the five parameters may now be modified to the following:

1. The image of the point may be round or oval. A new situation may now be examined — namely, where the first parameter includes spot images of irregular shape.

The center of a round spot is understood to be the point equidistant from the perimeter. The center of an oval spot is understood to be the intersection of the minor and major axes. The "center" of an irregularly shaped spot is arbitrary. In the previous discussions, the third parameter for the maximum resolution of spots was that the brightest point of the oval or round spot must be at the center. Since this definition cannot be applied to an irregular spot, the center is hereby defined, for purposes of clarity,as coinciding with the brightest point. The term "center" will be used to denote the center of brightness.

In the selection of the optimum radius of nutation for irregular spots, the maximum slope criterion, when applied, requires the determination of nine data points — the central $y$ value and those of the eight $y$ values immediately adjacent to it. In order to satisfy the maximum slope criterion, therefore, eight principal radii are necessary, one for each "adjacent $y$ value." The determination of the eight principal radii is made in the following manner:

1. A series of circular nutations is made, the results of which permit the selection of the most suitable radius for each principal meridian. These eight radii describe an irregular locus of nutation. For each stop position between the eight principal stop positions, there is a change in radius proportional to the angular change between the two principal stop positions in question. For instance, if to achieve maximum resolution, 24 stop positions are used in one complete cycle of nutation, there is a 15° interval between stop positions. The eight principal radii are 45° apart. Therefore, the radius at the second stop position is equal to the sum of the radius of the first stop position (the first principal radius) plus one-third of the difference between the first and second principal radii.

2. Each of the stop position radii are magnified or minified by a series of amplification factors to perform a new series of investigative nutations. The loci of all the nutations in this series are parallel and concentric.

3. This second series of nutations is performed, which reveals that the eight principal radii require modification. This is because, in each of the nutations in the first series, the maximum slope criterion was predicated upon a circular nutation. The nutation with an irregular locus alters the critical slope in each meridian so that it is no longer at its maximum.

4. After the second series of nutations, the eight principal radii are again modified. Now intermediate radii are then calculated as per the method just explained.

5. The modification procedure continues, each time with a new modification of the principal and intermediate radii. The modifications themselves become less in value as the locus configuration changes. The modification step at which the change in radii has been deemed minimal, according to the requirements of the system, is the point at which the final radii for the first nutation have been determined.

The first nutation having been performed, is followed by a denutation without amplification as previously described. This denutation allows for the selection of the $y$ value of greatest negative magnitude. Formula 9, formula 13 and formula 17 are then applied for the determination of $a_1$, $a_2$ and $a_3$. These three values must be calculated eight times, once for each of the $y$ values immediately adjacent to the central $y$ and the corresponding $y$ values immediately adjacent to the $y$ value of greatest negative magnitude.

This will result in the final selection of eight amplification factors — each of maximum effectiveness in a principal meridian. They may then be ranked according to the resolution capability in their respective meridians. The factor of lowest rank results in a point spread function of least resolution capability.

The next step is amplification of the first revision of the point spread function (as a result of the first nutation) using the amplification factor of lowest rank (least effectiveness).

The last step in the first cycle is denutation and this is accomplished as previously described with respect to FIG. 36. At this point, if the criteria for maximum resolution capability of the revised point spread function have been satisfied in all eight principal meridians, the point spread function after the first cycle of nutation-amplification-denutation is the final revision. If the criteria have failed to be satisfied in all the principal meridians, another manipulative cycle is performed and this procedure is continued until all principal meridians satisfy all the criteria for maximum resolution capability. Each succeeding cycle is performed by the method just described.

Finally, a point-by-point elimination takes place for the retrieval and modification of the image points to correspond to the object points.

In the analysis of the retrieval from an irregular spot of a point image corresponding to a point object, each principal meridian is the subject of special treatment and consideration. The treatment of each principal meridian, however, is not independant of the treatment of the remaining principal meridians, since the determination for each interacts with the determination for all the others. Therefore, in a comparison of the gradient of brightness change from the "center of brightness" to the periphery of the spot in all meridians, uniformity is not a requisite. This nonuniformity of gradient, then, eliminates the fifth of the parameters defined as prevailing for the brightness distribution.

The five original parameters are now altered so as to eliminate 1, 2, 3 and 5. Therefore, the earlier statement which related to the parameters that prevail in the brightness distribution of the image of a point object, for each of the image forms analyzed, is changed to the following:

The retrieval of image points from an overlapping spot image complex formed by an optical system, is feasible for a point-by-point correspondance between image and object, where the brightness within each spot continually decreases from the point of maximum brightness to the periphery in all meridians.

Therefore, maximum resolution is feasible for images formed by systems subject to any one or combination of the following:

1. chromatic aberration,
2. monochromatic aberrations,
   a. spherical aberration,
   b. astigmatism,
   c. coma, and
   d. curvature of field.

Another image situation may be considered. A receptor plane may be exposed by a point object without the interposition of an optical system. Depending on (1) the sensitivity of the receptor plane, (2) the brightness of the object point, and (3) the exposure time, an image may be recorded by the receptor plane. The brightness distribution pattern of the image of the object will not be uniform. Since the illumination varies inversely with the square of the distance, the point where the object point is closest to the receptor will receive maximum brightness. The brightness within the spot will continually decrease from the center to the periphery. The periphery of the spot, in this case, will coincide with the periphery of the receptor, since the energy from the object point radiates in all directions, not having been focused by any intervening optical system. This spot image although huge in comparison with that focused by a system, still conforms to the parameter previously stated. It is then feasible to retrieve image points from an overlapping spot complex as the result of the "naked" exposure of a receptor to an object in space, without any optical system, for a point-by-point correspondance between object and image. Of course, this system of retrieval is subject to limitations. A later discussion will indicate the practical and theoretical factors that limit this system of retrieval.

Imagining systems are also subject, in some cases, to certain motions which seemingly superimpose one form of blur upon another. One motion that contributes to blur is the motion of an object relative to the system, such as when a moving object is photographed through a stationary motion-picture or still camera. Another motion of this type is where the camera is in motion relative to an unmoving object, such as when a picture is taken from a moving vehicle. Still another motion that contributes to the blur is when one component of the system moves relative to another, such as when the motion of a moving-picture film is not entirely stopped during the exposure of each frame. A combination of one or more of these motions will superimpose a motion blur upon any other blur for which the imaging system itself is responsible. The image motion of a point object will now be considered. All the motions just mentioned are relative. For instance, in any given meridian, moving the receptor plane relative to the image, or moving the image in relation to the receptor, will result in the identical exposure. This has already been discussed. Therefore, the exposure as a result of motion in all the cases cited, is identical. The factor of paramount importance is the knowledge of the locus and amplitude of the motion which is responsible for the motion blur. The motion which produces the blur is actually nutation, whether it be linear, circular, oval or irregular. Assuming a knowledge, then, of the nature of the motion, it is possible to retrieve an image point from the point spread function of an image spot blur, further blurred by the known motion. This is because the point object results in a final spot image which conforms to the definition of resolvability both before and after the motion. A later discussion will indicate how apriori information with respect to the blur as a result of motion is derived and utilized. Therefore, the application of the system leading to retrieval can resolve the blur resulting from the relative motion between the object, the image and/or the intervening system where one is present. This retrieval is also subject to certain limitations, practical and theoretical, and a later discussion will deal with the subject.

Where the atmosphere of the earth lies between an object and its image, the quality of the image is subject to the turbulance of the atmosphere, which imparts a relative motion between object and image. This relative motion is actually but another form of nutation, and just as with the previously discussed motion blurs, once the system has been calibrated for its effects, limitations imposed by atmospheric turbulance can be bypassed. However, a knowledge of the components of the effects of turbulance is necessary for the proper calibration of the system. A later discussion will indicate how this a priori information is derived and utilized to exceed the limits of resolution imposed by atmospheric turbulance.

These are many optical systems in wide usage which are of inferior quality and produce a defocused image to a greater or lesser extent. This is true of inexpensive cameras designed for mass use. These systems usually are designed with a fixed "universal" focus. An arbitrary focal distance is selected for these fixed focus cameras so that the "trade-off" between the blur in the image of an object photographed at near, and the blur in an image of a distant object, falls within an acceptable range. The nature of the lens system (usually consisting of a single lens) is such that even at the intermediate focal distance for which the instrument was designed, the image of a point object is a spot of considerable magnitude. Therefore, the resolution of these instruments is quite low, but obviously within the acceptable limits for the buying public.

The spot blur is of considerable magnitude even at the exact focal distance of the camera, but falls within the criterion for the application of the system as described, so that the resolution of the aberrated image is capable of considerable improvement. The larger spot blur in photographs taken at distances greater or less than the focal distance of the camera, also falls within the criterion for the application of the system as described, so that resolution of the defocused, aberrated image is capable of considerable enhancement by the application of the system as described.

Finer optical systems may also produce images that are at least partially defocused. This is true of an image of objects at distances other than the focal distance for which the cameras has been adjusted. The resolution of these defocused image segments is also capable of considerable improvement. Therefore, the application of the system as previously described can improve the resolution of defocused images where the defocus arises from the poor quality of the optical system, from the limitations of a universal focus system, from a field which contains objects at distances other than the focal length for which the system has been adjusted, or from any other cause or combination of causes. Again, it must be pointed out that the nature of the defocus must be known before the system for improving resolution can be applied. This subject is deferred for a later discussion.

The graphical analysis of the effect of nutation was achieved with the nutation device 64 and recorded as being received by the radial section 68. One radial section, however, is not sufficient for the analysis of any image of a point object other than a spot where the five parameters as originally stated, prevail. For all other image forms, it is necessary to record the brightness received by each square in the entire receptor grid, in each stop position. This can be accomplished by an appropriately programmed computer.

An image that is to be processed must first be dissected and "read." That is, an instrument capable of determining the brightness at small increments scans the image and produces an output consisting of the unit brightness per increment in usually analog, but sometimes digital form. The instrument employed for this procedure can be a microdensitometer, a flying spot scanner, a television camera tube, or any other device that performs this function. This output is then the input to a digital computer. The interface between the computer and the scanner is an analog to digital converter.

The location of each increment and its brightness value is stored in the memory core of the computer as a constant with a variable name assigned. For instance, $SQ1_{x,y}$ may be the variable name assigned to a set of values, where SQ1 refers to a square in the image grid, $x$ refers to its $x$ grid coordinate and $y$ refers to its $y$ grid coordinate. Therefore, if the lower left square of the grid is assigned $x$ and $y$ coordinates of 1, and the brightness of this lower left square is 2.5, then the computer, when asked for the brightness of this square, when properly programmed, would respond:

$x=1$ $y=1$ $SQ1_{x,y}=2.5$

Two separate grids are necessary to perform a nutation. This first is the stimulus grid (the original image grid, stored in the memory core), and the second the receptor grid. In performing the nutation, each square in the stimulus grid exposes certain squares in the receptor grid. The following designations shall prevail with respect to FIG. 44:

- *SQ1*: a square in the stimulus grid,
- *SQ2*: a square in the receptor grid,
- x : the subscript which denotes the $x$ coordinate of a given square,
- $y$ : the subscript which denotes the $y$ coordinate of a given square,
- $r$ : the radius of nutation,
- $s$ : the number of stop positions,
- $n$ : a particular stop position,
- $d$ : the subscript denoting the decimal portion of a number,
- A : the lower left corner of a square in the stimulus grid,
- B : the upper left corner of a square in the stimulus grid,
- C : the upper right corner of a square in the stimulus grid,
- D : the lower right corner of a square in the stimulus grid,
- A′ : the lower left corner of a square in the stimulus grid in a particular stop position of nutation,
- B′ : the upper left corner of a square in the stimulus grid in a particular stop position of nutation,
- C′ : the upper right corner of a square in the stimulus grid in a particular stop position of nutation, and
- D′ : the lower right corner of a square in the stimulus grid in a particular stop position of nutation.

Figure 44:
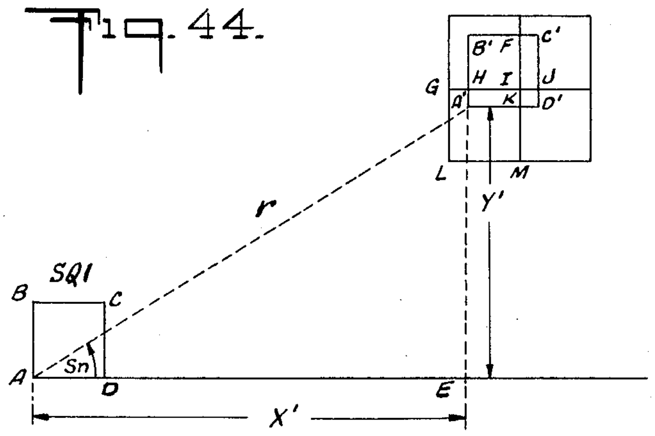

Referring to FIG. 44, square ABCD, each side of which is 1 unit in length, is a particular square in a stimulus grid. Square A′ B′ C′ D′, each side of which is also 1 unit in length, represents square ABCD in a particular stop position n on the receptor grid. Since the effects of nutation of square ABCD is recorded at s stop positions, the interval between these stop positions is $360/s$ degrees. The first stop position in the nutation cycle is assigned to lie on the $x$ axis, to the right of square ABCD. All stop positions are designated in degrees, beginning with the first stop position at zero degrees. Each succeeding stop position is located at an interval of $360/s$ degrees in a counter-clockwise direction.

In stop position $n$, A and A′ represent the lower left corners of square ABCD and A′B′C′D′ respectively. The first step is the determination of the grid square location of point A′ in the receptor grid. At stop position $n$, the angle between the radius $r$ and the $x$ axis is designated $s_n$, and the following formula prevails:

$$s_n=(n\,360°)/s \qquad (23)$$

In the right triangle AA′E, the following relationships are apparent:

$$x'=r\cos s_n \qquad (24)$$

$$y'=r\sin s_n \qquad (25)$$

If $x'$ is not a whole number, the $x$ coordinate of the receptor grid square containing A' is the integer portion of $x'$. *Similarly, if* $y'$ is not a whole number, the $y$ coordinate of the receptor grid square containing A' is the integer portion of $y'$. The receptor grid square containing A' is then identified by its $x$ and $y$ coordinates.

The next step is the determination of the amount of brightness that square A'B'C'D' deposits on this receptor grid square. This is calculated by determining the illumination in the rectangle A'HIK. The illumination in this rectangle is a proportion of the total illumination of grid square A'B'C'D'.

The distance from M to K is equal to the decimal portion of $y'$, *hereby designated as* $y'_d$. The distance from K to I is equal to 1 minus $y'_d$. The distance from G to H is equal to the decimal portion of $x'$, hereby designated as $x'_d$. This distance from H to I is equal to 1 minus $x'_d$. If the area of rectangle A'HIK is designated as $a'$, the following formula may be applied for its determination:

$$a' = (1 - y'_d)(1 - x'_d) \qquad (26)$$

This area represents the amount of illumination of square ABCD in the stimulus grid which exposes square LGIM of the receptor grid. Square LGIM is a particular square in the receptor grid that has already been identified by its $x$ and $y$ coordinates. Therefore, the brightness to which it is exposed in the $n$th stop position is determined by the application of the following formula:

$$SQ2_{x,y} = a'/(SQ1_{x,y}) \qquad (27)$$

A similar analysis will enable the determination of the areas of rectangle HB'FI, rectangle IFC'J and rectangle KIJD'. The receptor grid squares in which they lie may also be identified as having particular $x$ and $y$ coordinates, and, by the same method, these receptor grid squares are also assigned brightness values for the $n$ stop position of nutation.

In like manner, the brightness of each of all the other squares in the stimulus grid is deposited in the appropriate squares in the receptor grid. This process is repeated until all squares the stimulus grid have been processed.

The entire procedure is then repeated for each stop position of a complete cycle of nutation. This completes the first nutation.

The next step is the determination of the $y$ values of greatest negative magnitude. This is accomplished by a denuation without amplification. The result of this denutation is registered on a third grid, each square of which is designated $SQ3$. The following formula is applied:

$$SQ3_{x,y} = 2SQ1_{x,y} - SQ2_{x,y} \qquad (28)$$

This procedure is carried out for all corresponding $x$ and $y$ coordinates to yield a brightness value for each square in the third grid.

The next step is the calculation of the amplification factor which is performed as per the method previously described. This is followed by the amplification and denutation for the completion of the first full cycle. This procedure is repeated, if necessary until the final denutation fulfills the three criteria for maximum resolution and final reconstitution is complete.

The image reconstitution and retrieval procedure must be individually calibrated for any given optical system which produces images to be processed. This first step in this calibration is the employment of the given optical system for the production of a photographic image of a calibration target. This target consists of a pattern of small object lights on a black background. The distance between the target and the optical system must be such that the object lights at the margin of the target, form an image just inside the margin of the film. These object lights must subtend an angle so that the size of a theoretically "perfect" image of each object light equals the scanning increment of the scanning device. The term "perfect" is used here to denote a blur-free image. Thus, for instances, if the distance between the optical system and the target is 20 feet, and the distance between the optical system and the image is 1 foot, the object-to-image size ratio is 20:1. If the scanning increment is 5 microns, an object which has a linear dimension of 100 microns produces an image which covers 1 square in the image grid, provided, however, that there is no blur as a result of aberration, diffraction, motion or turbulance. Any blur produced by the system results in the illumination of other grid squares peripheral to the central square. It is the function of the reconstitution and retrieval procedure to produce image points which correspond to the original object points. In this case, the procedure will result in a retrieval of an image point which covers but one square, 5 microns on each side, from the blur which covers a multitude of squares.

The final procedure is retrieval of the image points which is accomplished as per the method previously described.

Next in order is a discussion of the application of this system to a real situation. The nature of the blur within an image formed by a particular optical system is such that the image of any point object will depend on its angular subtense with the axis of the system. Therefore, the image of a coaxial object point will differ from the image of a marginal object point. A real system requires the manipulation of each grid square of the entire image in the identical manner, despite any differences in the configuration and brightness distribution in the point spread functions at different locations in the image.

The photographs taken through the given optical system will consist of a number of spot blurs, one for each object light. Each spot blur will differ in configuration and brightness distribution. Since the size of each spot blur exceeds the scanning increment square, each blur covers a number of scanning increment squares. When the scanning of the calibration target photograph is complete, the data, consisting of the brightness values of each of the increment squares and their respective $x$ and $y$ coordinates is input to the computer. The first image grid now resides in the core each square of the grid being designated as $SQ1_{x,y}$, according to its coordinates. The dissected spot image of each object point in the calibration target, and its orientation in the black surrounded image field, comprise the data of this first grid.

The next step is the individual processing of the spot image of each point. This requires the determination of common nutation and amplification parameters for each cycle until final reconstitution is achieved. The same method previously described with respect to an irregularly shaped spot, is applied. The radii of nutation for the eight principal meridians of each spot are determined iteratively, performing a series of circular nutations. The first value for each principal radius is then calculated by averaging corresponding principal radii of each spot. Thusly, the principal radius in the horizontal meridian to the right of the mid $y$ value is determined for each spot by performing an iterative series of circular nutations to fulfill the criterion of maximum slope. The initial common radius for this meridian is determined by averaging the values determined for each spot. This is repeated for each of the principal meridians. The resulting series of principal radii have been determined by circular nutation. These principal radii are now used with the appropriate intermediate radii for a new series of irregular locus nutations. The irregular locus nutation is performed for each spot and, again, the new values for each principal radius determined for each spot, are averaged. These averages constitute the second set of values for the principal radii common to all the spots. The procedure for altering the principal radii is continued until the alteration is minimal. The values achieved at this point are assigned as the common principal radii to be used for the first nutation.

The same averaging procedure is used for the determination of the amplification factor. The determination of the parameters for the first cycle of nutation-amplification-denutation is now complete. If the reconstitution of any spot does not meet the criteria for maximum resolution, a new cycle is undertaken. When the criteria have finally been satisfied, the parameters for reconstitution have been determined.

The next step in the calibration of the system is the retrieval procedure. The reconstitution of each spot will vary in its configuration, size and brightness distribution. However, it has now been determined that at particular locations in the image field of a particular optical system, reconstitution of the image will result in a particular reconstituted spot. The information is sufficient to determine the particular reconstitution to be eliminated from the point spread function complex at these known locations in the field. The retrieval of image points is accomplished by amplification in the same manner described as with respect to the FIGS. 43.

The question now arises as to the parameters of the point spread functions to be eliminated from intermediate locations in the complex. Each of these intermediate locations are at some fixed position in the field with respect to the location of known image spots which have been reconstituted. A given intermediate point, then, is assigned a reconstituted point spread function which is determined by a proportional construction. This depends upon its location in relationship to the two or three nearest known points. Therefore, if a given intermediate point spread function is to be determined, the brightness of each square in its reconstituted point spread function is constructed, using the brightness values of corresponding squares of the known point spread functions to either side of it and proportional to the distance between the two.

In this way the computer is programmed for the elimination of point spread functions at all locations in the field, so that retrieval can be accomplished.

It was stated in previous discussions that the nature and magnitude of certain blurs be known for the application of the system of reconstitution and retrieval. The previous discussion with respect to calibration referred to the calibration of the program parameters for a given optical system. The same calibration target may also be defocused by an optical system to result in a blurred image. In the situation where image blur results from a defocused system, the calibration target is imaged at a given level of defocus. The procedure of reconstitution and retrieval is then calibrated for the given level of defocus at which the calibration target was photographed. This procedure may be undertaken for any level of defocus and, within certain limits that are deferred for later discussion, calibration of the system makes reconstitution and retrieval feasible to materially improve the resolution of the defocused image.

This calibration procedure will also enable the heightening of resolution where one form of blur is superimposed on another, or even on two or more others. In each case, calibration of the system for the particular resultant blur is necessary to compute the parameters of reconstitution and retrieval.

In the case of motion blur, such as when there is relative motion between the receptor and the object, the same is true. This motion may be due to a moving receptor, a moving object, a moving system, a moving atmosphere or any combination of these which results in a relative motion between the receptor and the object. As previously stated, the results of the motion must be known for the calculation of the parameters. Actually, this really means that the effect of the motion, or the motion itself must be repeatable. The calibration target must be photographed under the same motion conditions which prevail for the images that are subjected to the reconstitution and retrieval procedure. In the case of aerial photography, in order to cover the entire field of the image, the calibration target must consist of a pattern of object lights interspersed over a large ground area. Although this motion could be simulated in an enclosed environment, the accuracy of the simulation would determine to some extent, at least, the degree of final resolution. All in all, a simulation would probably not be accurate with respect to the forward motion of the aircraft relative to the object, the vibratory motion of the aircraft itself, any atmospheric turbulance, and, in the case of motion-picture cameras, the vibratory motion of the camera mechanism, and the failure of the film to come to a complete stop as each frame is exposed.

Since the calibration depends on the conditions that prevail when the image is recorded, this calibration must be made at different altitudes, different ground speeds, and, where atmospheric turbulence is significant, at different air speeds. The higher the altitude of the aircraft, the larger must be the ground area of the calibration target. It is possible, however, that there is a predictable relationship between the calibration parameters and the motion parameters. If this is so, automatic changes may be made in the calibration parameters without the need for individual calibration of each instrument under each condition.

A different calibration procedure must be employed for astronomical images. First, there is the aberration and diffraction blur of the system itself, and this is compounded by atmospheric turbulance. Atmospheric turbulance may vary from one portion of the field to another. Since astrophotographs are generally exposed at night, the background of the sky serves well as a background for the calibration target. The target itself must be a known object point. If there is a known celestial body at a small angular separation from the object to be studied, the image of the known celestial body can be the calibration target. This would require recalibration for each image to be studied, in most cases. However, if exposures are made at different levels of time, the images of the calibration target may be compared with one another. When two or more of the spot images of the target are sufficiently similar with respect to spot size, configuration and brightness distribution, recalibration may not be necessary. The smaller and angular separation between the field to be studied and the known object point, the higher will be the resolution after reconstitution and retrieval. There is another factor which contributes to the accuracy of the procedure. If atmospheric turbulance were completely random, an exposure of very short duration could result in image blurs of the calibration target and object to be studied that are quite different in nature so that calibration has little meaning and the improvement to resolution would be minimal, at best. At longer exposures, the random turbulance in different portions of the field has a cummulative motion blur effect on the image in all portions of the field. Long exposures which are usually the rule in astrophotography, tend to equalize the effect of the cummulative motion blur over the entire field. Therefore, the length of the exposure tends to compensate for the random quality of atmospheric turbulance. It also compensates, in some measure, for the difference in the blur patterns of the object to be studied and the calibration target, this difference being due to their angular separation.

The situation where a celestial body which qualifies as a target object point is at a sufficiently small angular separation from the object to be studied does not usually prevail. Where there is no known celestial body that qualifies to serve as a target for a given object to be studied, another alternative is possible.

A satellite, which has the desired angular relationship with the field to be studied, may be put in an appropriate orbit. This satellite which contains a light source oriented toward the earth, then becomes the vehicle of the calibration target. If an image of the object to be studied has had a lengthy exposure, it is fair to assume that a tracking device has moved the optical system so as to avoid an image trial of the unknown object. If the satellite has a stationary orbit with respect to the surface of the earth, the tracking device which moves the optical system would be programmed to track the object to be studied, and, in doing so, would cause an image trial of the calibration target. Therefore, the satellite must have an orbit which is not stationary with respect to the earth. The orbit of the satellite must relate to the rotation of the earth so that as alignment is maintained between the object to be studied and the image, the angular separation of the target and object will not vary. The fact that the satellite is not in stationary orbit lends it greater versatility. Each night, when it is in view and atmospheric conditions are favorable, it serves as a calibration target for a different segment of extra-terrestial observation.

As previously stated, due to the extra-axial aberrations of a given system, the spot image of a point object varies in size, configuration and brightness distribution with its angular subtense to the axis. Some systems are sufficiently corrected for these extra-axial aberrations so that there is very little difference between a co-axial image spot and a marginal image spot. In these systems, the calibration target requires fewer object lights. In other systems with a higher magnitude of extra-axial aberrations, more object lights are required in the calibration target. Therefore, the design of the calibration target is a function of the extra-axial aberrations of the system for which it is used.

The linear magnification of a system is expressed as the ratio between the size of the image and the size of the object, is expressed in the following formula:

$$M = I/O \quad (29)$$

where:

$M$ is the linear magnification, $I$ is the linear size of the image, and $O$ is the linear size of the object.

Since the distances between the system and the image and between the system and the object are proportional to the linear sizes of the image and the object, magnification may also be expressed by the following formula:

$$M = f'/f \quad (30)$$

where:

$f'$ is the distance between the system and the image, and $f$ is the distance between the system and the object. If, in formula 30, the object is at infinity, any increase in $f'$ increases the magnification of the system. Therefore, systems of greater focal length have higher magnification. Now, in referring to formula 1, it may be seen that any increase in the focal length of the system will also increase the diffraction blur of the system. Therefore, at a given point of increase in magnification of a system, there is a trade-off between magnification and diffraction. Any magnification beyond this point may be described as "empty," since no more detail is forthcoming, according to the currently constituted limits of optical resolution.

The image of a system is usually recorded by a receptor such as a photographic film emulsion, the face of an electronic tube, or any other receptor. Most of these receptor surfaces have a grain. Even a "grainless surface" such as that of some TV camera tubes must be scanned. The diameter of the scanning point is then the size of the functional grain. In the case of the human eye, the grain size is determined by the separation between adjacent retinal receptor elements.

Once an image is recorded on the receptor, the image itself may be enlarged by an enlarger such as a projection system, a view system, etc. Now the increase in magnification of this image to derive more detail will evantually reach a point where each grain is visible, and since these grains are either "on" or "off," this situation is analogous to the magnification of a newspaper photograph previously discussed, where no more detail is forthcoming. It has already been shown that an increase in magnification results in an increase in diffraction, and that diffraction has heretofore been held to limit optical resolution. Up till now, therefore, when the magnification of a system is sufficient to place the Airy disc of an object point on one grain of the receptor, there is no further point in either manufacturing a finer grain or to magnify further. First, if the grain were finer, each Airy disc is spread over many grains of the emulsion, but the ultimate limit to resolution is still the size of the Airy disc. Second, if the magnification were greater, the Airy disc would expose many grains of the emulsion with the same result. However, with the system of reconstitution and retrieval available as a tool to achieve higher resolution, spreading an Airy disc over many grains of the receptor is a necessary requisite for the application of the system.

For instance, if there were a cluster of stars where the angular separation of its members results in an image of overlapping Airy discs, it would be impossible to determine from a photograph, whether the object is a cluster of many stars of smaller magnitude, or a cluster of fewer stars of medium magnitude or possible even one star of high magnitude. If the entire cluster subtended a sufficiently small angle, it would image on one grain of film and no information other than the presence of one or more light sources of a given combined magnitude is forthcoming from the image. This is because a grain of photographic emulsion or a retinal element is either "on" or "off." In the case of a scanning spot, the "grain" is of uniform intensity.

If, however, the cluster imaged on a multitude of grains, there would be a resultant point spread complexity of overlapping Airy discs analogous to those of FIG. 42 and this information could be dissected and manipulated for a retrieval of image points to correspond to object points. Therefore, it may be seen that "empty" magnification is no longer empty. It is the additional magnification necessary to bypass the currently constituted limits of optical resolution. This additional magnification can be achieved by either increasing the magnification of high resolution systems or decreasing the grain size of the receptor or both. The design and execution of systems with far higher magnification than now considered useful, is feasible, according to the current state of the art. The information from the images of these systems can be utilized to exceed the currently constituted theoretical limits of optical resolution, by the method previously described.

One of the limits to resolution as described in this discussion is the size of the scanning increment. Now although devices which could scan an image prior to processing are limited with respect to the minimum scanning increment, this limit can be bypassed by increasing the magnification of the optical system. For example, it may be desired to increase the resolution of a system by a factor of 10. This requires that the diameter of an Airy disc image of a point object be 20 times as large as the scanning increment. If the scanning increment is more than one twentieth the diameter of the Airy disc in question, it would suffice to either decrease the size of the scanning increment or increase the size of the Airy disc. This can be achieved by merely designing the higher magnification into the system. It is suspected that decreasing the size of the scanning increment is subject to more hardware limitations than increasing the magnification of the system. The same is probably true of noise. It is also suspected that the noise resulting from failure to meet smaller tolerances in decreasing the scanning increment is greater than the noise resulting from higher magnification. This is also true because the noise from grain size increases in magnitude as the scanning increment decreases in size.

Another limit to resolution as described in this discussion is the intensity discrimination of both the receptor and the scanning device. For instance, if a scanning device could discriminate between 150 shades of gray from the level transparency in an unexposed film to the level of opacity in an overexposed film, this capacity would be largely wasted in a film of high contrast where there are but 15 shades of gray to be scanned. Similarly, a low contrast film would record more shades of gray then a higher contrast film. If an image with many shades of gray were scanned by an instrument sensitive to but a few of these shades, the information in the image would not be fully utilized. A highly sensitive low contrast film may record those portions of an image at a low level of illumination. A less sensitive film may record other portions of an image at a higher rate of illumination, etc., to finally yield a combination of information at many increments of gray.

It may be well to examine, at this point, the relationship between contrast and magnification, with respect to the system of reconstitution and retrieval as described herein. One Airy disc was divided into zones of illumination, as described with respect to FIG. 30. If this Airy disc is sufficiently large so that each zone is larger than the scanning increment, the brightness values could be scanned and recorded. The difference between the brightness of any zone and that of its immediate neighbor must be sufficiently large so as to be detected by the scanning device. If the sensitivity of the scanning device is low, adjacent areas may be recorded as having the same illumination. In the graphical experiment as described, it was assumed that the brightness of each zone was properly recorded. However, this would not be possible with a scanning device of low sensitivity. If it is true that an Airy disc as described with respect to FIG. 30 could be accurately scanned and recorded, the system for reconstitution and retrieval is feasible. It has already been pointed out that an increase in magnification is preferable to a decreased scanning increment to achieve greater resolution.

Now, therefore, it may be assumed that the scanning increment remains unchanged in a new situation. The magnification of the optical system is increased so that the Airy disc is enlarged. When the enlarged Airy disc is scanned by the same increment previously used, more zones will be recorded. The greater the magnification, the larger will be the Airy disc, and the more zones will be scanned. As the number of zones is increased, the difference in illumination in adjacent zones decreases. Also, as this zonal difference in illumination decreases, a higher degree of sensitivity discrimination is necessary for the recording of these smaller brightness differences by the scanning device. The receptor, be it a firm emulsion or whatever, also requires a higher degree of storage sensitivity. Therefore, it appears that the practical limit of resolution by the application of the system is the sensitivity discrimination of the receptor and the scanning device.

Under certain conditions, it may even be possible to bypass the receptor by the direct scanning of an aerial image. The ultimate practical limit to resolution, therefore, is the sensitivity discrimination of the scanning device.

The discussion thus far has been concerned with the resolution of light images. The same principles that apply to light images also apply to images formed by energy at other levels of the electromagnetic spectrum. One of the factors in the numerator in formula 1 is the wave length of the light. When this wave length is decreased, resolution increases. For this reason, energy of shorter wave length is used to form higher resolution images, such as in "ultra-microscope" where the specimen is illuminated by ultraviolet radiation, and the electron microscope, where the wave length of the radiation is even smaller for greater resolution. In each of these systems the magnification has been increased to its meaningful maximum. If the magnification is increased still further, it would be described as "empty," according to current definition. But, this increase in magnification would provide an image of overlapping discs according to the blur of the system, and these discs fall within the eligibility criterion for resolution improvement, according to the previous discussion. Of course, each type of system would require calibration. In these cases, the calibration target of optimum promise within limits of the state of the art, is a diffraction grating. The use of a diffraction grating as a calibration target requires the reconstitution of a line, rather than a disc. An extrapolation could then convert this information to formulate parameters for nutation and amplification in each cycle, and, also, the parameters of the extrapolated reconstituted disc will be used as a model for the elimination of amplified reconstitute discs and the retrieval of image points.

Radio astronomy is subject to resolution limitations similar to those of optical systems. The resolving power depends on the ratio of the wave lengths to the aperture. Radio-frequency radiation received from extraterrestial sources has the character of random noise superimposed on the background of thermal radiation from the surroundings. Hence it is necessary to discriminate between objects with radio-frequency surface brightness only slightly greater than those of their surroundings. Techniques have been developed that enable the measurements and discrimination between the three types of cosmic radiation studies by the radio astronomer:

1. thermal radiation,
2. 21 cm. radiation of hydrogen, and
3. non-thermal radiation.

In some cases, it is possible by "averaging" the signal to minimize the interference from random noise. But, even when all these techniques are applied, radio astronomy is still limited by the resolution barrier imposed by the wave length to aperture ratio.

The resolution of images that are produced by radio astronomy can be improved by the system of reconstitution and retrieval as herein described. The principles that have been established, apply to manipulating a limited image of an unknown object, using the parameters for which the system has been calibrated, to achieve correspondance between image and object.

Since radio waves penetrate the smog and dust of interstellar space and also the clouds of planetary atmospheres, turbulance need not be taken into consideration in calibrating the system. It is merely necessary to use a known emission at one level of focus to achieve calibration for a particular wave length. However, emissions at different wave lengths will result in images of different characteristics. This being the case, it is necessary for separate calibrations at the different energy levels to be studied. These calibrations can be performed on earth, since turbulance need not be taken into consideration. The "spot image" of an "emission object" can be scanned, or if the image itself is formed by scanning, it is then digitized, for the calibration procedure to be performed by a computer.

The quality of a radar image is subject to a number of factors which affect the performance of a radar system. Among these are:

1. the minimum power necessary to yield a detectable radar signal,
2. the maximum range at which the radar can detec a signal,
3. the nature and effect of intervening obstacles between the radar antenna and the target,
4. the interference imposed by alternate transmission paths,
5. the homogeneity of the intervening atmosphere with respect to the index of refraction at the selected frequency,
6. atmospheric absorbotion,
7. the radar cross section of the target,
8. the wave length of the transmitted energy, and
9. the receiving cross section of the antenna.

As with other systems, there are "trade-off" factors which must be taken into consideration in the design of a system for a particular application. In most imaging applications, however, as opposed to range applications, radar resolution is ultimately restricted by the same ratio of wave length to aperture. The aperture in radar is the receiving cross section of the antenna. An example of resolution limitation is the determination of the number of aircraft in a particular flight beyond a certain range. When these aircraft are sufficiently close to the antenna, they are individually identifiable. As the distance between the flight and the antenna increases, the separate "blips" on the radar screen merge into one, as resolution is lost. Another example of the resolution limitation is when a certain target, a particular aircraft, for instance, may be identifiable by model, from the interpertation of clues scanned by radar, at short distances between the antenna and the target. As this distance increases, the loss of resolution results in a "blip" image of the target, where the clues are no longer resolvable.

The nature of the spot radar image of a target point qualifies it for reconstitution so that the retrieval of an image which corresponds to the target is also feasible for radar systems. In dealing with radar images, however, a new problem is introduced — that of the speed of retrieval. A radar system may scan a particular field as frequently as once per second. The system for reconstitution and retrieval, as previously described, is time consuming for an image of even small size. Using the third generation of computer, the time required for the manipulation of a single image is at the very least, several minutes. Therefore, after 1 minute of radar scanning, the computer is several hours behind. Such applications of radar as ground controlled approach or on-board radar systems of aircraft, require that almost immediate processing of information takes place. This can be achieved by a "hard-wired" system for the reconstitution and retrieval of images, in place of an appropriately interfaced digital computer. This subject is deferred for later discussion.

Atmospheric turbulance is also a limiting factor in the resolution of radar images. In the previous discussion of calibration for atmospheric turbulance in the photography of extraterrestial objects, the magnitude of turbulance effects had to be taken into consideration. This turbulance certainly interferes with objects that subtend tiny angles. The radar image differs from the optical image, however, in its gross resolution qualities. It is only when resolution is sufficiently high that turbulance limiations are to be taken into consideration. The resolution of the reconstituted retrieved image of radar, though an improvement over the gross radar image, is not sufficiently high for turbulance to have materially interfered, in most cases. Therefore, calibration may proceed without taking atmospheric turbulance into consideration. The system may, however, be compensated for this turbulance by positioning known targets within the range of the antenna. The number of known target locations must be sufficient for a known target at a nearby azimuth to be scanned in the same sweep as the unknown target. This may require a dual hard wired recovery system, one part of which continually recalibrates, while the other performs the reconstitution and retrieval.

The laws that apply to the propagation of light waves and radio waves also apply to sound waves under water. The same limitations that apply to radar also apply to sonar except that turbulance is a greater contributor to resolution loss in sonar than in radar. This is true because the index of the medium of propagation is a factor in the resolution of a system, and water has a higher index than air. There are streams of constant flow in the seas (such as the Gulf stream), just as there are streams of constant flow in the atmosphere (such as the jet stream). The random turbulance as a result of tidal flows, the movement of marine life in the path or a sonar beam, climatic stimulus to surface fluid motion, etc., also contribute to the total turbulance that imposes a limit to the resolution of a sonar system. However, even it the system of reconstitution and retrieval could not be calibrated for underwater turbulance, it could be calibrated for the diffraction-like limitations of sonar resolution. This is accomplished by calibrating for a turbulance-free or a turbulance averaged underwater atmosphere. The averaging is accomplished by averaging the "illumination" or energy in corresponding grid squares of multiple images of the same target, subject to random turbulance in successive sonar sweeps.

The spectrum from an unknown emission consists of radiations separated into their constituent colors or wave lengths. Spectroscopes which enable the investigation of spectra, may employ refraction or diffraction to achieve this separation. In refractive spectroscopes, a transparent prism produces the spectrum, whereas in diffraction spectrographs, a diffraction grating is used for greater dispersion and resolution. In addition, diffraction gratings permit the study of extreme ultraviolet and infrared spectra, for which no transparent prisms can be found.

The information limit to a prism spectroscope is determined by the relationship between aperture and wave length, just as in other optical systems previously discussed. The image of a slit is formed by a prism spectroscope. An infinitely narrow slit would image as a line of finite width, just as an object point images as a spot in telescopic systems. Therefore, nearby wave lengths overlap, limiting the resolution of the system. This overlap results in spurious brightness areas so that nearby wave lengths cannot be studied. The system of reconstitution and retrieval would enable the discrimination of these nearby wave lengths as separate, presently considered impossible, according to currently constituted limits to spectroscopic resolution.

As in the case of a prism, the resolving power of a diffraction grating is a theoretical quantity, expressing the image separating power when the slit is infinitely narrow. Also, as in the case of other optical instruments, previously discussed, the ultimate limit to the resolution of a grating spectrograph is the wave length of light. Although the grating spectrograph is superior to the prism spectroscope, with respect to resolving power in certain applications, the image of the slit will still consist of overlapping brightness areas, preventing the resolution of nearby wave lengths. The system of reconstitution and retrieval can bypass these limits by eliminating spurious overlap energy to result in the separation of nearby wave lengths, currently not individually identifiable.

The resolving power of a grating may be increased by ruling more lines per inch, but the practical limit of this procedure is about 100,000 useful lines. An alternative method of increasing resolution is the use of certain interferometers, an example of which is an echelon interferometer. Interferometry is also subject to resolution limits, both practical and theoretical. The ultimate theoretical limiting factor is also the wave length of the energy to be studied. Again, although the resolution of interferometers in spectrographic analysis results in the overlap of nearby wave lengths, the system for reconstitution and retrieval can bypass these resolution limitations.

All the applications of spectroscopy, x-ray spectroscopy, spectrophotometry, spectroheliography and many of those of interferometry are capable of improvement by the application of a system of reconstitution and retrieval. These applications, although many, may be listed in the following principal categories:

1. qualitative chemical analysis,
2. physical analysis,
3. research on atomic structure,
4. studies of the mechanism of radiation,
5. investigations of some properties of atomic nuclei,
6. the electron configurations of atoms and their ions,
7. astronomical spectroscopy,
   a. the velocity of stars,
   b. identifications of chemical elements in extraterrestial bodies,
   c. and temperature of far distant stars, and
8. x-ray spectroscopy for chemical and physical analysis.

It is possible to achieve high speed reconstitution by substituting electronic scanning for computer analysis. First, the schema for the formation of an image which corresponds to the object, as previously explained and discussed, is not the only method of achieving this correspondance. In comparing the configuration of and brightness distribution within the original Airy disc, shown in FIG. 33, and in the revision after the first cycle of nutation-amplification-denutation, shown in FIG. 36, a few of the changes may be listed:

1. The overall area of illumination has increased.
2. The diameter of the positive central zone of the revision is smaller than that of the original Airy disc.
3. An annular zone of "negative" illumination is now present,
4. The proportion between the mid y and its immediately adjacent neighbor has increased. The changes that take place as a result of the second cycle of nutation-amplification-denutation, as shown in FIG. 39, may be listed:

1. There is a further increase in overall diameter.
2. The diameter of the positive central zone of the second revision is smaller than that of the first revision.
3. The overall diameter of the annular zone of negative illumination (including the peripheral positive peak) has increased.
4. The width of the annular zone of negative illumination (including the peripheral positive peak) has increased.
5. The proportion between the absolute values of the mid $y$ and the $y$ value of greatest negative magnitude has increased.
6. The proportion between the mid $y$ and its immediately adjacent neighbor has further increased.
7. Since 5 and 6 are true, the proportion between the mid $y$ and the peripheral $y$ value of greatest absolute magnitude has increased.

Additional cycles of nutation-amplification-denutation will continue to produce new revisions, each of which will relate to its predecessor as per the six previously listed changes.

An ideal final revision must have certain characteristics so that when two identical revisions overlap and their centers are two units apart, they will still be individually identifiable. The ideal final revision would actually consist of one high spike. However, in a real situation, the requirements for the ideal final revision need only be within the sensitivity goals of the system.

For instance, the final display of the image may appear on a cathode ray tube to be viewed by the human eye. There is a finite number of discrete steps of brightness from total brightness to total absence of brightness that the human visual system can discriminate. If the value $x$ is assigned to this number, and one half of a bipartite field has a given brightness, the other half of the field, in order to be distinguished, would have to be brighter or dimmer by the total brightness divided by $x$. The quantity of total brightness over $x$, in this situation, is the sensitivity goal of the system.

For instance, the final display of the image may appear on a cathode ray tube to be viewed by the human eye. There is a finite number of discrete steps of brightness from total brightness to total absence of brightness that the human visual system can discriminate. If the value $x$ is assigned to this number, and one half of a bipartite field has a given brightness, the other half of the field, in order to be distinguished, would have to be brighter or dimmer by the total brightness divided by $x$. The quantity of total brightness over $x$, in this situation, is the sensitivity goal of the system.

The final revision of the Airy disc may have a surround consisting of positive and negative zones. If the greatest absolute value of this point spread function is sufficiently small, then the central $y$ of two overlapping Airy discs cannot be heightened or dampened beyond the sensitivity level of the system. The area of the final revision then, is of little importance, as is the diameter and width of the negative zone annulus. The sole criterion for the final revision of the Airy disc is the relationship between the central $y$ value and the peripheral $y$ of greatest absolute magnitude.

It may be seen, then, that repeated cycles of nutation-amplification-denutation can result in a final revision that satisfies the criterion of falling within the sensitivity goal of the system. If this procedure is followed in a computer, an inordinate amount of time would be consumed in its execution. Repeated cycling, however, is advantageous in a "hard-wired" system.

The first step in this type of system is the imaging of the photograph by a television camera or any other rapid scan device. The image is recorded on videotape. Instead of a conventional scanning playback head, a special head may be designed which consists of two scanning elements. The first is a ring element which scans an annulus simultaneously, and the second is a spot element which scans the tiny spot at the center of the annulus. The ring scanning element is analgous to a nutation device. That is, it scans the annulus in the same manner that the computer program performs a scan by nutating. Scanning with a ring element, however, offers the advantage of greater accuracy, since the entire annulus is scanned, rather than individual stop positions. It was mentioned in a previous discussion that increasing the number of stop positions increases the accuracy of the nutation. The spot element scans the central increment, which represents the central y value of the original Airy disc.

The next step is the amplification of the impulse of the ring element, analagous to the amplification step as described in the computer program with respect to FIG. 35.

The amplified impulse then passes through an electronic mixer which processes the amplified ring element impulse together with the spot element impulse, to result in a denutated impulse. This denutated impulse is then recorded on the first frame of a second videotape.

Another dual head performs in the same manner as the first head, followed by amplification, mixing and recording the new revision on a third tape. While the second dual recording head is scanning the first frame, the first dual recording head is scanning the second frame.

The process is repeated by as many heads as are necessary for the formation of a revised Airy disc complex which satisfies the criterion of maximum resolution. The final tape image is then scanned by a conventional scanning head for the final display of the image. As each head scans a new image, each preceding head is scanning its corresponding preceding image. Therefore, the number of scannings per unit of time is the same for the original camera as for the final display circuit.

A scanning system of this type would have the capability of resolving a rapid sequence of events such as recorded by a television camera under normal operating conditions. The frame-per-second rate of the display would equal that of the camera performing the original scan with a short processing lag between the original event and the resolved display. This delay is equal to the amount of time necessary for one complete scan times the number of scanning cycles performed by the system. For instance, if a television camera scans at the rate of 30 frames per second, and if 10 cycles of scanning are necessary to arrive at the ideal final revision, there is a delay of 1/30 times 10 or ⅓ second between the original scan and the final display. The system is designed, however, to operate at the same rate of speed throughout, so that the final display will maintain a given lag and not fall behind the original scan.

This system of repeated cycling is more time consuming for the computer than the application of a retrieval cycle, so that the system of reconstitution and retrieval is advantageous for a computerized system. However, the retrieval procedure is more complex for a hard-wired system, but repeated cycling can be performed much more rapidly and accurately, so that this procedure is better suited for the hard-wired system.

The hard-wired system must be programmed as per the calibration parameters. Therefore, calibration of the system is performed as previously described, by a computer programmed to iterate the principal meridional radii of nutation, as well as the amplification factors for each complete cycle. Once these parameters are determined, the electronic system is programmed to function independantly.

The ring element of a dual pickup head must sufficiently versatile for programming. The ring is actually a pickup configuration that may be programmed for a pattern of radius change. This will enable the setting of its configuration and size to conform to the calibration parameters determined by the computer. An actual ring may be machined to be used in the pickup head, or any other arrangement can be substituted so that the ring element is appropriately programmed with the calibration parameters.

A hard-wired system is subject to some noise factors not encountered in a computer based system. One source of noise is the distortion of impulses by processing through the dual playback head, the amplification and mixing circuits. It is considered, however, that these distortions are negligible. The main source of system noise is considered to result from the various transfers, each time an electronic image is recorded and played back. The uniformity of the "grain" of the videotape is one factor, and the efficiency of the recording and playback heads are other factors. Naturally, carefully controlled current is necessary, the entire device must be in a dust-free environment, the velocity of the tape drive must be critically monitored and temperature and humidity changes must be taken into consideration for their effect on the mechanical equipment. Other precautions include an atmosphere that is doubly screened against ambient electricity and equipment supports that are insulated against outside vibrations.

This type of scanning system would have the capability of resolving a rapid sequence of events such as recorded by a television camera under normal operating conditions. The frame per second rate of the display would equal that of the camera performing the original scan with a short processing lag between the original event and the resolved display.

It was previously mentioned that the system of reconstitution and retrieval could resolve a defocused image. The condition for this resolution was calibration for a particular level of defocus. If a given optical system is focused for $x$ distance and images an object situated a $y$ distance, calibration for $y$ distance is necessary for the reconstitution and retrieval of this image. The camera or telescope or any other optical system or systems may produce a photograph at a given unknown level of defocus or may produce a photograph of objects situated at different distances from the system. A rapid system of resolution such as previously described will provide the versatility for the interpretation of a variously defocused photograph. This is achieved, first, by the storage of the calibration parameters in the programming mechanism of the electronic device. Each set of calibration parameters may be successively "-tuned in" so that beginning with the calibration parameters at infinity, and continuing with the next closest distance parameters, the reconstituted image is displayed at various levels of correction. The time lag between the "tuning-in" and the display would be one-third second in the example previously cited so that it is possible in short order to run the entire gamut of defocus level. If the observer is interested in one sector of the image he may rack the parameters to achieve the most meaningful level of defocus correction for that sector. He may then divert his attention to any other sector of interest and repeat the procedure , thus being able to examine the entire image, regardless of the level of defocus of any of the various details in the image.

This application will enable the rapid processing of images produced by universal focus systems which produce defocused images. It also applies to aberrated systems such as those in single element inexpensive cameras. The operator may rack the parameters of an image to provide simultaneously, both focus restoration and aberration correction. This may be performed rapidly, and the final display may be diverted to a scanning device which exposes photosensitive paper for a print of the processed image.

This system of rapid processing is also applicable to x-ray images. These images may be compared to the images previously described where a film is directly exposed to an object without an intervening optical system. The detail of an x-ray film really consists of the umbras and penumbras of objects which are partially or completely opaque to the x-ray radiation. An x-ray system may be calibrated in a similar manner to that described for an optical system. The calibration target, however, consists of small object points which are opaque to the x-rays. To calibrate the system, the distance between the calibration target and the film is varied for different levels of focus. The calibration parameters are then determined and are stored for programming the rapid resolution system. When the x-ray image is processed, it is focused for one level so that a particular plane of the three dimensional object may be studied. The focusing of one plane will automatically defocus other planes closer to and further from the film. The calibration parameters may be varied to observe the image of different planes of the object. This will aid in discriminating particular details of interest by both bringing them into clearer focus, thus heightening their resolution, and by defocusing other details, further heightening resolution. A particular image grouping may be broken down as to the identification of its members and their spatial localization with respect to a $z$ coordinate in addition to their $x$ and $y$ coordinates.

This improvement in x-ray image resolution has application to industry, dentistry, and especially broad application in medicine.

A certain portion of the electromagnetic spectrum is utilized for the transmission of audio and audio-visual information. This information is transmitted in assigned carrier frequencies by either cable or wireless transmission. If two nearby assigned frequencies are too close together, there is an overlap resulting in the interference of one signal with another, making one or the other or both indistinguishable. Since the frequency range of the electromagnetic spectrum is finite, there is a limit to the number of carrier frequencies that can be utilized. If, however, the resolution of a receiver can be improved, two nearby carrier frequencies can be separated. This would allow closer spacing between nearby frequencies without interference and, therefore many more carrier frequencies could be assigned for the transmission of more information. This also applies to the utilization of microwave transmission.

The impulses that are transmitted on a particular carrier frequency, as well as the frequency itself, represent a two dimensional dynamic image. This type of image could be described as a moving irregularly serrated sine wave. Just as the optical three dimensional image can be scanned so can the two dimensional electronic signal be scanned. Since the electronic signal is dynamic, it may be scanned by a fixed sensor arrangement.

First the signal may be considered as stopped for analysis. One loop of the sine wave may be subjected to a "linear nutation." This motion consists of moving it forward or backward along its path of propogation, and recording its exposure to a receptor. This comprises a linear nutation. This may be then amplified and a denutation follows.

This procedure may be accomplished electronically by using a two dimensional version of the dual scanning head previously described. Since it is not necessary to program a tape the signal may be tapped at different points. The two outer points tap the periphery of a given point along the signal image while the central point taps the principal point. The signal from the principal point comprises the original signal akin to a point in the original Airy disc. The combined signal in the two peripheral points comprises the nutated signal. This combination then passes through an amplifier and both the principal point signal and the amplified combination signal pass through a mixer which performs the denutation. The cycle is repeated as many times as is necessary to resolve carrier frequencies at nearby different wave lengths. The closer the wave lengths, more cycling is necessary.

If coded information is transmitted on a carrier frequency, the rate of transmission may be speeded for greater utilization of a particular carrier frequency in a given space of time. There is a limit, however, beyond which this speeding up process will result in a resolution loss. Then, the discrete information bits, each of which may be represented by a wave, interfering with adjacent bits, when the nearby waves overlap. This system of electronic processing will enable the resolution of individual bits beyond the currently constituted limits of high speed transmission.

The applications of two dimensional electronic processing include the following:

1. an increase in the number of messages in a given cable,
2. an increase in the rate of high speed transmission of information,
3. an increase in the number of carrier frequency assignments permitting
   a. more radio stations in all bands
   b. more television stations in the VHF and UHF bands
   c. more commercial frequencies for fleet communication, telephone communication, etc.

The present invention may be embodied in other specific forms without departing from the spirit or essential attributes thereof and, accordingly, reference should be made to the appended claims rather than to the foregoing specification as indicating the scope of the invention.

I claim:

1. A system for processing overlapping blurred image discs which result from aberration, diffraction and/or motion of object points and reconstituting these blurred discs into individual image points free of defects resulting from diffraction and aberration and relative motion between object and image, comprising the steps of a. nutating the blurred image disc to revise the point spread function of said blurred image disc until the center of the resultant point spread function is depressed at a predetermined rate, b. amplifying the resultant point spread function by multiplying by an amplification factor which satisfies fixed criteria; and c. denutating the amplified resultant point spread function.

2. A system for processing overlapping blurred image discs of claim 1 including the steps of determining whether the first cycle of nutation amplification-denutation has resulted in a revision of the point spread function to meet certain criteria which indicate that the final resolution goals have been met.

a. when these certain criteria have not been met, then the nutated amplified denutated point spread function is nutated a second time until the center of the new resultant point spread function is depressed at the predetermined rate, b. the new resultant point spread function is then amplified by multiplying by the amplification factor which satisfies the fixed criteria; and c. the amplified new resultant point spread function is denutated and a determination is made as to whether the fixed criteria have now been met.

3. A system for processing overlapping blurred image discs of claim 1 wherein said predetermined rate is the maximum slope of the center of the resultant point spread function in step (a).

4. The system for processing overlapping blurred image discs of claim 1 wherein at least one criteria for said amplification factor is that after denutation the amplitude of the center of the resultant point spread function is more than twice the amplitude of an adjacent point at a preselected sampling distance from the central point of the denutated point spread function.

5. A method for retrieving the image of a point source of light which has been dispersed through space and imperfectly focused by an optical system through which it has passed comprising the steps of a. nutating the image; and
b. operating on the nutated image in accordance with criteria determined by the characteristics of the optical system to recover a image which corresponds to the original point source.

6. The method for retrieving the image of a point source of light which has been dispersed through space and imperfectly focused by an optical system through which it has passed of claim 5 wherein said step of operating includes the step of denutating the nutated dispersed light.

7. The method for retrieving the image of a point source of light which has been dispersed through space and imperfectly focused by an optical system through which it has passed of claim 6 wherein the step of operating includes, first, amplifying the nutated image by an amplification factor which satisfies fixed criteria, said step of denutation comprising the step of a point-by-point subtraction of the amplified nutated image from twice the original image to form a reconstituted image.

8. The method for processing overlapping blurred image discs of claim 1 wherein, after denutation, when a resultant point spread function complex has been recovered which meets the criteria of the system, then the next step is to extract each image point by separating its finally revised point spread function from said reconstituted point spread function complex.

9. The method for processing blurred image discs of claim 8 wherein said step of separating out individual finally revised point spread functions comprising the steps of subtracting, sequentially, from the brightest point of the resultant point spread function complex, a series of finally revised point spread function each of which represents a point in the final image.

10. The method for processing overlapping blurred image discs of claim 9 wherein said step of subtracting from the resultant point spread function complex, a finally revised point spread function which is the finally revised image of an original object point comprises the step of first amplifying the finally revised point spread function to a degree capable of cancelling, exactly, the brightest point of the resultant point spread function complex.

11. A method for reconstituting overlapping blurred image discs of claim 10 comprises the step of repeating the last step of subtracting a finally revised point spread function, its center having an amplitude equal to the brightest point of the resultant point spread function complex at the brightest point of the resultant point spread function complex and recording the position and intensity of each of these finally revised point spread function centers until the resultant subtracted point spread function complex is substantially zero.

12. A method for operating on first set of data representing an image, said image having been blurred by a system through which it has traversed, said method comprising the steps of:

a. operating on said first set of data to provide a second set of data representing a nutation of the blurred image; and
b. combining said first and second sets of data to provide a third set of data representing an improved version of said image.

13. A system for processing a first set of information representing a blurred image including the steps of:

a. operating on said first set of information to provide a second set of information representing a second image which would result from movement of said blurred image in an annular path while maintaining a fixed spatial relationship thereof;
b. comparing information in said second set of information representing two points in said second image chosen in accordance with a desired minimum resolution to provide a criteria indication and
c. combining said first and second sets of information when said criteria indication reaches a predetermined state.

14. A method for processing information representing a blurred image comprising the steps of:

1. operating on the information to provide information representing a nutation of the blurred image; and
2. subtracting the information representing the nutation of the blurred image from the information representing the original blurred image.

15. A method for processing a blurred image including the step of:

a. degrading said blurred image wherein the step of degrading the blurred image includes moving the blurred image in an annular path while maintaining it in a fixed spatial relationship.

16. The method as defined in claim 15 wherein the annular path in circular.

* * * * *